April 25, 1961 J. E. OSTLINE 2,981,798

AUTOMATIC TOLL TICKETING TELEPHONE SYSTEM

Filed Dec. 3, 1956 26 Sheets-Sheet 1

INVENTOR.
John E. Ostline
BY
C. A. Gulbrandsen
Atty

INVENTOR.
John E. Ostline
BY
C. A. Gulbrandsen
Atty.

April 25, 1961 J. E. OSTLINE 2,981,798

AUTOMATIC TOLL TICKETING TELEPHONE SYSTEM

Filed Dec. 3, 1956 26 Sheets-Sheet 3

INVENTOR.
John E. Ostline
BY
C. A. Gulbrandsen
Atty.

INVENTOR.
John E. Ostline

BY C. A. Gulbrandsen
Atty.

April 25, 1961 J. E. OSTLINE 2,981,798

AUTOMATIC TOLL TICKETING TELEPHONE SYSTEM

Filed Dec. 3, 1956 26 Sheets-Sheet 5

INVENTOR.
John E. Ostline
BY
C. A. Gulbrandsen
Atty.

April 25, 1961 J. E. OSTLINE 2,981,798

AUTOMATIC TOLL TICKETING TELEPHONE SYSTEM

Filed Dec. 3, 1956 26 Sheets-Sheet 6

INVENTOR.
John E. Ostline
BY
C. A. Gulbrandsen
Atty

INVENTOR.
John E. Ostline
BY
C. A. Gulbrandsen
Atty.

INVENTOR.
John E. Ostline
BY
C. A. Gulbrandsen
Atty.

INVENTOR.
John E. Ostline
BY
C. A. Gulbrandsen
Atty.

April 25, 1961 J. E. OSTLINE 2,981,798

AUTOMATIC TOLL TICKETING TELEPHONE SYSTEM

Filed Dec. 3, 1956 26 Sheets-Sheet 10

INVENTOR.
John E. Ostline
BY
C. A. Gulbrandsen
atty.

April 25, 1961 J. E. OSTLINE 2,981,798

AUTOMATIC TOLL TICKETING TELEPHONE SYSTEM

Filed Dec. 3, 1956 26 Sheets-Sheet 11

INVENTOR.
John E. Ostline
BY C. A. Gulbrandsen
atty.

INVENTOR.
John E. Ostline
BY
C. A. Gulbrandsen
Atty.

April 25, 1961 J. E. OSTLINE 2,981,798

AUTOMATIC TOLL TICKETING TELEPHONE SYSTEM

Filed Dec. 3, 1956 26 Sheets-Sheet 13

INVENTOR.
John E. Ostline
BY
C. A. Gulbrandsen
atty.

AUTOMATIC TOLL TICKETING TELEPHONE SYSTEM

Filed Dec. 3, 1956

INVENTOR.
John E. Ostline
BY
C. A. Gulbrandsen
Atty.

April 25, 1961 J. E. OSTLINE 2,981,798

AUTOMATIC TOLL TICKETING TELEPHONE SYSTEM

Filed Dec. 3, 1956 26 Sheets-Sheet 15

INVENTOR.
John E Ostline
BY
C. A. Gulbrandsen
atty.

April 25, 1961 J. E. OSTLINE 2,981,798

AUTOMATIC TOLL TICKETING TELEPHONE SYSTEM

Filed Dec. 3, 1956 26 Sheets-Sheet 16

INVENTOR.
John E. Ostline
BY
C. A. Gulbransen
Atty.

INVENTOR.
John E. Ostline
BY
C. A. Gulbrandsen
Atty.

April 25, 1961 J. E. OSTLINE 2,981,798

AUTOMATIC TOLL TICKETING TELEPHONE SYSTEM

Filed Dec. 3, 1956 26 Sheets-Sheet 18

INVENTOR.
John E. Ostline
BY
C. A. Gulbrandsen
Atty.

INVENTOR.
John E. Ostline
BY
C. A. Gulbrandsen
Atty

INVENTOR.
John E. Ostline
BY
C. A. Gulbrandsen
atty.

INVENTOR.
John E. Ostline
BY
C. A. Gulbrandsen
Atty.

INVENTOR.
John E. Ostline
BY
C. A. Gulbrandsen
atty.

INVENTOR.
John E. Ostline
BY
C. A. Gulbrandsen
Atty.

April 25, 1961 J. E. OSTLINE 2,981,798

AUTOMATIC TOLL TICKETING TELEPHONE SYSTEM

Filed Dec. 3, 1956 26 Sheets-Sheet 24

INVENTOR.
John E. Ostline

BY
C. A. Gulbrandsen
Atty.

INVENTOR.
John E. Ostline
BY C. A. Gulbrandsen
atty.

April 25, 1961 J. E. OSTLINE 2,981,798

AUTOMATIC TOLL TICKETING TELEPHONE SYSTEM

Filed Dec. 3, 1956 26 Sheets-Sheet 26

INVENTOR.
John E. Ostline
BY
C. A. Gulbrandsen
Atty 2,981,798
Patented Apr. 25, 1961

2,981,798

AUTOMATIC TOLL TICKETING TELEPHONE SYSTEM

John E. Ostline, Chicago, Ill., assignor to Automatic Electric Laboratories, Inc., a corporation of Delaware Filed Dec. 3, 1956, Ser. No. 625,773
9 Claims. (Cl. 179—7.1)

Figure 1:
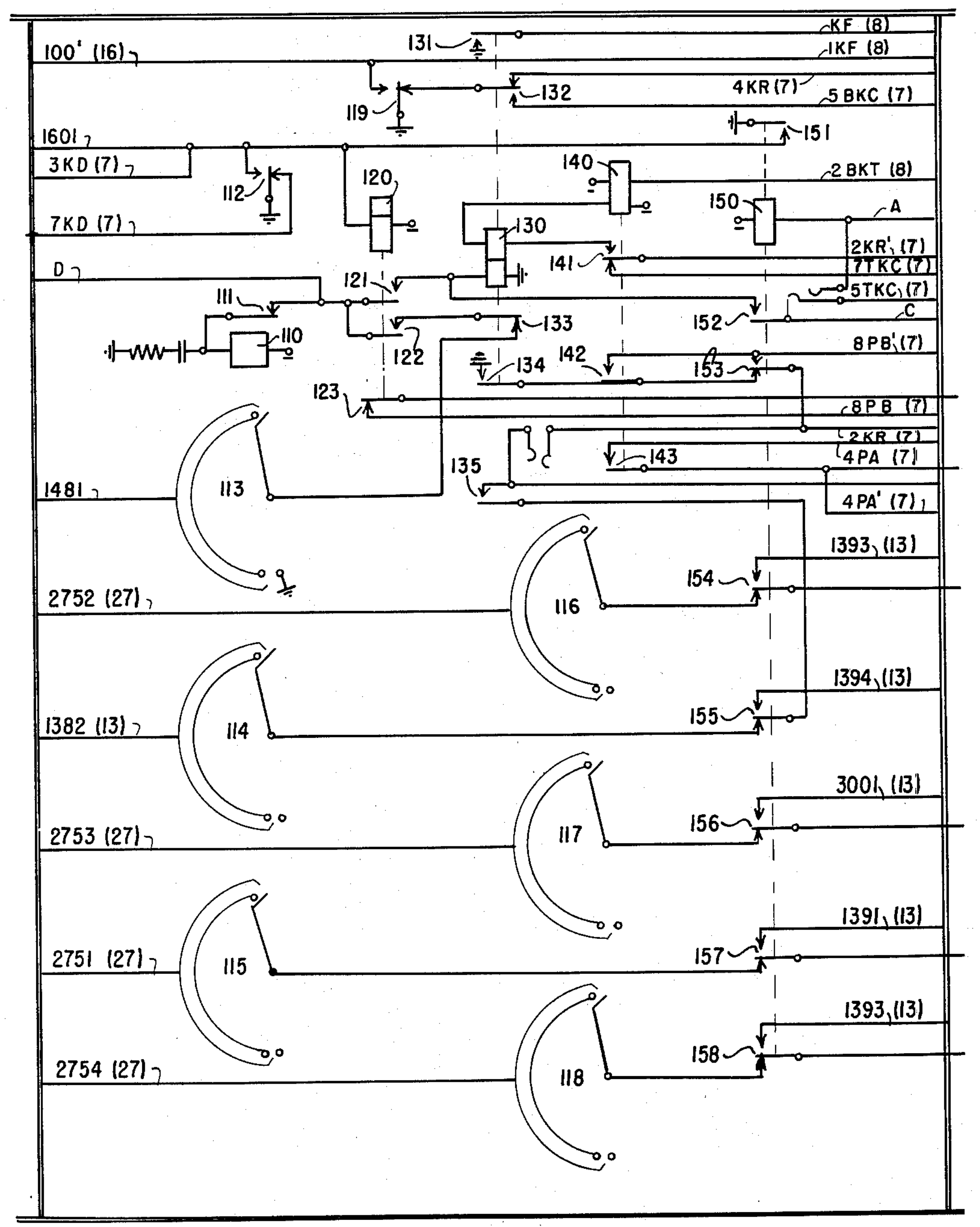
Figure 2:
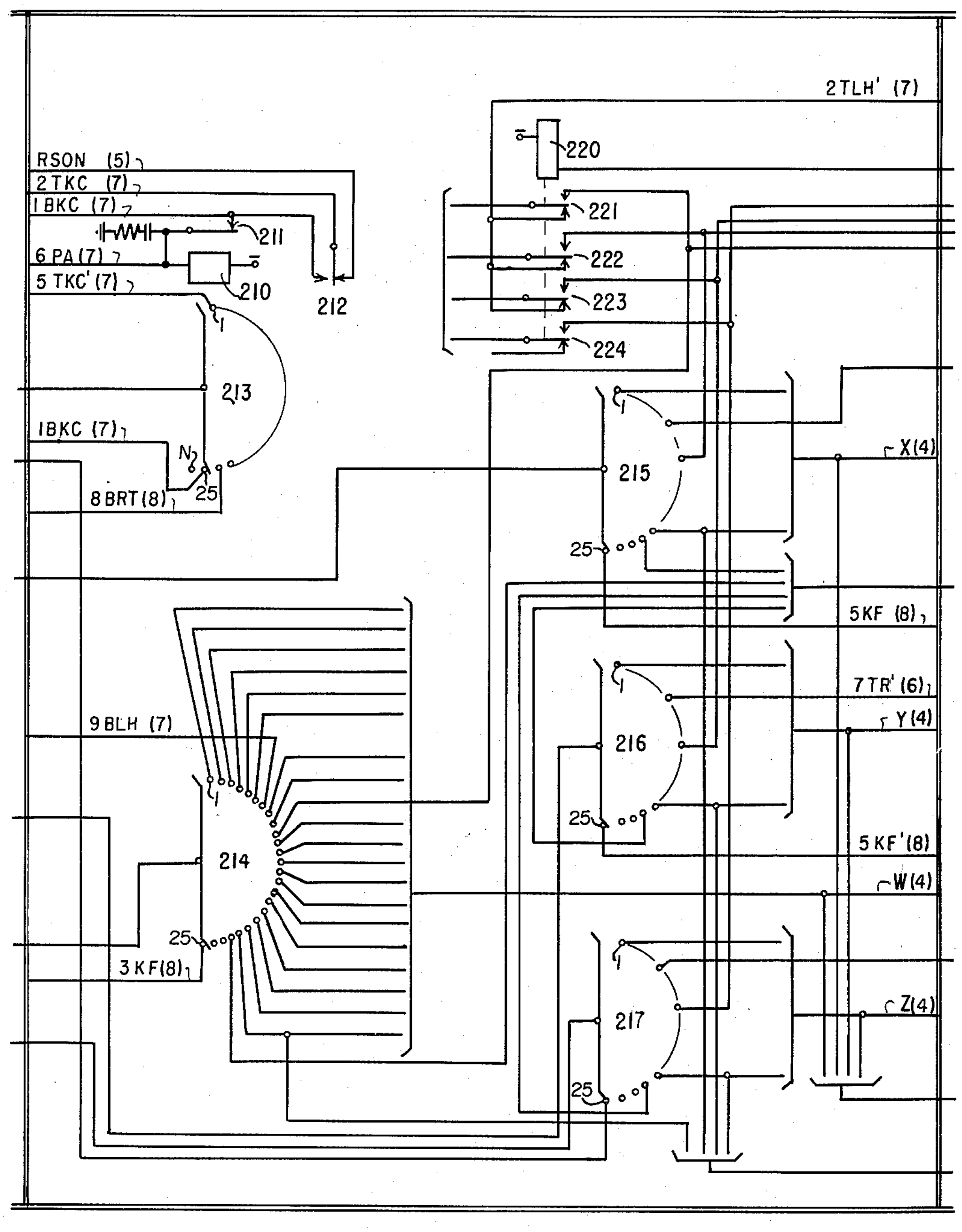
Figure 3:
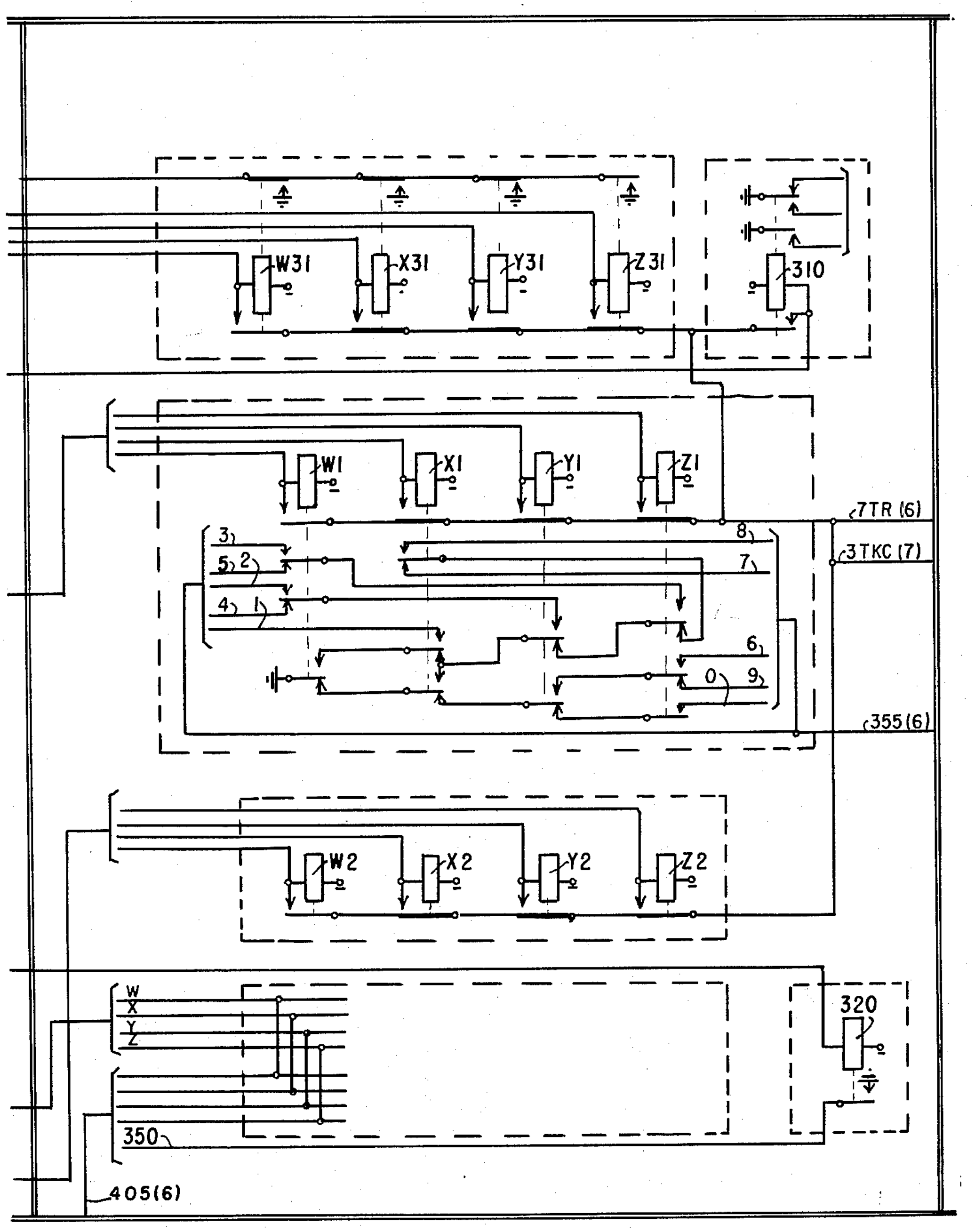
Figure 4:
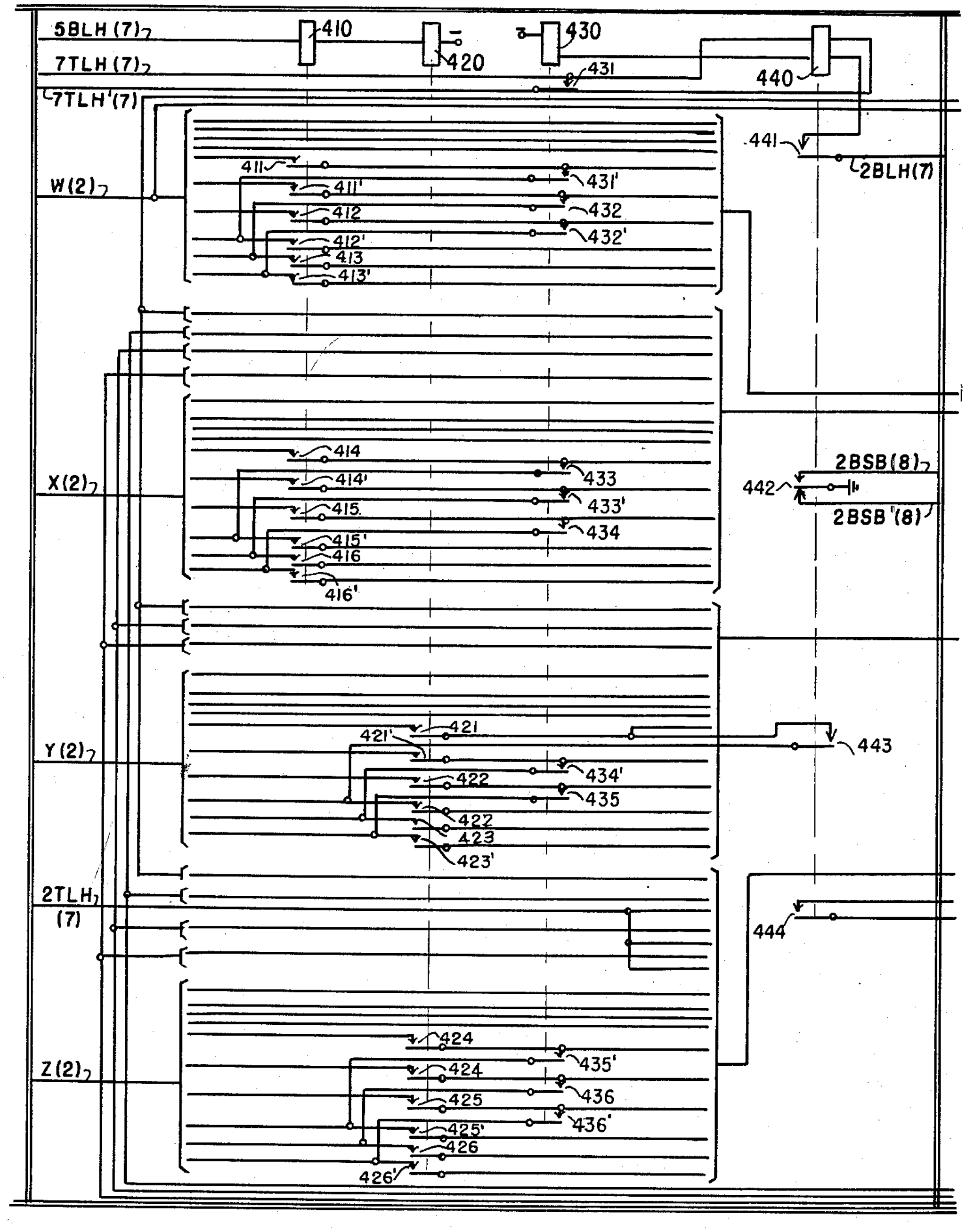
Figure 5:
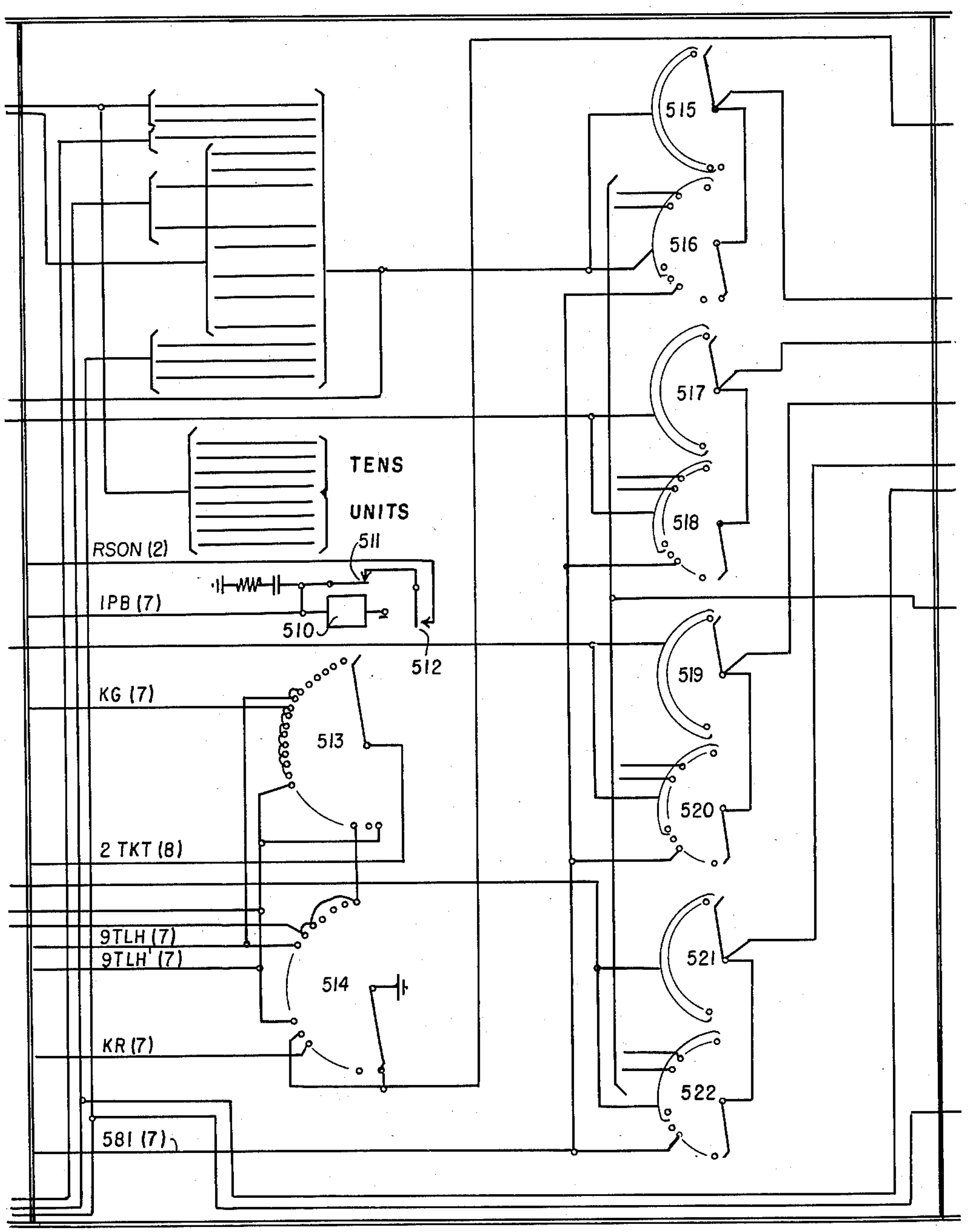
Figure 6:
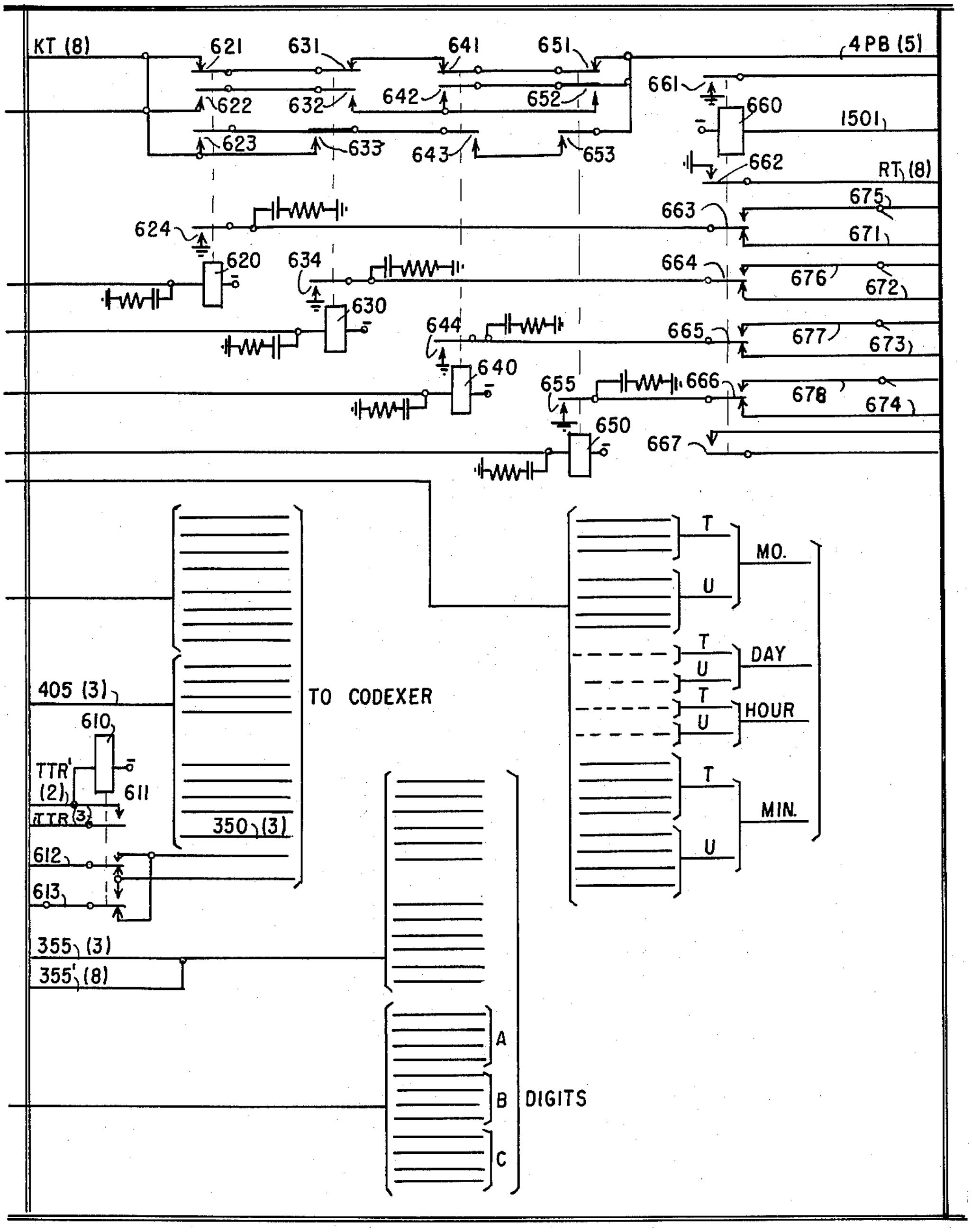
Figure 7:
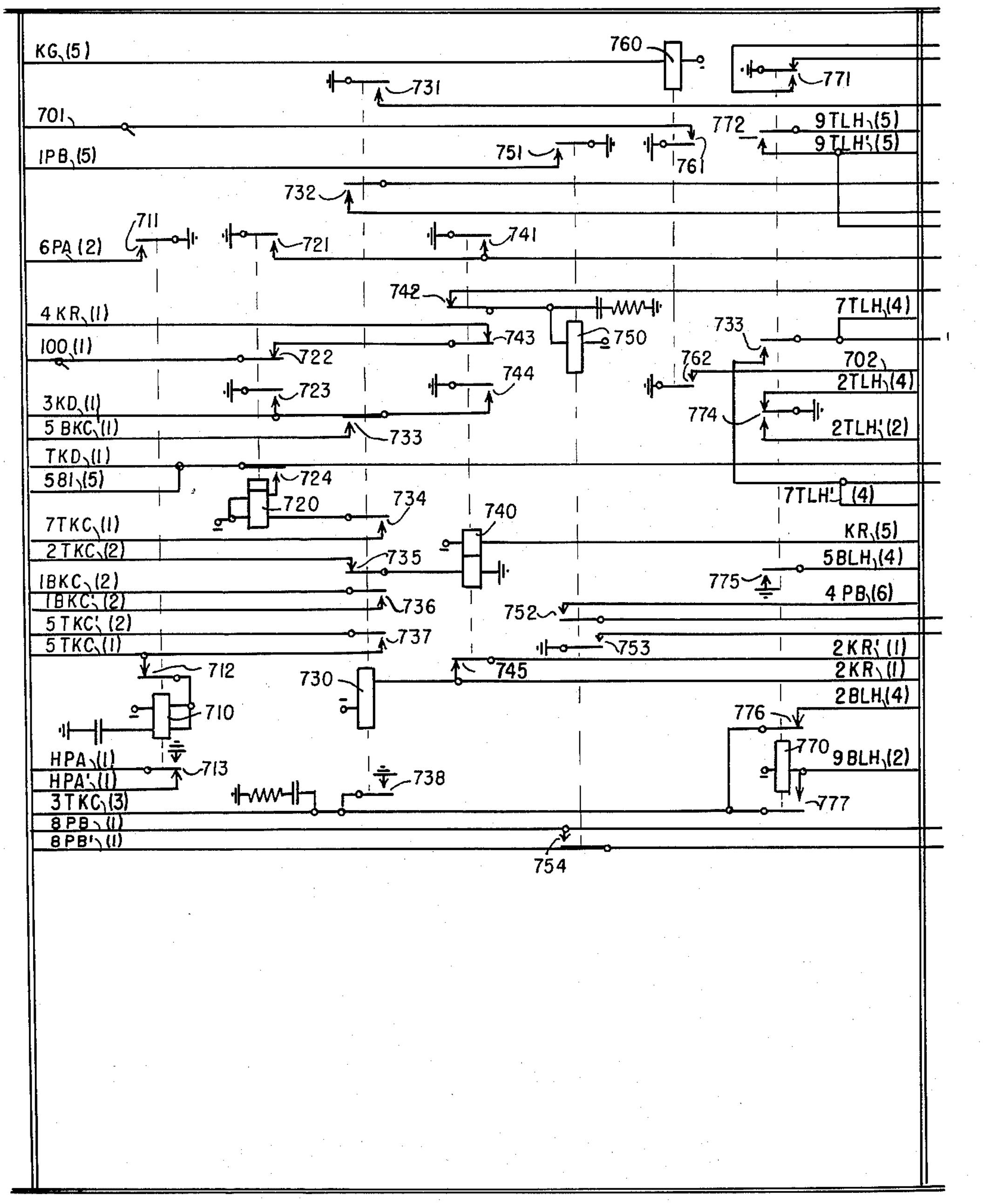
Figure 8:
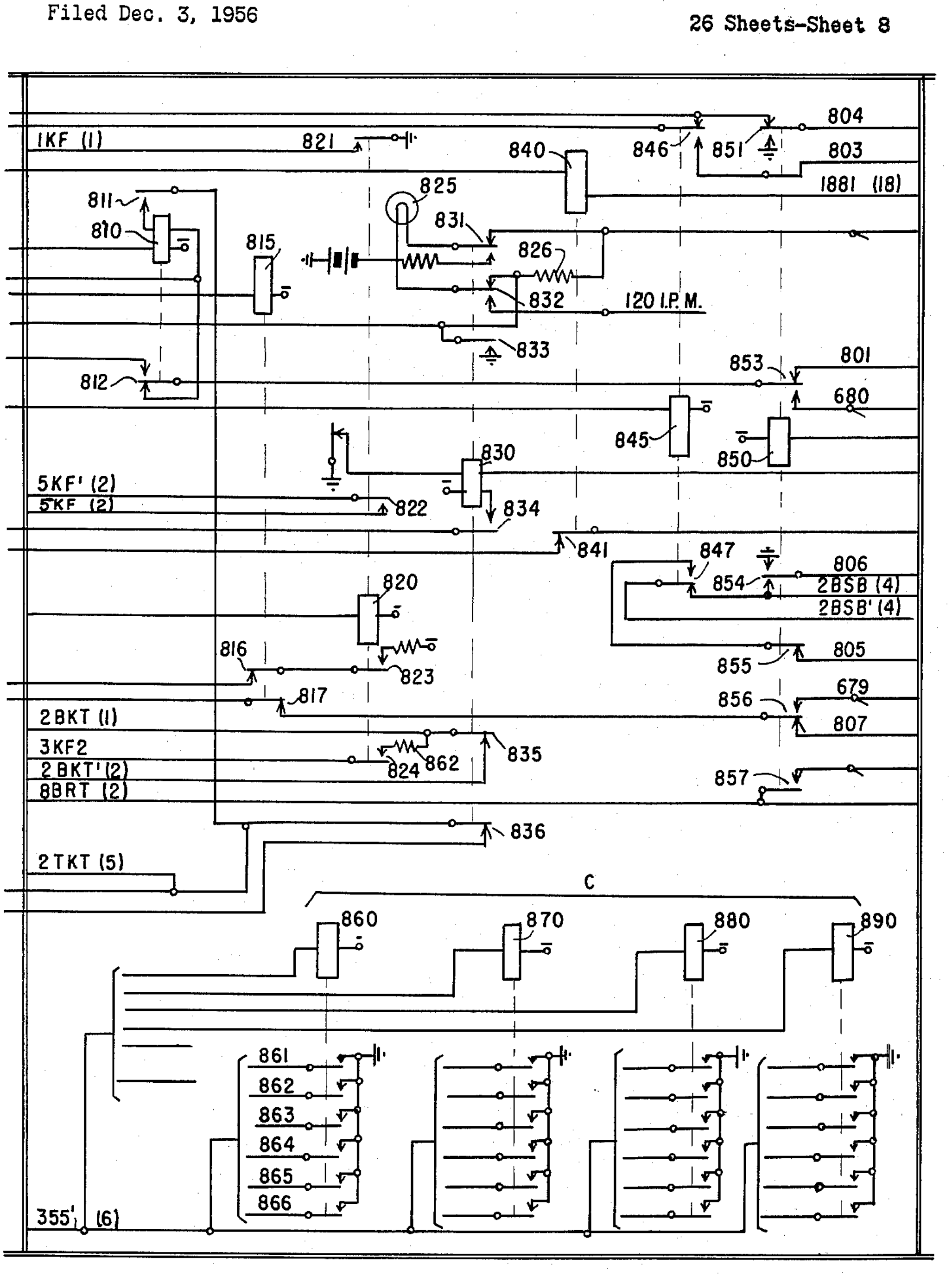

The present invention relates to automatic telephone systems and more particularly to automatic recording apparatus operative to record given particulars of certain calls in the system. More particularly, the present invention relates to improvements in telephone systems of the character disclosed in the copending application of Harry N. Newstedt, Serial No. 582,207, filed May 2, 1956, now Patent No. 2,865,998, and for use in a telephone system of the character disclosed in the copending application of John E. Ostline, Ivan V. Coleman and Jack W. Taugner, Serial No. 628,474, filed December 3, 1956.

In a telephone system serving a large metropolitan area and the adjacent suburban areas, it is usually desirable to divide the system into a plurality of zones and to handle calls between the exchanges in different zones and between certain of the exchanges in the same zones as toll calls, for which charges are made, depending upon the distance between the zones or the distances between the exchanges in the same zone, and the time duration of the call. In accordance with conventional practice, the connections for calls of this type can be set up with the aid of an operator, which operator supervises the call and manually records upon a toll ticket certain particulars pertaining to the call, including the identity of the calling and called zones, the identity of calling and called exchanges, the line terminal number of the calling and called lines, the rate applicable to the call, the time duration of the connection, and possibly the total cost of the call.

While systems of the type described are satisfactory in operation, they require the services of a large number of operators and necessitate some delay in extending calls of the type mentioned while the information concerning the calling and called subscriber substations is being transferred from the calling subscriber to the operator.

In an automatic toll ticketing system of the type disclosed in the above mentioned Newstedt application, the area served by the telephone system is divided into a plurality of zones and each zone includes one or more telephone exchanges. Telephone connections established between the subscribers in the different exchanges in the different zones and between the subscribers in different exchanges in the same zone are handled on a toll basis so that the charges for the connections may be assessed against the calling subscriber substations in accordance with the distance between the originating and terminating exchanges and the time duration of the completed telephone connection. Each telephone connection is established automatically under control of a calling subscriber dial and a record is produced of the particulars concerning the connections, including the office code digits identifying both the calling and the called exchanges, the numerical digits identifying both the calling and the called subscriber substations, and other pertinent particulars, such as the rate of charge applicable to the connection, the duration thereof, the date, and possibly the toll charge for the connection.

These telephone connections are automatically completed from a calling subscriber substation to a desired called subscriber substation under control of register sending apparatus provided in the originating exchange. In extending a connection, the calling subscriber, after removing his receiver, merely operates his calling device in accordance with the directory number of the desired called subscriber substation which number includes a three digit office code portion comprising the first two letters of the called exchange name and a digit identifying the particular called exchange identified by the exchange name, and a numerical portion comprising four digits designating the called subscriber substation in the particular called exchange. Consequently, each subscriber directory number normally constitutes a seven digit number. The first three digits dialed by a calling subscriber are registered in a register sender and they are translated into one or more routing digits by a common translator so that the particular call will be properly routed by way of automatic switching apparatus to the particular called exchange. The first three digits dialed by the calling subscriber also control the register sender to thereafter transmit certain of the first three digits identifying the called exchange and then all of the digits constituting the numerical portion of the called subscriber directory number. From the foregoing it will be understood that the register sender will first transmit the routing digits, then certain predetermined digits of the called exchange code, and finally the four digits constituting the numerical portion of the called subscriber directory number.

In the above mentioned Newstedt application the register sender is automatically associated with the calling subscriber line in response to the initiation of a call and thereafter the digits of the called subscriber directory number are registered therein. As the result of the association of the register sender with the calling of a subscriber line and prior to the transmission of a dial tone signal indicating that the dialing of the called subscriber number may be started, the register sender functions to test the calling line to determine the class thereof. After the first three digits of the called subscriber directory number have been registered in the register sender, a common translator mechanism is automatically associated with the register sender in order to perform the translation operations previously noted above whereby appropriate routing digits are registered in the register sender. As soon as the translating function is completed, the translator mechanism is disconnected from the register sender and rendered available to perform the translation operation for any of the remaining register sender included in the exchange. Thereafter the register sender functions to transmit the routing digits registered therein, then certain of the digits of the called exchange code as determined by the translator mechanism and finally the digits of the numerical portion of the called subscriber directory number. These digits control appropriate switching apparatus in the telephone network in order to complete the connection to the desired called subscriber substation. During the establishment of the above mentioned connection, various items of record information pertaining thereto, such as the directory numbers of both the calling and called subscriber substation, the rate of charge for the call and other pertinent items of information are transmitted to and temporarily registered in a toll ticket repeater included in the connection, so that a record may be produced of the items of information and charged against the calling subscriber in response to the release of the completed telephone connection.

The toll ticket repeater included in the telephone connection as noted above, is provided with timing apparatus for accumulating and registering the total elapsed time of the connection so that a record may also be produced of the elapsed time for the purpose of establishing the charge for the call. In response to the release of the connection as noted above, an idle tabulator is associated with the toll ticket repeater so that the items of record information stored in the repeater may be transferred to and stored in the tabulator before the repeater is released and rendered available for another call. The tabulator in turn controls a ticket tape punch mechanism and a record tape mechanism in order to produce, respectively, an individual subscriber record and a common exchange record of the completed toll call. These records may then be used by the operating telephone company to control appropriate business machines in order to produce printed records of the various items of information pertaining to each particular toll call.

While in the automatic toll ticketing telephone system of the type disclosed in the above mentioned Ostline, Coleman and Taugner application, the operation is similar except that a toll access code must be dialed to access the toll ticketing equipment. After which an idle ticketer is associated with the calling line. In response to the dialing of the last digit of the toll access code which must always be a "0," the calling station's directory number is detected and recorded in the ticketer. Then the dialing of the called zone and called exchange digits, of a call to a toll zone, a transender in the exchange will register these dialed digits and will then cause an idle translator to be associated with the transender. A detailed explanation of this unit may be found in the Ostline, Coleman, Taugner, copending application, Serial No. 628,474, filed December 3, 1956. It is a unit for pulsing the outgoing code digits for routing the call as determined by the translator unit. The remaining digits of the called subscriber number, dialed by the calling subscriber, will be registered in the ticketer. The transender will then transmit switch setting impulses corresponding either to the value of the digits registered therein or to a translation of a certain portion of the registered digits, followed by impulses corresponding to the value of the remaining registered digits depending upon the routing path over which the connection is to be completed to the called exchange. A translation is usually made of the first three digits registered in a transender whereby one or more routing digits may be transmitted by the transender for the purpose of setting up the connection. Facilities are also provided in the transender ticketer for transmitting, as registered, one or more of the first three registered digits and each of the four remaining registered digits of the called suscriber number.

During the setting up of a connection to the called subscriber line under the control of the transender and ticketer, the ticketer will remain in the circuit for the purpose of reisgtering and storing various items of record information which are temporarily registered therein. The information registered therein includes the calling subscriber number, the called office code digits and the called subscriber number, involved in the connection. As soon as a connection is completed between the calling and the called subscribers, the ticketer will time the call and in response to the release of the connection, the ticketer will have registered therein the above-mentioned items of information plus the duration of the call. Following the release of the connection, the ticketer will cause a tabulator to be associated therewith and it will transfer all of the items of information as noted above, including the identity of the ticketer to the tabulator. The tabulator will control a tape perforator to produce a record of the completed call. The tape perforator will record the month, day, hour and minute of the time of termination of the call, the complete directory number of the calling line and the called line, the time duration of the call and the rate applicable to the call.

Accordingly, it is the main object of the present invention to provide an automatic toll ticketing telephone system for use in relatively small exchanges, which is economical to manufacture and install, and which provides the necessary facilities for producing a permanent record of each toll connection.

It is another object of the invention to provide an improved toll ticketing repeater of the type noted, which is arranged to record each unit of elapsed conversational time during an established connection.

It is still another object of the present invention to provide in an automatic toll ticketing telephone sysem of the type noted, improved circuits and apparatus for determining the charge rate applicable to each of the calls.

It is still another object of the present invention to provide in an automatic toll ticketing telephone sysem of the type noted, improved circuits and apparatus for recording a change in the charge rates during the conversational time of an established connection.

Further objects and features of the invention pertain to the particular arrangement of the circuit elements and the apparatus of the automatic ticketing telephone system whereby the above outlined and additional operating features are obtained.

Figure 19:
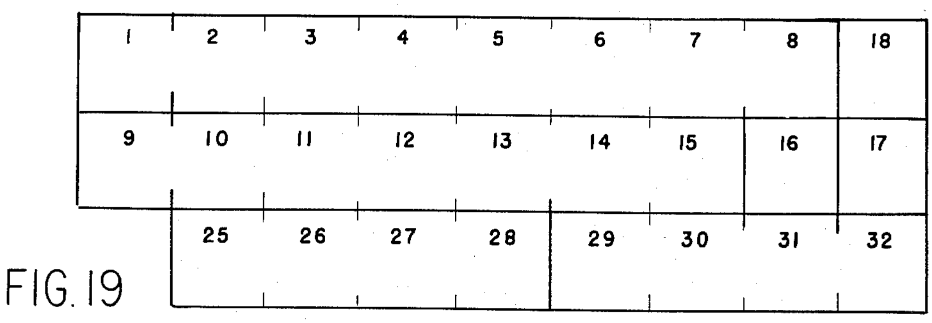

The invention, both as to its organization and method of operation, together with further objects and advantages thereof, will best be understood by reference to the following specification taken in connection with the accompanying drawings in which Figs. 1 to 18 and 20 to 27 inclusive illustrate the necessary details of the apparatus incorporated in the exchange, Fig. 19 illustrates the manner of combining the illustrations.

Referring now to Figs. 1 to 8 of the drawing, it will be seen that the apparatus disclosed therein is the tabulator circuit.

This circuit's function is to forward toll call ticketing data to tape perforators. The toll call ticketing data consists of information received from the ticketer, the dater-timer, and from the tabulator itself.

The information received from the ticketers consists of the ticketer identity number (three digits), conversation time (three digits), called number (seven, ten or eleven digits), calling number (five digits), and a possible change in rates during call conversation timing indication. The information received from the dater-timer consists of the calendar date (day and month), the time of day and a day or night rate indication. The dater-timer is directly connected to the tabulator via a dater-timer transfer circuit. The information connected directly within the tabulator is the tabulator identity (two digits) and the ABC office code (three digits) of the calling party.

The calling number received from the ticketer is composed of four terminal digits and an office code unit. The office code unit is a special marking to one of ten relays, each of which represents a separate office. Thus, the tabulator is capable of supplying a maximum of ten ABC office codes to the tape perforator.

The tabulator provides for access to as many as fifty ticketers. Under control of the tabulator allotter, it will hunt for and find a ticketer calling for a tabulator.

All data received from the ticketer is stored on relays in the tabulator prior to being forwarded to the tape perforator.

When the punched tape is processed for printing a ticket or punching a record card, the tape roll is removed and fed into other equipment in the reverse direction from that of the original punching.

In order that the ticket or punching card come out with a "straight" record of the call, all data is sent in reverse order from the ticketer to the tabulator and from the tabulator to the tape perforators.

Figure 9:
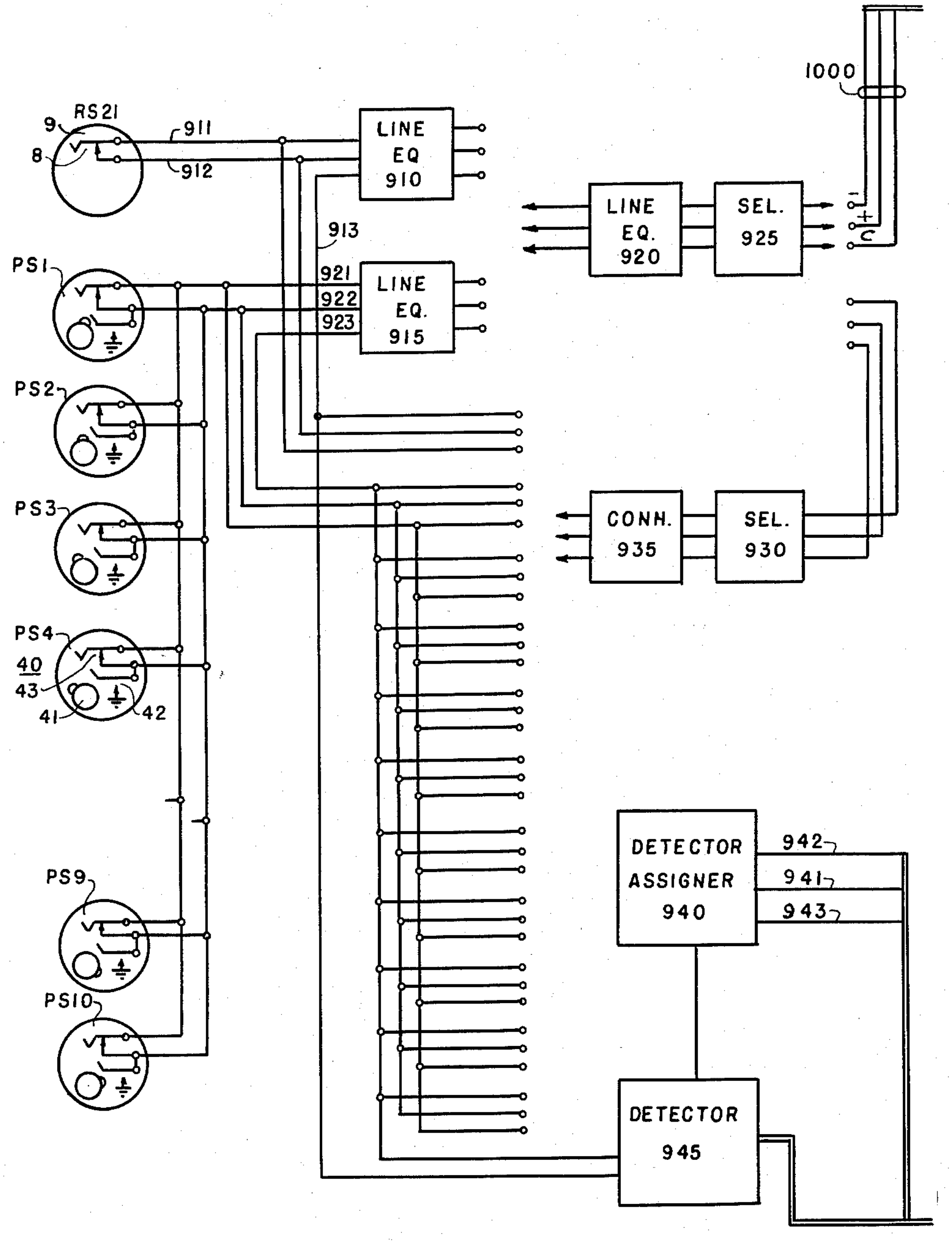
Figure 10:
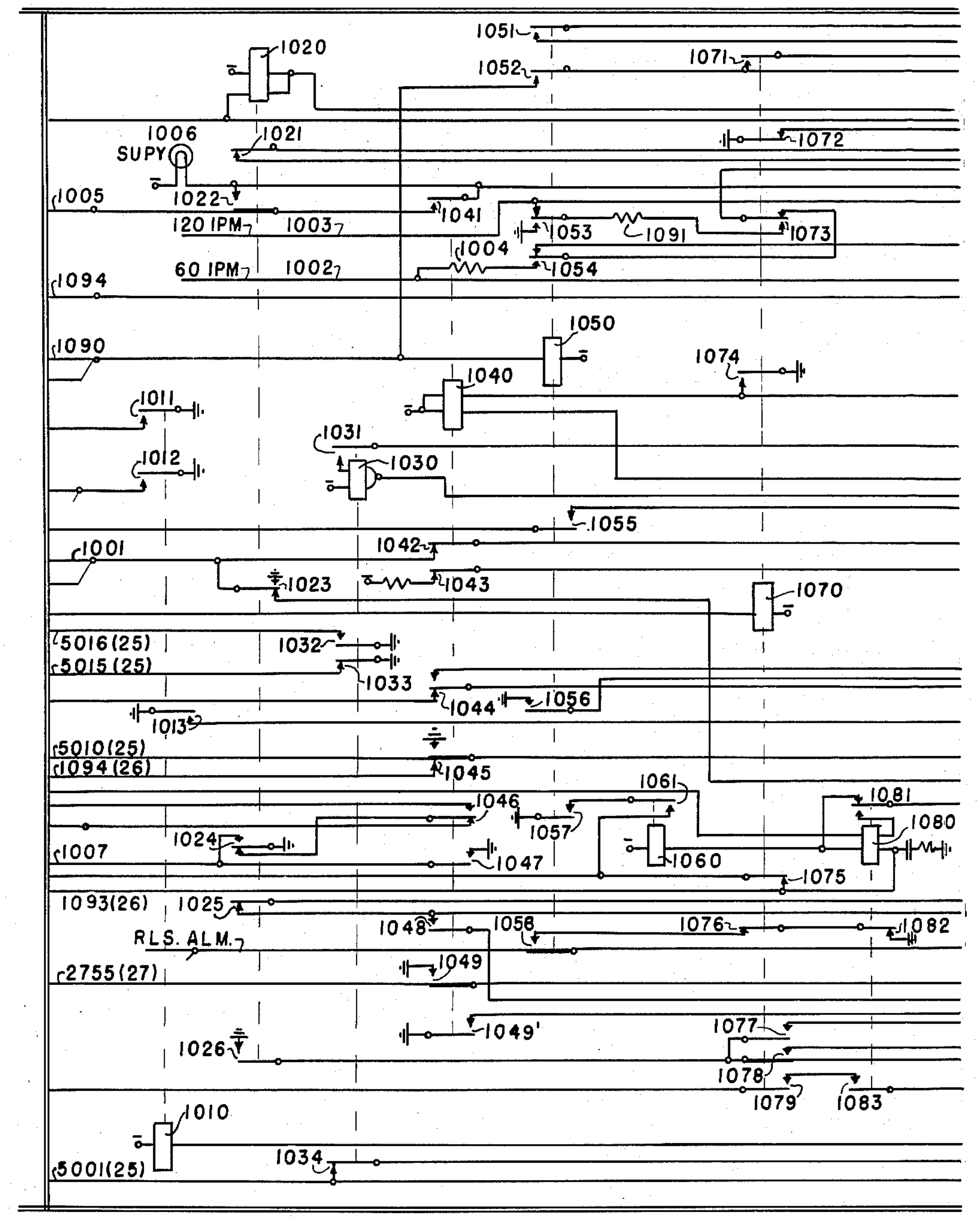
Figure 11:
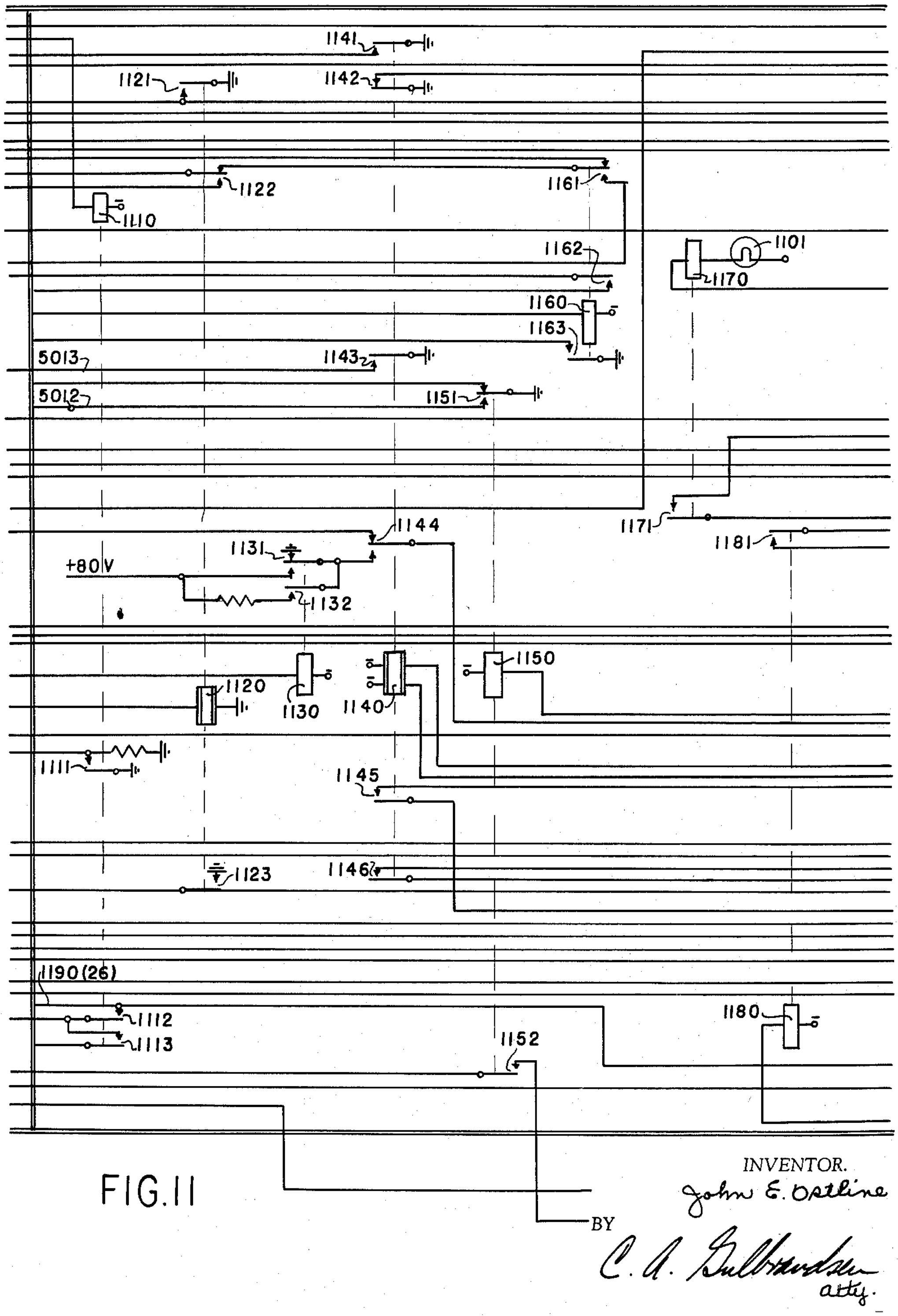
Figure 12:
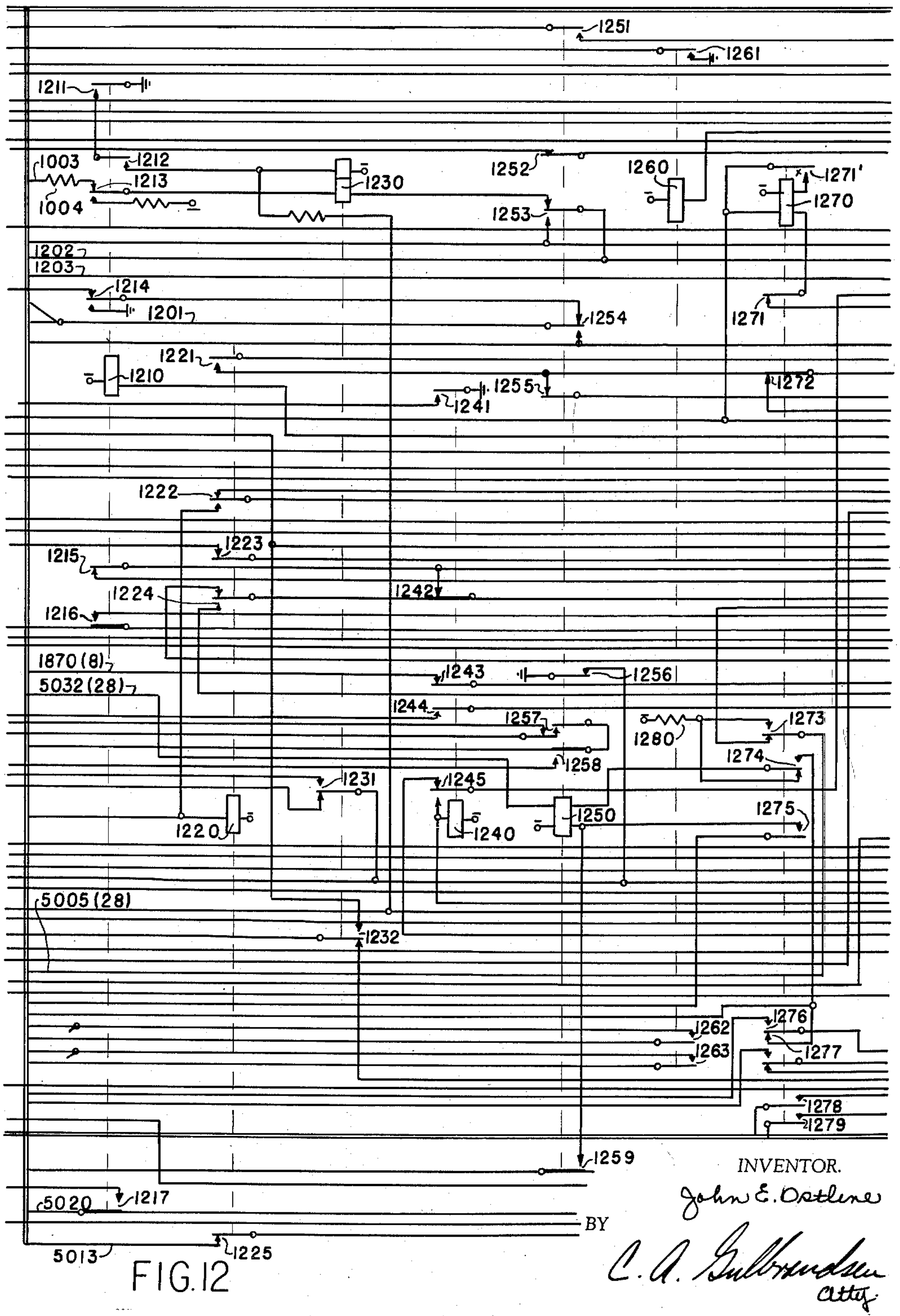
Figure 13:
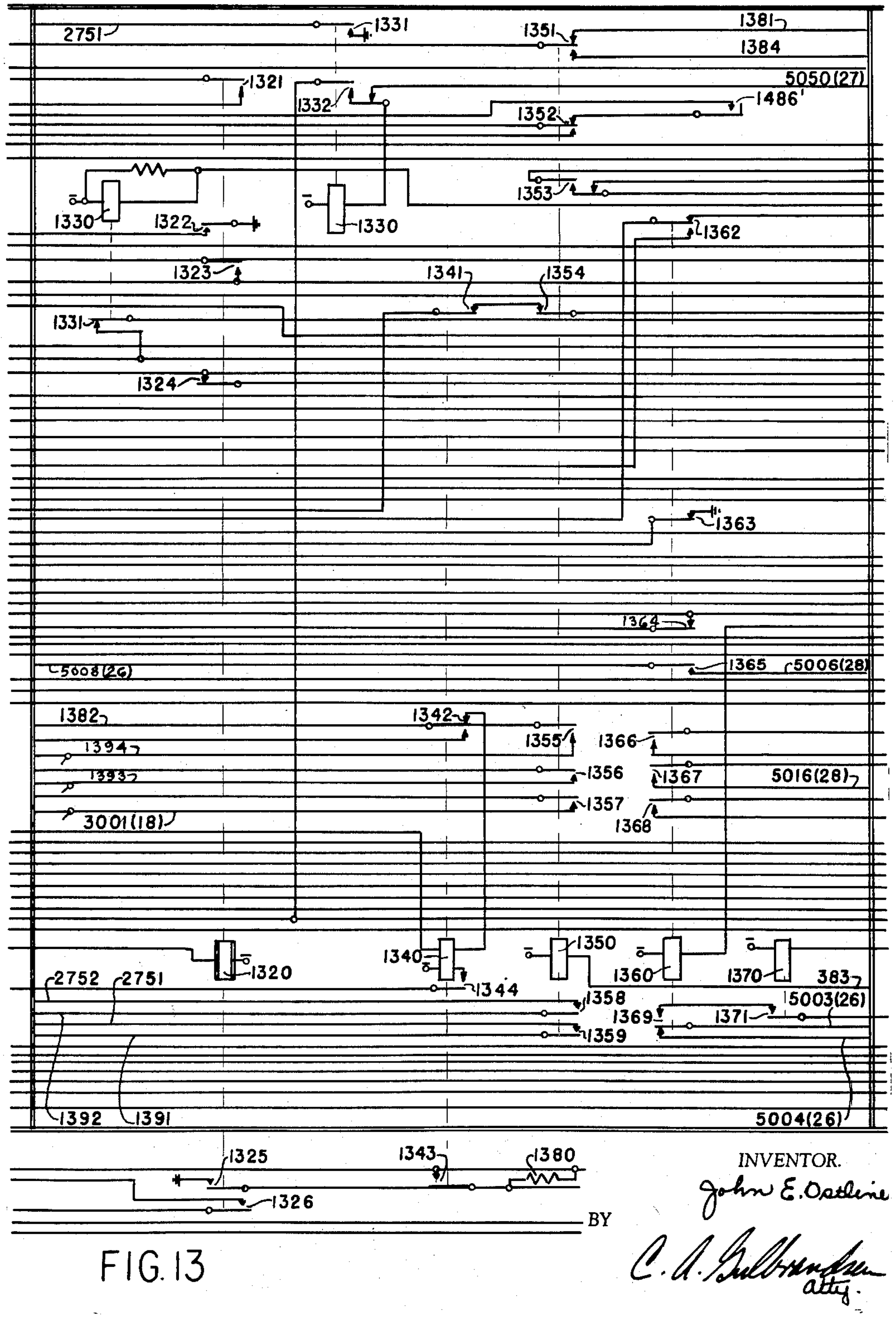
Figure 14:
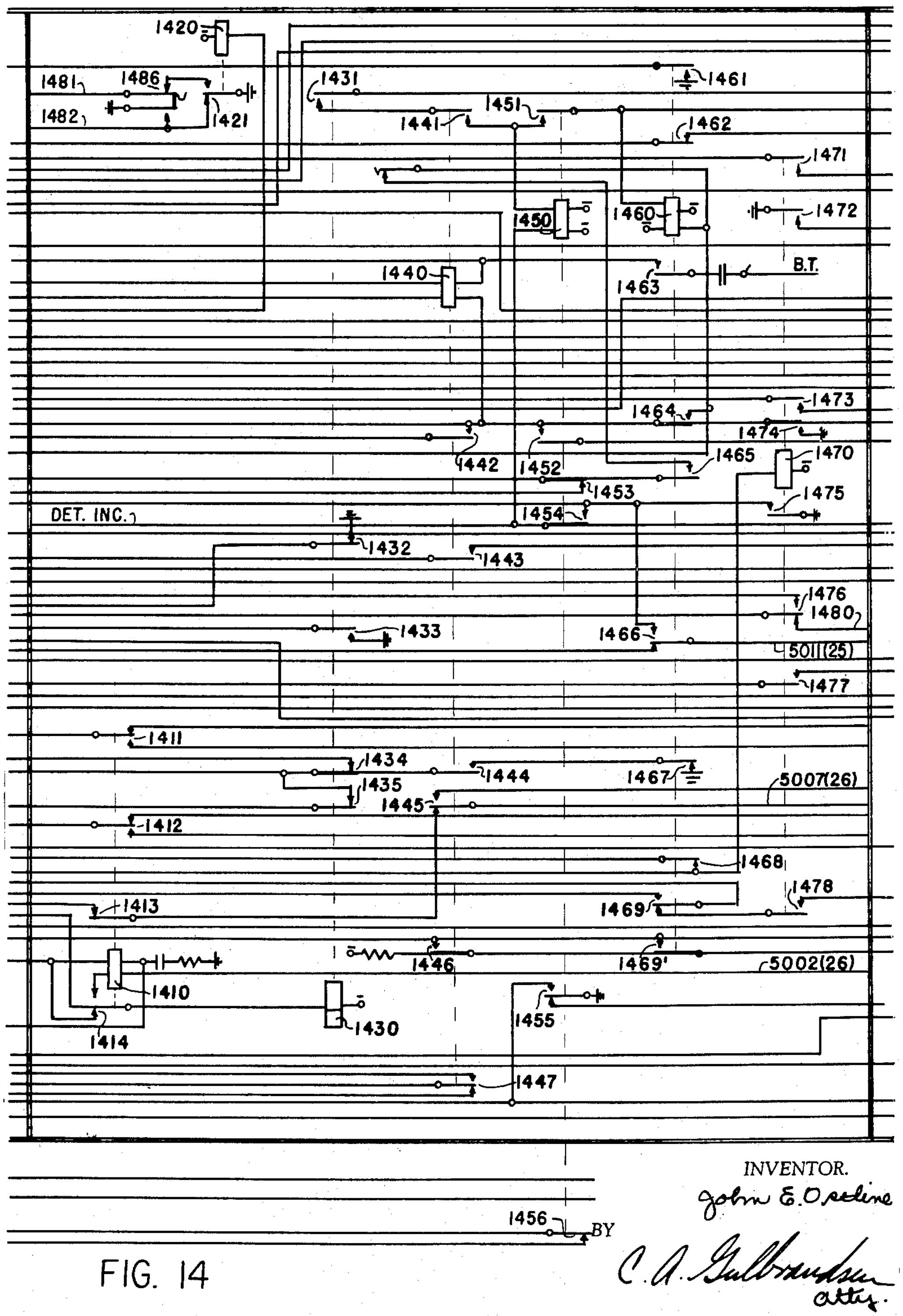
Figure 15:
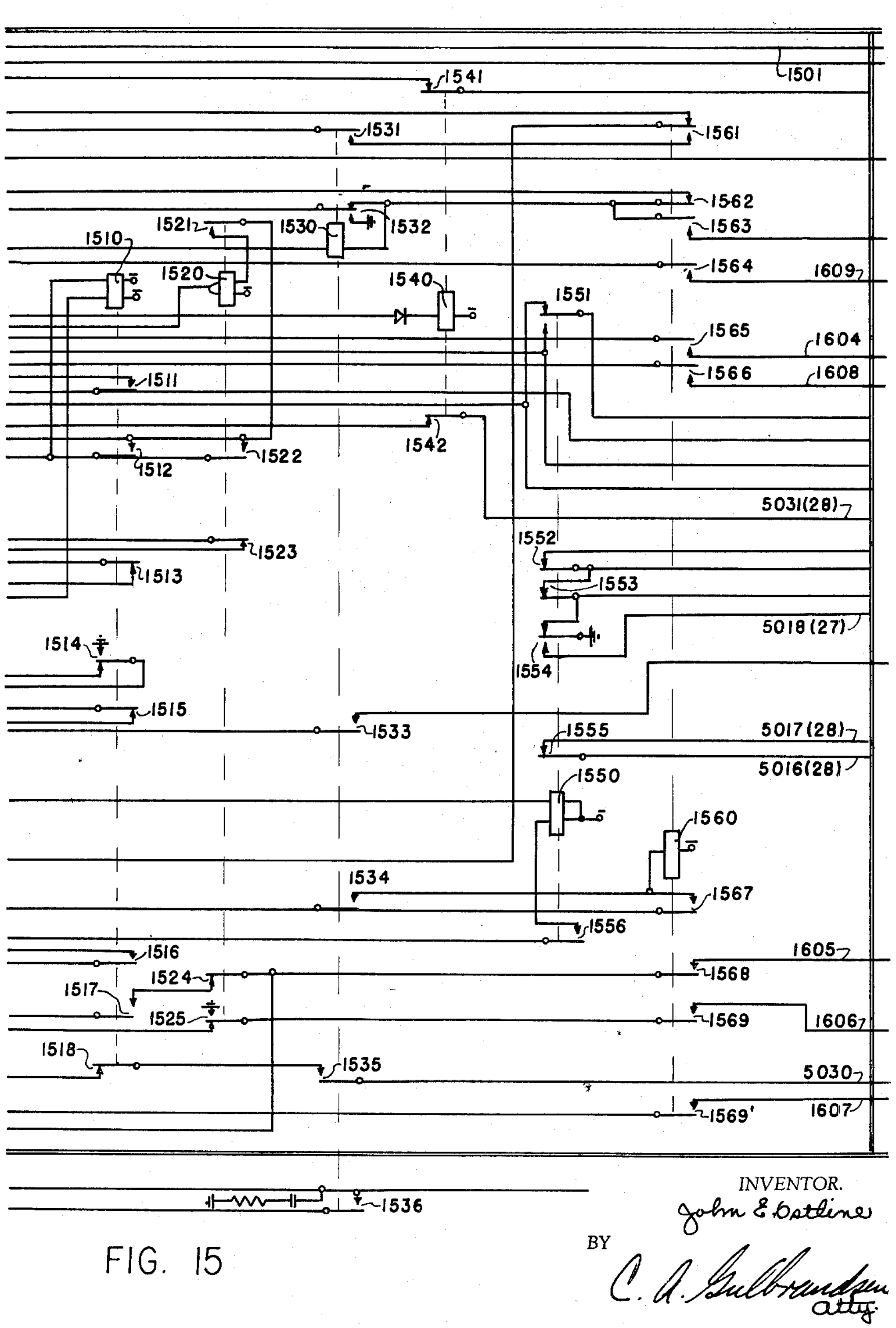

Fig. 9 of the drawing discloses schematically in block diagram form some of the switching equipment of the exchange, and also includes in block form the detector and detector assigner. The detector and detector assigner are shown in detail in the copending Ostline application, Serial No. 625,833, filed Dec. 3, 1956.

Figs. 10 to 15, 20 and 25 to 27 inclusive disclose in schematic form the details of the ticketer circuit. This circuit on locally originated calls, is seized from a local selector. On calls originating in a branch office, it is seized from an incoming trunk circuit. It can handle both: (1) Seven digit toll calls consisting of the ABC office code and four terminal numbers and (2) ten or eleven digit toll calls into a foreign area consisting of a three digit area code, the ABC office code, and four or five terminal numbers.

In this type of toll ticketing system, it is necessary to dial an access code to seize this circuit. The last digit of the access code is always the party identification digit "0." On locally originated calls, the party identification digit "0" is the first digit dialled into this circuit.

The principal functions of the ticketer are as follows:

(*a*) It tests the insulation resistance of the calling line to ground to prevent incorrect party identification on locally originating calls.

(*b*) It calls for a transender when seized.

(*c*) On locally originating calls, it determines the party identity and calls for a detection of the calling party's number after the party identification digit "0" has been dialled.

(*d*) It repeats to the transender the office code digits on seven digit calls, and the area code plus the office code digits (if needed) on ten or eleven digit calls.

(*e*) It times the length of conversation from the time the called party answers until the calling party disconnects.

(*f*) It stores the following ticketing information during conversation: the calling number (5 digits only); the called number (7, 10 or 11 digits); and a change in toll rates indication, if it occurs during the call.

(*g*) After the calling party has disconnected, it calls for a tabulator and transfers to it the ticketing information. During this transfer operation, the ticketer is guarded against seizure from another call, but the calling line and the outgoing trunk are released. The ticketer releases after transfer is completed.

(*h*) If the call is not answered, the ticketer releases when the calling party disconnects and no ticketing information is recorded for the call.

Figure 16:
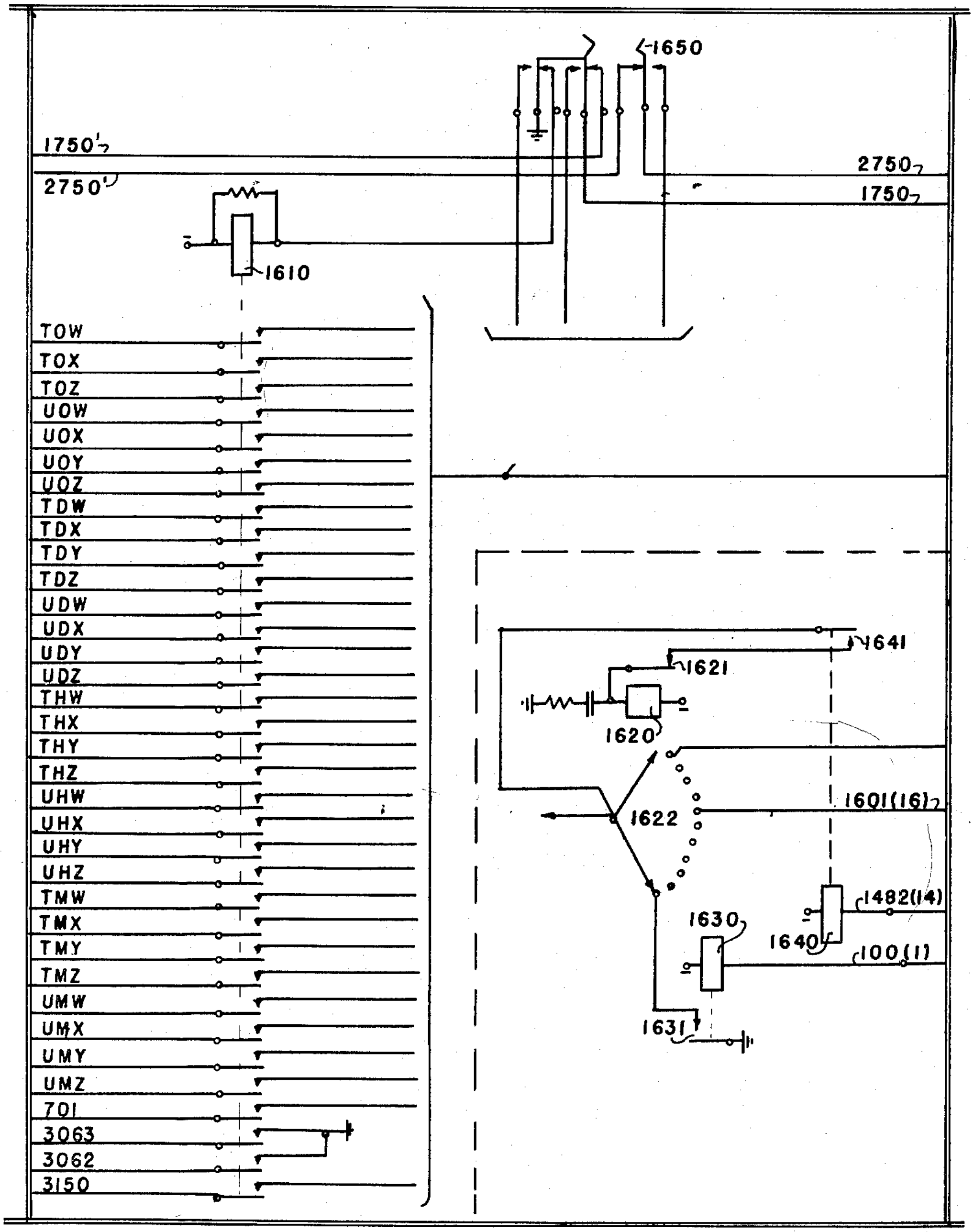

Fig. 16 of the drawing discloses in schematic form a dater-timer transfer circuit and tabulator allotter. The dater-timer transfer circuit consists of a bar relay and transfer key. It provides a means of connecting either of two dater-timers to the same tabulator. The position of the key determines which dater-timer is connected to the tabulator at any one time.

The tabulator allotter circuit consists essentially of a rotary switch and associated relay. An allotter circuit is required for each group of tabulators to select an idle tabulator whenever a ticketer calls for a tabulator. Separate allotters must be furnished for each separate group of tabulators. A group of tabulators may consist of 5 (or less) units.

Figure 17:
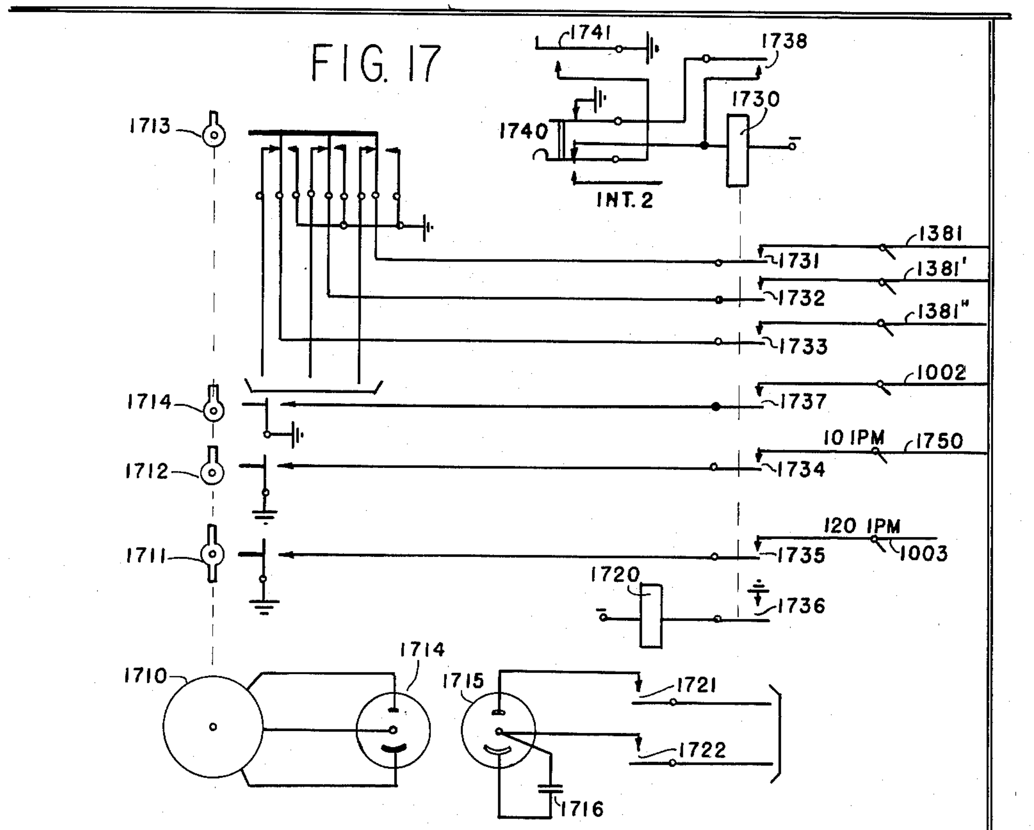

Fig. 17 of the drawing discloses in schematic form the pulse and timing interrupter. This circuit is used in conjunction with the dater-timer and the ticketer.

It provides 10 i.p.m. ground to the dater-timer and 60 i.p.m. ground to the ticketer for conversation timing.

It also provides for automatically replacing the operating interrupter with the alternate interrupter in case the operating interrupter fails. Either interrupter can be made the operating unit.

Figure 18:
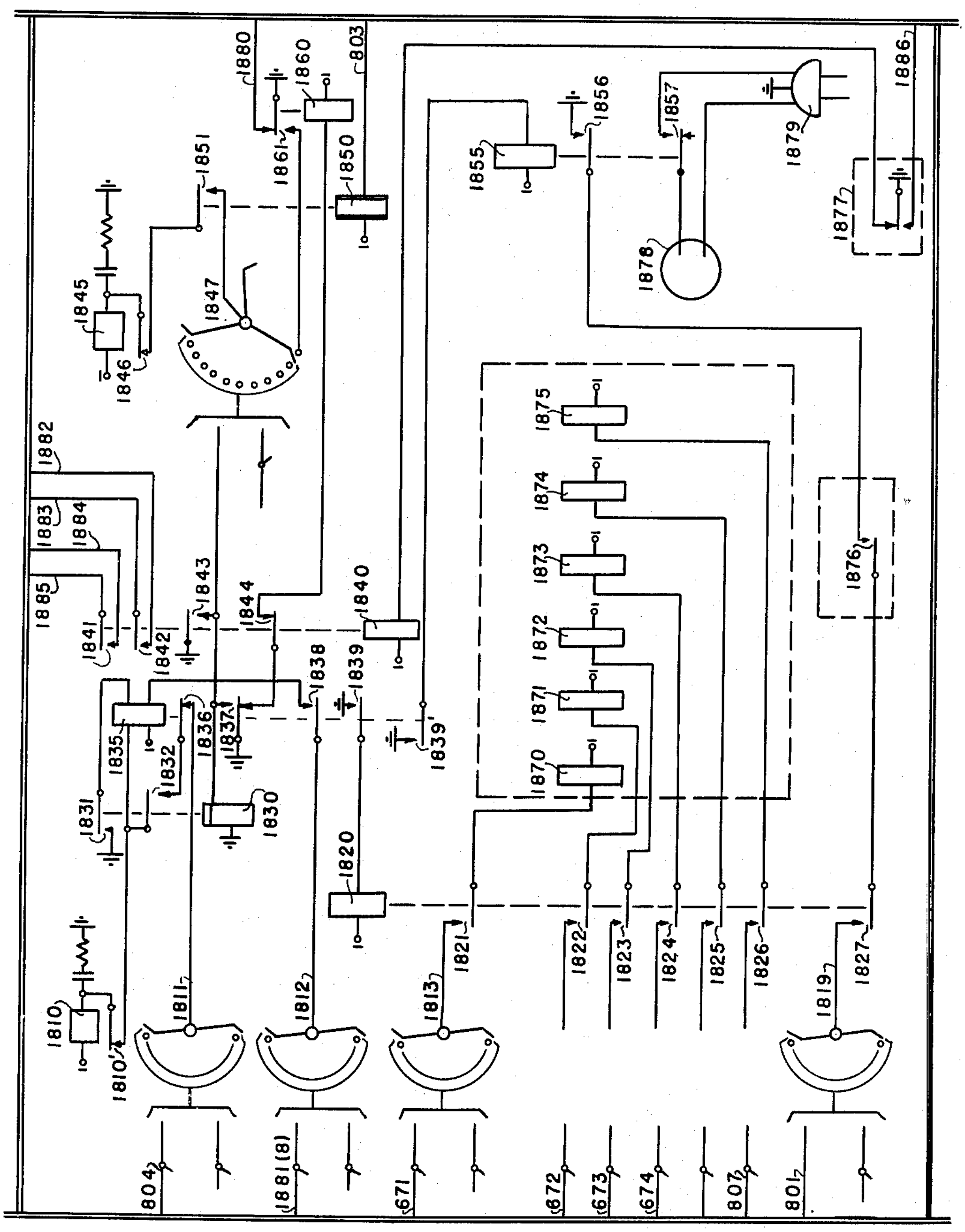
Figure 20:
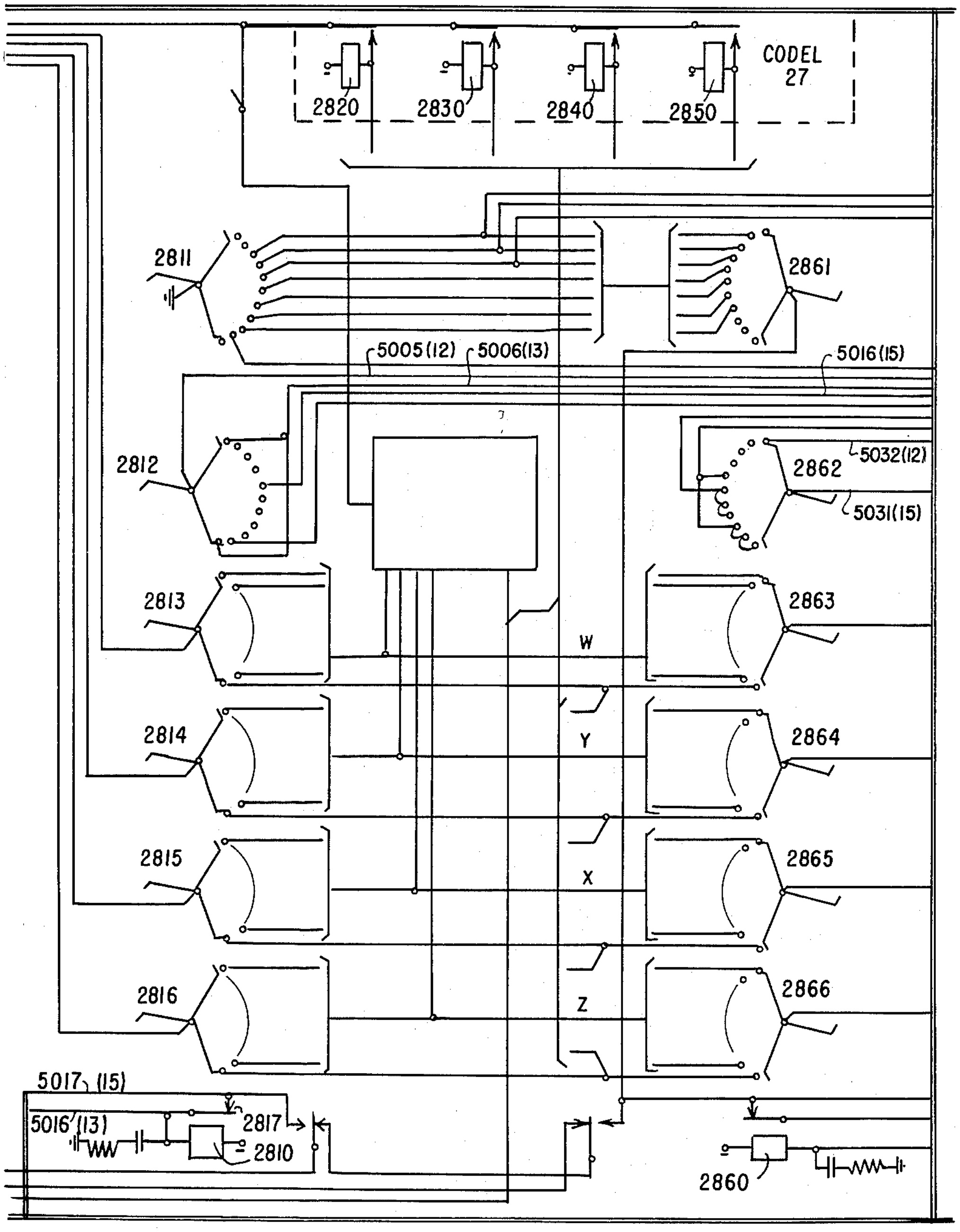
Figure 21:
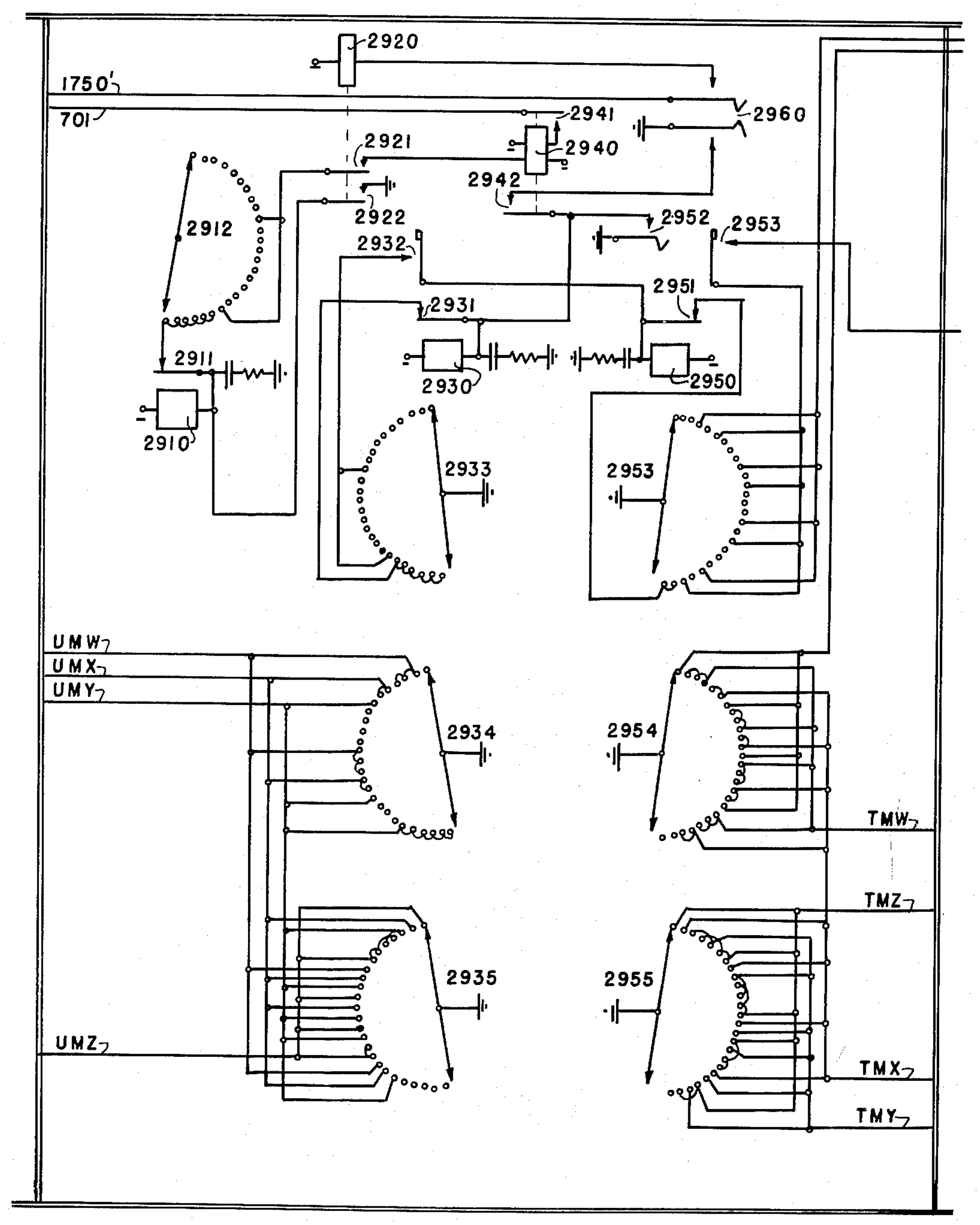
Figure 22:
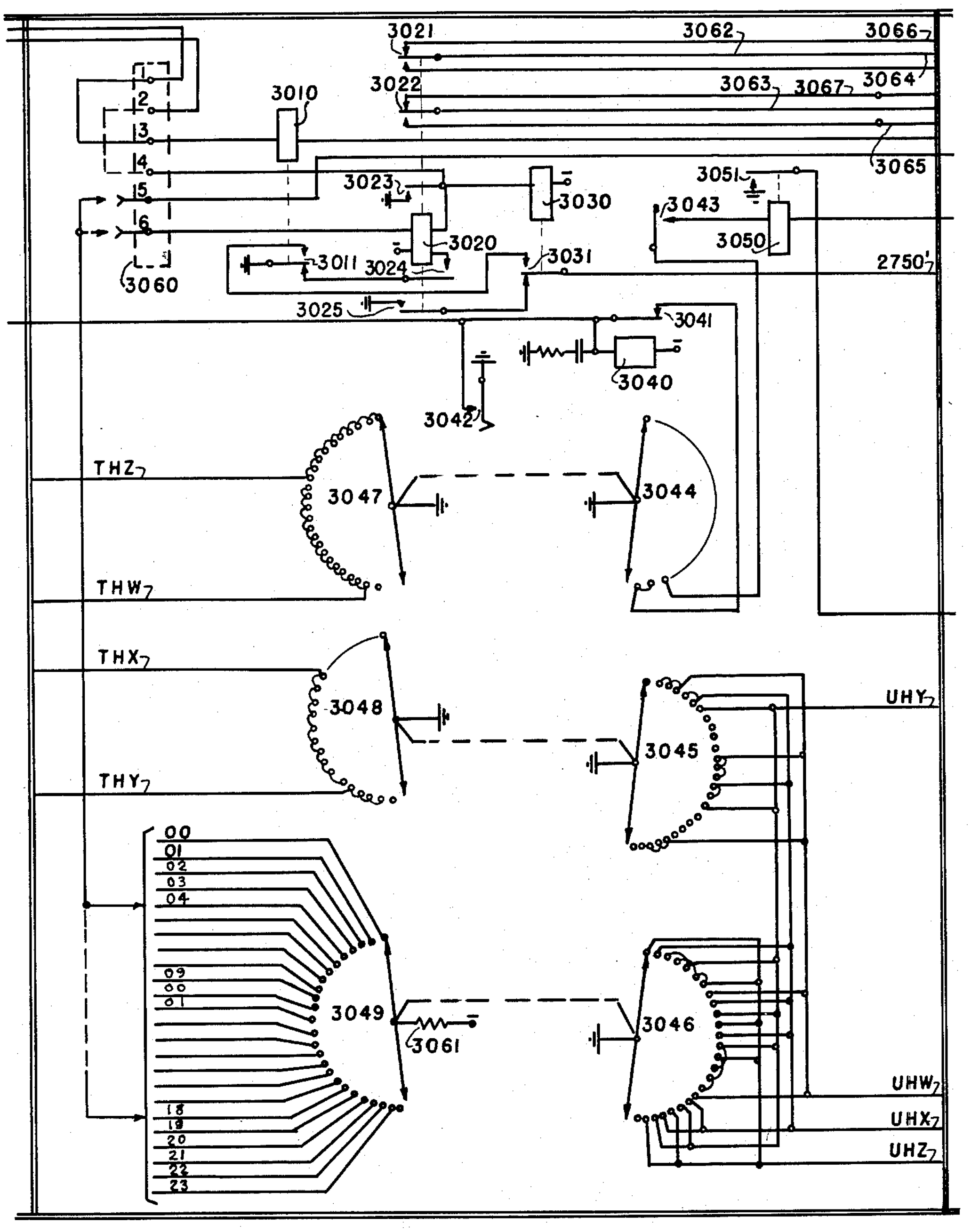
Figure 23:
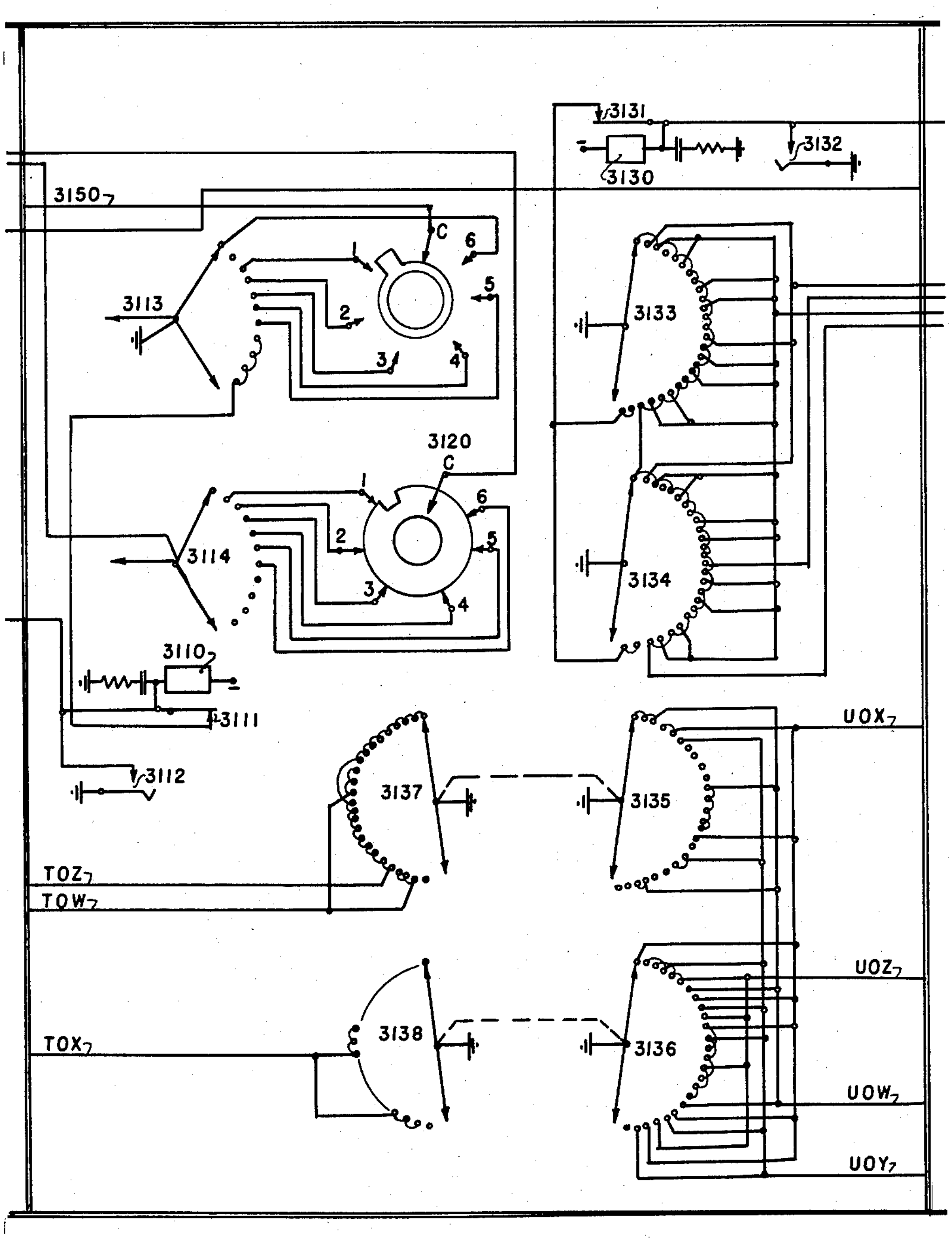
Figure 24:
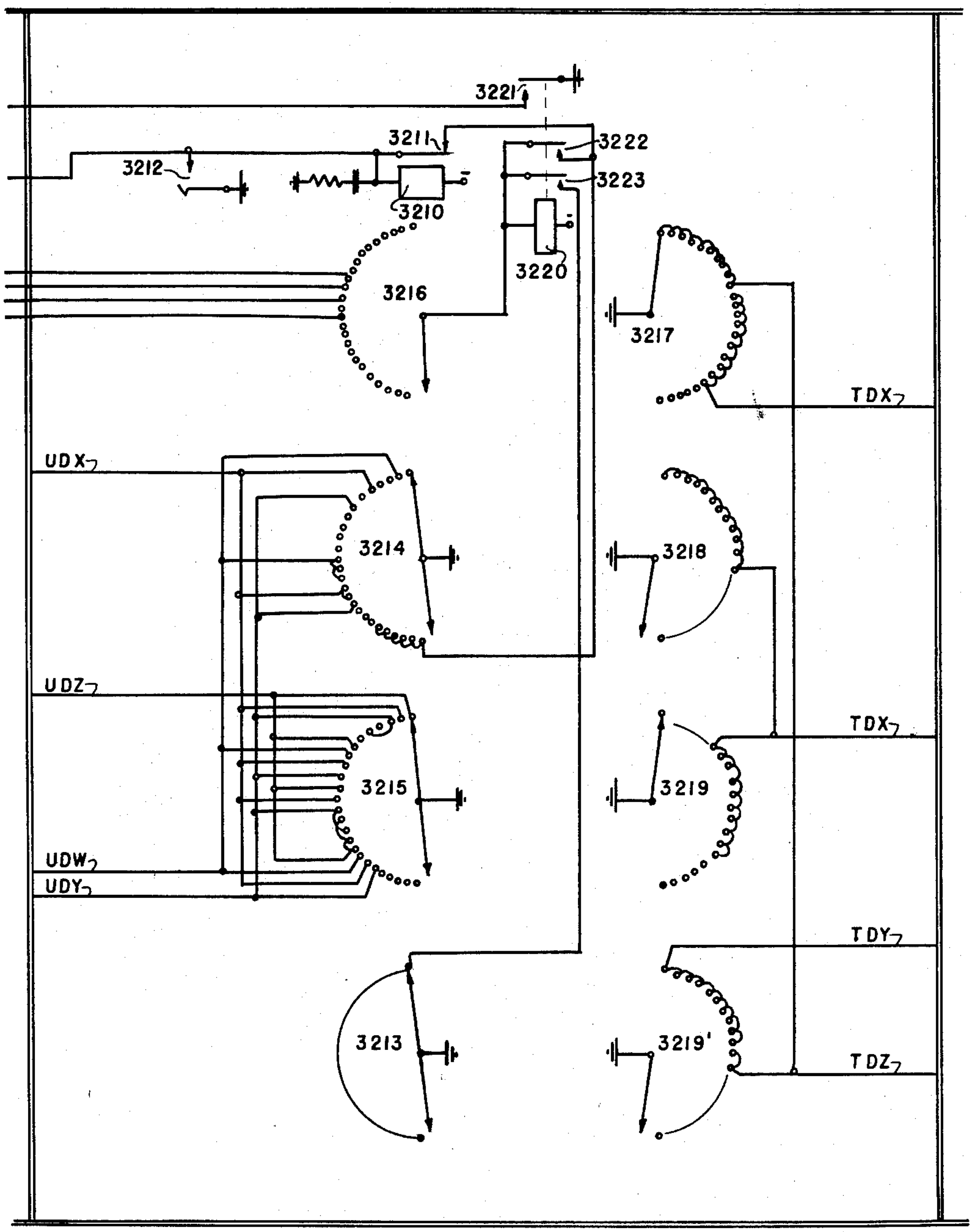
Figure 25:
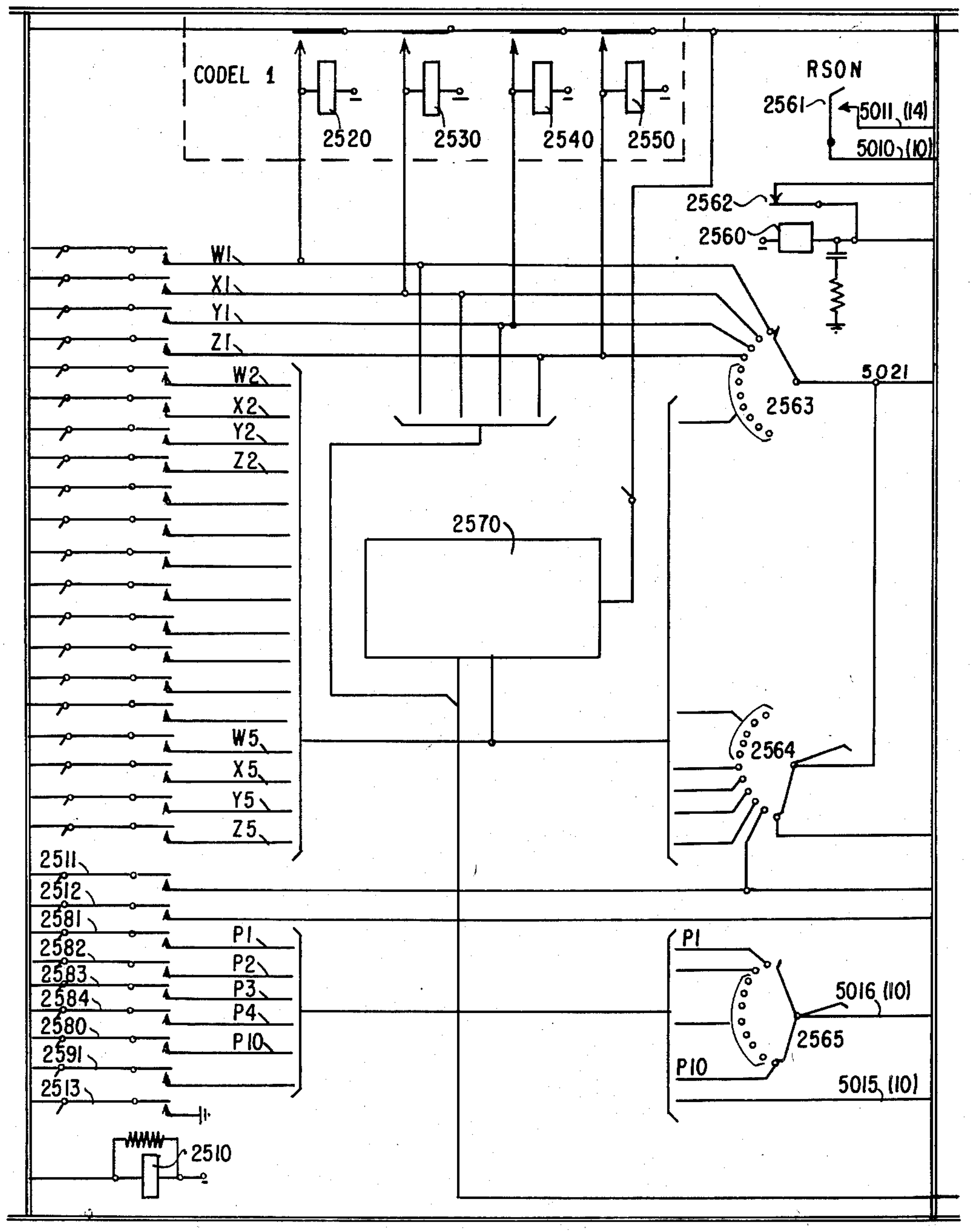
Figure 26:
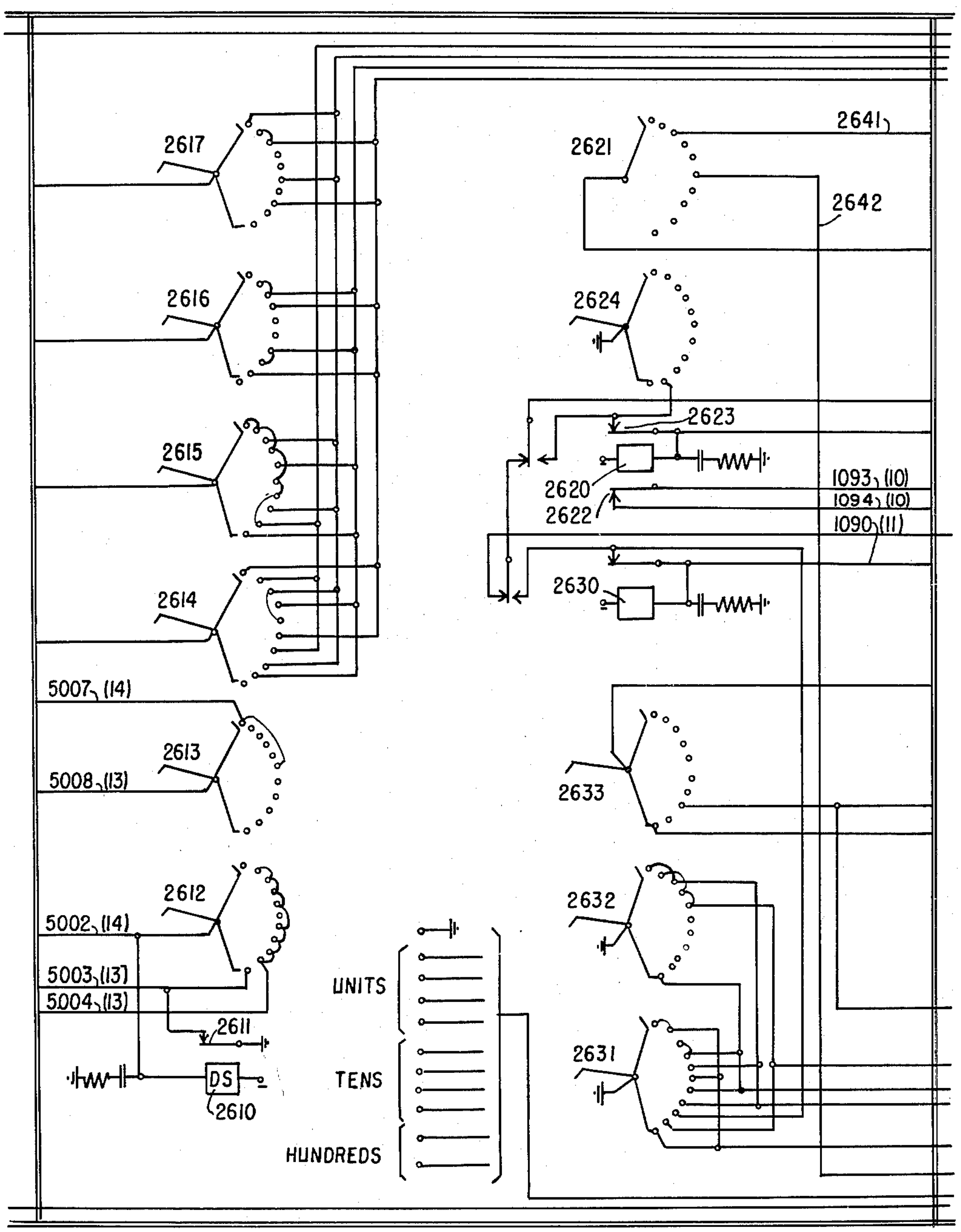
Figure 27:
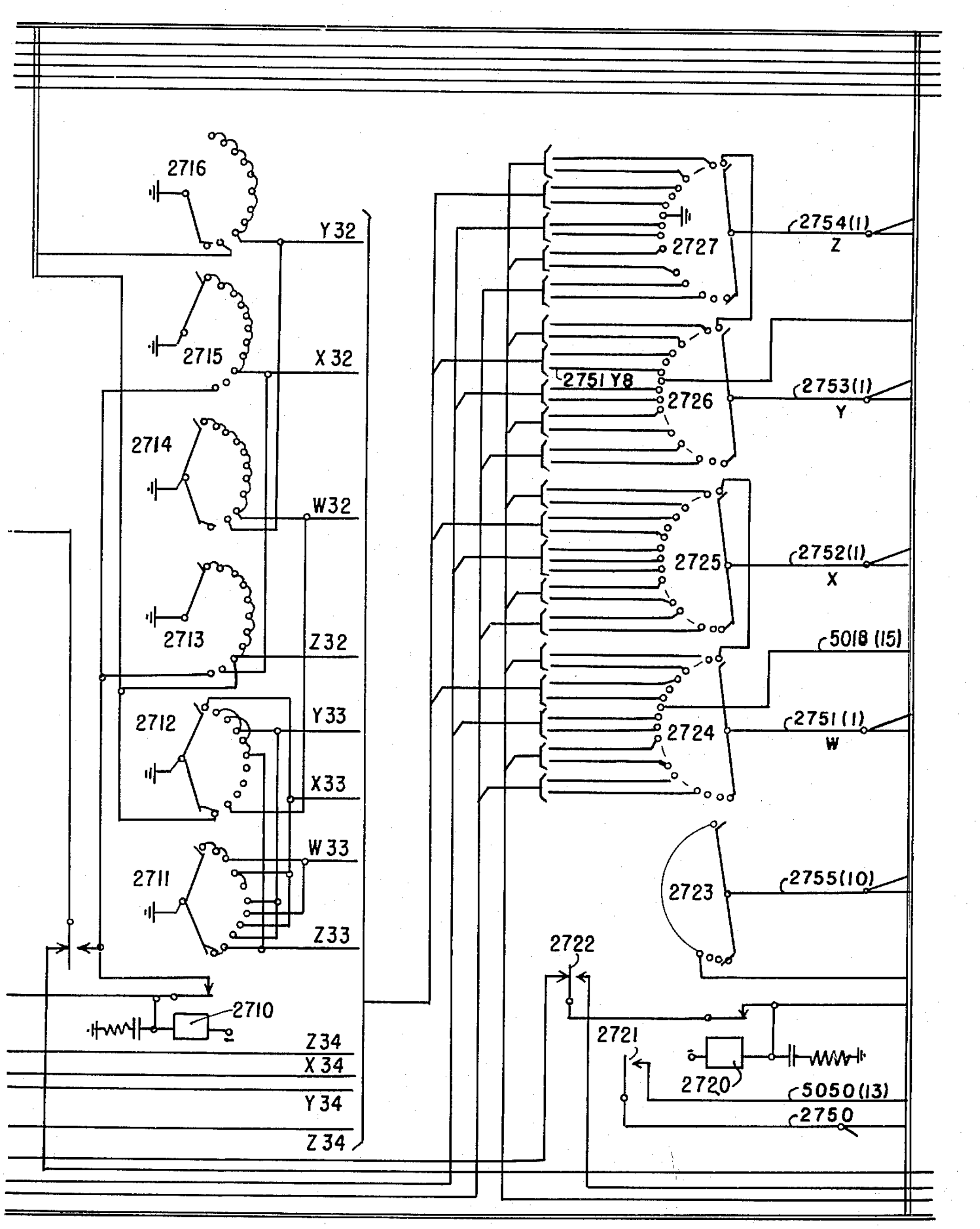

Fig. 18 of the drawing discloses in schematic form the tabulator finder and perforator allotter circuit and a perforator circuit.

The perforator is a motor driven perforator, arranged to supply ground pulses to the tabulator for stepping its rotary switch synchronously with itself so that it can accept the information stored in the tabulator on codel relay and record it on a paper tape.

The tabulator finder and perforator allotter circuits function is to connect any one of a group of tabulators to a perforator in a group of perforators. One tabulator finder circuit is included for each perforator. This is a relay and rotary switch circuit used by the perforator to seize a tabulator reqeusting perforator service. One perforator allotter circuit is included for each group of perforators. This is a relay and rotary switch circuit which marks an idle perforator for a tabulator.

Figs. 21 to 24 of the drawing disclose in schematic form the dater-timer circuit.

The dater-timer circuit supplies time and date information via the dater-timer transfer circuit to the tabulator. The dater-timer transfer circuit provides a means of connecting either of two dater-timers to the same tabulator. The position of the key in the dater-timer transfer circuit determines which dater-timer is connected to the tabulators at any one time.

Time of day is recorded on a 24 hour clock basis, the date is indicated by month and day (not year). However, the circuit provides for a 48 month (4 year) cycle and makes allowance for one extra day (February 29) every fourth year.

DETAILED OPERATION

*Seizure from local selector*

When a calling subscriber at station PS4 (whose directory terminal number is 0004) removes his receiver, the usual loop circuit, including the line conductors 921 and 922 is completed for operating the line circuit 915. In response to the completion of the above mentioned loop circuit, the line circuit 915 initiates operation of the distributor and marks the terminals of the calling subscriber line in the bank contacts of a group of line finders, including the line finder 920, having access to the calling subscribed line. For the purpose of this description it will be assumed that the distributor selects the line finder 920 and that the latter finder operates its wiper in a vertical and then in a rotary direction in the well-known manner to select the terminals in the associated bank terminating the calling line. When the calling line is found by the line finder 920, it extends the calling line to the individually associated first selector 925 and the latter selector transmits the usual dial tone signal to the calling subscriber to indicate that the dialling may be started. The above noted switching apparatus, including the line circuit 915, the distributor, the line finder 920 and the first selector 925 may be of conventional construction and arrangement and may be, for example, of the type illustrated in the Bakker Patent No. 2,289,896, granted July 14, 1942, and in the Saunders Patent No. 1,849,694, granted March 15, 1932.

Since the calling subscriber at station 0004 intends to extend the connection to a called subscriber in a remote exchange it is necessary to prefix the three digit directory number of the called subscriber with the access code digits "90." Consequently, when the calling subscriber receives the dialling tone signal the dial is actuated in accordance with the digit 9 to transmit nine loop impulses to the first selector 925. This selector then raises its wipers in a vertical direction to the ninth level and then rotates its wipers over the selected level to search for anidle ticketer, such as the ticketer of 30. It will be assumed for the purpose of this description that the first selector 925 extends the connection from the caling subscriber line by way of the cable 1000 to the ticketer 30 illustrated in Figs. 10 to 15 and 25 to 27 and 20 inclusive. The cable 1000 includes the "—" conductors 1202, the "+" conductors 1201 and the control conductor 1001. If the ticketer is busy, the control conductor will be grounded in order to indicate the busy condition to the first selector 925. Thus, as the selector rotates its wipers over the ninth level it will pass over contacts terminating ticketers having grounded control conductors corresponding to the C conductor.

*Seizure of ticketer*

When the first selector 925 seizes the ticketer it extends the loop circuit, including the "—" and "+" conductors 1202 and 1201 of the calling line to the ticketer.

Referring now to ticketer 30, negative potential from spotter battery 1003 through resistor 1004 and break contacts 1213 is fed through the lower winding of relay 1230, break contacts 1253, the "+" line conductor 1202 of cable 1000, through the selector 925, the finder 920, the line circuit 915, through line 922 to the subscriber's instrument and back over line 921, the line circuit, the finder, the selector, the "—" line 1201 of cable 1000 through break contacts 1254, break contacts 1214, through the winding of polarized spotter relay 1170 and lamp 1101 completing a circuit to the positive terminal of spotter battery 1003 and the negative terminal of the exchange battery. This current flow from the spotter battery 1003 is in a direction which will not operate polarized relay 1170, but will operate relay 1230. Relay 1230 operates and closes the make contacts of the break combination 1231 to complete a circuit from ground potential at contacts 1256, make contacts 1231 to the number one winding of relay 1140. Relay 1140 operates and closes contacts 1146 to complete a circuit from ground at contacts 1256 to operate relay 1470, at contacts 1143 completes a circuit to relay 1040. Relay 1140 also at make contacts 1144 closes ground from break contacts 1134, make contacts 1144, break contacts 1257 and break contacts 1023 to the "C" lead 1001 of cable 1000 to hold the preceding equipment and mark this circuit busy.

Relay 1040 closes a circuit at contacts 1049A to operate relay 1320, at contacts 1041 closes the lead 1005 from the monitor panel to the supervisory lamp 1006, closes ground to lead 1007 to provide a busy mark to the incoming trunk circuit 20. Relay 1320 closes direct ground from contacts 1322 through break contacts 1054, 1073, 1161 and 1120 to the supervisory lamp 1006. The lamp 1006 lights brightly to indicate that the ticketer has been seized.

*Ticketer calls for transender*

When relay 1470 operates it closes relay 1530 and lead 1601 to lead 1602 of the transender hunter, and at contacts 1471 prepares an operating circuit for relay 1530. If the associated transender is busy, ground appears on lead 1601 from bank contacts associated with wiper 1613 to lead 1601, break contacts 1353, 1530 to the coil of relay 1530 the other end of which is grounded at contacts 1472. Busy transenders have ground on their respective ground leads corresponding to the 1601 lead. If the transender on which the wipers 1613 of switch 1610 are engaged is busy, the magnet operates from the ground on the guard lead corresponding to 1601 and opens its interrupted springs 1611. The magnet restores and advances the wipers one step. This self-interrupted stepping continues until an idle transender such as 40 is found or lead 1602 is opened.

When switch 1610 steps to an idle transender 30, the absence of ground on the guard lead corresponding to lead 1601 permits relay 1530 in the ticketer to operate through the magnet of switch 1610, battery through coil of switch 1610, lead 1602, contacts 1462, 1021, 1252, 1471, 1562 to relay 1530 whose other terminal is grounded at 1472. Magnet of switch 1610 cannot operate on this circuit. When relay 1530 operates, it closes ground from make contacts 1532, break contacts 1353, to lead 1601 to mark the associated transender 30 busy to other transender hunters. Relay 1530 upon operating also closed a circuit at contacts 1534, to relay 1560, ground from contacts 1256, break contacts 1469, contacts 1478, 1534 to relay 1560. Relay 1560 operates its "X" contacts 1563 to transfer the holding path of relay 1530 from lead 1602 to lead 1603, and in operating fully opens lead 1602 at contacts 1562, closes leads 1604, 1605, 1606 and 1607 and closes leads 1608 and 1609 to switch through the transender to the ticketer selector.

*Dialling the toll access code digit 0*

In response to the dialling of the second digit of the toll access code, which in this case is the digit "0," the local line relay 1230 restores and operates ten times. The first time the line relay 1230 restores to normal it completes, at its break contacts 1232, a circuit from ground at contacts 1256, break contacts 1146, 1468, make contacts 1048, the break contacts 1232, the break contacts 1447, the break contacts 1023 and lead 5001 for energizing the party marking switch rotary magnet 2560. The magnet of switch 2560 is retained in its operated position until the line relay 1230 reoperates, at the end of the first pulse, at which time the magnet restores to normal and advances its wipers 2563, 2564 and 2565 one step. Thus in response to the ten impulses transmitted to the line relay 1230, the above traced circuit for the magnet of switch 2560 is completed ten times. Also during the first time the line relay 1230 restores to normal it completes at its break contacts 1231, a circuit from ground at contacts 1256 including the break contacts 1231 and the make contacts 1145 for operating relay 1430 and through break contacts 1414 for operating relay 1370. Relay 1430 completes a circuit to relay 1360 which operates and closes a holding circuit to relay 1370 through the number two winding of relay 1410, contacts 1371, make contacts 1369 lead 5003 to ground at the interrupter springs of rotary switch 2160.

At the end of the first dial pulse, as relay 1230 reoperates and opens the circuit to relay 1430 at contacts 1231, it removes the short from winding number two of relay 1410. Relay 1410 operates in series with relay 1370 and transfers the pulsing circuit through its number one winding to the magnet of rotary switch 2610. Relay 1430 being slow-to-release, remains operated during dialling of the digit.

When relay 1230 restores on the second dial pulse, it closes the circuit to the magnet to rotary switch 2610 through lead 5002 and the number one winding of relay 1410. The magnet of rotary switch 2610 in operating opens its interrupter springs 2611. The springs 2611 open the circuit to relay 1370, but relay 1410 remains operated on its number one winding for the duration of the pulse.

At the end of the second dial pulse, as relay 1230 reoperates, it opens the circuit to the magnet of rotary switch 2610. Rotary switch 2610 advances its wipers 2613 and 2612 one step. Relay 1410 restores and at break contacts 1414 transfers the pulsing circuit back to relay 1370. This same sequence of operations for relay 1370 and 1410 and switch 2610 is repeated for the remaining dial pulses, and switch 2610 will advance its wipers following the second, fourth, sixth, eighth and tenth dial pulses.

After the tenth dial pulse, the wiper 2613 and 2162 of switch 2610 are engaged on bank terminals 1 or 6, depending on the position of the switch at the start of dialling. It is to be noted that switch 2610 is a homing switch, that is when a digit is completed and relay 1360 restores, ground is closed via interrupter springs 2611, lead 5004 and break contacts 1369 to the bank terminals 2, 3, 4, 5, 7, 8, 9 and 10 of the level associated with wiper 2612. If the wipers are engaged on any of these bank terminals, switch 2610 will step to bank terminals one or six.

When digit "0" is completed, relay 1430 restores, opens the circuit to relay 1360, which is slow-to-release, and closes ground via contacts 1432, 1273, lead 5005, the wiper 2812, lead 5006, contacts 1365, lead 5008, wiper 2613, lead 5007, contacts 1445, 1413 to relay 1240. Relay 1240 operates and locks through the number two winding of 1440 and contacts 1474 to ground and closes ground to lead 5007 to indicate a locally originated call. When relay 1360 restores it closes ground via contacts 1045, lead 5010, rotary off-normal springs 2561, lead 5011, contacts 1466, 1364, 1476, 1224, 1515 and 1244 to relay 1150. Relay 1440 operates through 1240, closes a circuit at contacts 1442 to relay 1210, and transfers the pulsing circuit from switch 2560 to the transender hunter wiper 1619. Relay 1150 operates and closes ground to lead 5012 to the detector assigner, removes ground from the guard lead 5013, and closes relay 1010 to lead 5013' to the detector assigner. Relay 1210 operates momentarily, closes the number two winding of relay 1230 while transferring the "ring" or "—" side of the line from spotter battery 1003 to exchange battery through break contacts 1213, and the "tip" or "+" side of the line from relay 1170 to ground at make contacts 1214. Relay 1230 is now held by exchange battery over the subscriber's loop.

*Identification of the calling party*

Type B SATT installations are capable of serving both single party lines and party lines with as many as ten stations. All stations on party lines must be equipped with special spotter dials, stations on a single party line are equipped with regular dials.

The spotter dial differs from the regular dial in that it provides an additional set of spotter springs which can be closed by a special cam. During the return of the dial, the spotter springs closed interval is positioned to occur only during the period when the regular pulsing springs are closed. The spotter springs when closed by the special cam close a spotter ground pulse on the tip or positive side of the line. The spotter cam can be arranged to close the spotter ground pulse on the line after any one of the individual dial pulses. For the first station, the spotter dials are adjusted to send a spotter pulse after the first dial pulse of the digit "0." For the second station, the spotter dials are adjusted to send a spotter pulse after the second dial pulse of the digit "0." The third, fourth, fifth, sixth, seventh, eighth, ninth and tenth stations on a party line are arranged accordingly. For purposes of this explanation it is assumed that the calling station is the fourth station on the party line thus no spotter pulse will be closed via the tip or plus type side of the line until after the fourth dial pulse.

Now consider what happened to switch 2560 as the digit "0" was being dialled in the preceding section. Switch 2560 stepped to bank terminal 1 after the first dialling pulse. Then as relay 1230 follows the second, third and fourth pulses the wipers of switch 2560 are advanced to bank terminals 2, 3 and 4. Immediately after the fourth dial pulse the spotter dial of station PS4 closes a spotter pulse from springs 42 via the tip or pulse side of the line.

Relay 1170 is a high speed polarized relay which will not operate from spotter battery over the normal dialling loop but will operate from exchange battery when a spotter ground pulse appears on the positive side of the line. Relay 1170 operates during the interdigital pause between the fourth and fifth dial pulse and closes ground from contacts 1256, 1146, 1468, make contacts 1232, 1171 and make contacts 1362 to the number one winding of relay 1030. Relay 1030 operates and locks through its "X" contacts 1031, opens the pulsing circuit to switch 2560 at contacts 1034 removes ground from lead 5015 at break contacts 1033 and closes ground at the make contacts 1032 to the wipers 2565 of switch 2560 which are engaged on bank terminal four. When bar relay 2510 operates later this ground will be closed to lead 2584 to the detector to indicate the party identity of the calling station, further dial pulses do not effect switch 2560. Wipers 2563 and 2564 of swich 2560 serve no function on locally originated calls. If the calling station is a single party line no spotter pulses are closed to the positive line lead, switch 2560 follows the 10 dial pulses of digit "0" and steps to bank terminal 10 since relays 1170 and 1030 do not operate ground remains on lead 5015 to indicate a single party line. Although the spotter pulses may appear on the tip side of the line during dialling of the subsequent digits, they are ineffective to relay 1170 since the tip side of the line is transferred from relay 1170 to ground after the "0" digit is completed.

When ground is placed on the common start lead 5012 by relay 1150 of the ticketer, a relay operates in the detector assigner. Upon operating it closes the circuit to a rotary switch magnet. If direct ground appears on the guard lead, such as lead 5013, the magnet operates from the ground on these guard leads and opens its interrupter springs. The magnet restores and advances it wipers to the next ticketer. This self-interrupted stepping continues until the ticketer circuit requesting detection is found.

*Initiating detection cycle*

Ordinarily, the detection cycle is so rapid it will occur shortly after the digit "0" is completed. Ground on lead 5012 and absence of ground on lead 5013 indicates to the detector assigner that a detection of a calling number is desired by a ticketer. When the detector assigner steps to the ticketer, relay 1010 operates over lead 4004 in series with a relay in the detector assigner. Relay 1010 closes a circuit at contacts 412 for relay 2510 and at contacts 1011 a circuit for relay 1010. Bar relay 2510 operates and closes leads W1 through Z5, 2581 (P1) through 2580 (P10) and 2591 (P0), and 4003 to the detector and leads 3002 and 3004 to the detector assigner. Relay 1130 operates and closes positive 90 volts D.C. detection battery to the preceding equipment via the "C" conductor.

*Operation of detector*

When the detector is connected to the ticketer there is a ground potential on lead 3003, positive 80 volt D.C. battery on the "C" conductor of the calling line and a ground potential on some lead such as 2580 (P0) through (P10) lead, depending on the station party marking of the calling party.

In the course of the detection cycle, the detector closes ground to the various W1 through Z5 leads. These grounds represent, in codel code, (The codel code is a modified binary code for indicating the digits 1–0 as one or two marked leads from a group of four leads. A list of the markings and their corresponding indications is shown in the section titled "Dialling Digit A of the Office Code.) the equivalent office code and terminal number of the calling station. Codel relays in codels 1 through 5 operate from these grounds and lock to store the calling number. The decimal equivalents of the W, X, Y, Z codel relays are described in succeeding sections.

When the detection is complete, the detector closes ground from relay 1090 to lead 2001. Relay 1220 operates and locks, closes battery through magnet 2860 to lead 1604, opens 1150 and opens 1010. Relay 1150 restores, removes ground from lead 5012 and closes ground to lead 5013. Relay 1010 restores, opens 1130 and bar relay 2510. Bar relay 2510 restores. Relay 1130 restores and replaces +80 v. D.C. detector battery with ground on the "C" lead. Resistor 1190 is used in conjunction with "X" 1132 makes on 1130 to facilitate application of detector battery to the "C" lead without dropping the switch train and without burning the relay springs when ground is connected to the +80 v. detector battery.

TICKETER REPEATS DIAL IMPULSES TO TRANSENDER FOR SEVEN DIGIT CALLED NUMBER CALLS

*Dialling digit A of the office code*

Relay 1230 follows the dial pulses of digit A and repeats them over the lead through wiper 1619, lead 1630 for example to the transender. As 1230 restores on the first pulse, it closes 1430. Relay 1430 operates and being slow-to-release remains operated for the duration of the digit. Relay 1430 closes 1360. Relay 1360 operates and closes ground via springs 1467, 1444 and 1367 to energize magnet 2810. Switch 2810 is an indirect switch and advance its wipers at this time.

The cycle of operation for relays 1370 and 1410 and switch 2610 is the same as for the digit "0" in the preceding section and can be summed up as follows:

| After Dial Pulse | Relays T and S | Switch 2610 Energized On Terminal |
|---|---|---|
| 1 | Operated | 1 or 6 |
| 2 | Restored | 2 or 7 |
| 3 | Operated | 2 or 7 |
| 4 | Restored | 3 or 8 |
| 5 | Operated | 3 or 8 |
| 6 | Restored | 4 or 9 |
| 7 | Operated | 4 or 9 |
| 8 | Restored | 5 or 10 |
| 9 | Operated | 5 or 10 |
| 10 | Restored | 1 or 6 |

After dialing is completed, relay 1430 restores and opens 1360. Relay 1360 is slow-to-release and does not restore immediately. During the interval of time when 1430 is restored and 1360 remains operated, ground is closed via wipers of switch 2610 and switch 2810 to various W, X, Y, Z codel relays in codel 21.

The different combinations of codel relay which operate will depend on the digit dialled. If the digit is odd, ground is closed over the level 2615 and 2617 wipers of switch 2610. If the digit is even, ground is closed over the level 2614 and 2616 wipers of switch 2610. The codel relay combinations and their decimal equivalents are as follows:

| | | | |
|---|---|---|---|
| WX | 1 | YZ | 6 |
| WY | 2 | W | 7 |
| WZ | 3 | X | 8 |
| XY | 4 | Y | 9 |
| XZ | 5 | Z | 10 |

As the various W, X, Y, Z codel relays in codel 21 operate and lock, they close ground to the corresponding bank terminals of switch 2860 and 2720. When relay 1360 restores, it opens magnet 2810 and closes the "homing" circuit to switch 2610. Switch 2810 advances its wipers to bank terminal 1 and prepares a circuit to codel 22. Switch 2610 "homes" to bank terminal 1 or 6.

*Dialling digit B of the office code*

Relay 1230 follows the dial pulses of digit B and repeats them over the lead through wiper 1619, lead 1630 for example to the transender. The cycle of operation for relays 1370, 1430, 1360 and 1410 and switches 2610 and 2810 during dialling is the same as for digit A of the office code in the preceding section.

After dialling is completed, the codel relays in codel 22 operate and lock to store digit B of the office code, switch 2810 advances to bank terminal 2, and switch 2610 "homes."

*Dialling digit C of the office code*

Relay 1230 follows the dial pulses of digit C and repeats them over the lead through wipers 1619, lead 1630 for example to the transender. The cycle of operation for relays 1370, 1430, 1360 and 1410 and switches 2610 and 2810 during dialling is the same as for digit A of the office code in the preceding section.

After dialling is completed, the codel relays in codel 23 operate and lock to store digit C of the office code, switch 2810 advances its wipers to bank terminal 3 and switch 2610 "homes." When switch 2810 steps to its third bank terminal, it closes ground via contacts 1437, 1273, lead 5005, the wiper 2812 of switch 2810 engaged on bank terminal 3, lead 5016, contact 1555, lead 5017, INT. springs 2817 of 2810 to the magnet. Magnet 2810 operates and opens its INT. springs 2817. Magnet 2810 restores and advances the wipers of switch 2810. This self-interrupted stepping continues until switch 2810 steps to bank terminal 6.

*Dialling the four terminal digits*

Relay 1230 follows the dial pulses of the four terminal digits. The cycle of operation for relays 1370, 1430, 1360, 1410 and switches 2610 and 2810 for each of the terminal digits is the same as for digit A of the office code in the preceding section. The first, second, third and fourth terminal digits are stored on codels 27, 28, 29 and 30, respectively. After the fourth terminal digit is dialled, switch 2810 steps to bank terminal 10.

*Dialling called number for ten or eleven digit calls*

On a ten or eleven digit call, the first three digits constitute the toll area code, of which the second digit is always either 1 or 0; the second three digits constitute the ABC office code; and the last four or five digits constitute the terminal digits.

*Dialling first digit or area code*

Relay 1230 follows the dial pulses of the first digit of the area code and repeats them over the lead through wipers 1619, lead 1630 for example, to the transender.

The cycle of operation for relays 1370, 1430, 1360 and 1410 and switches 2610 and 2810 during the dialling of this digit is the same as the digit A of the office code in section. After dialling is completed, the codel relays in codel 21 operate and lock to store the first digit of the area code, switch 2810 steps to the first bank terminal, and switch 2610 "homes."

*Dialling second digit of area code*

Relay 1230 follows the dial pulses of the second digit of the area code and repeats them over the lead through wipers 1619, lead 1630 for example, to the transender. The cycle of operation for relays 1370, 1430, 1360, 1410 and switches 2610 and 2810 during dialling of this digit is the same as for digit A of the office code. Since the second digit of the area code is 1 or 0, switch 2610 will either not stop at all or will step five times. In either case, switch 2610 engages bank terminal 1 or 6 after the last dial pulse.

At the end of dialling relay 1430 restored. Relay 1430 closes the codel relays in codel 22 and closes ground via springs 1432, 1273, lead 5005, the wipers 2812 of switch 2810 engaged on the first bank terminals, lead 5006, contacts 1365, lead 5008, the wipers 2613 of switch 2610 engaged on the first or sixth bank terminals, lead 5007 to make contacts 1445 to the number one winding of relay 1550. The codel relays in codel 22 operate and lock to store the second digit of the area code. Relay 1550 operates, locks on its #2 winding, closes ground through make contacts 1554, lead 5018 to the eighth level bank terminal of switches 2720, wiper 2724 and opens the circuit at contacts 1555 to magnet 2810, to the third, fourth and fifth wiper level 2812 bank terminal of switch 2810.

Relay 1360 restores and opens magnet 2810. Switch 2810 steps to the second bank terminal.

*Dialling third digit of area code*

Relay 1230 follows the dial pulses of the third digit of the area code and repeats them over the lead through wipers 1619, lead 1630 for example, to the transender. The cycle of operation for relays 1230, 1370, 1430, 1350 and 1410 and switches 2610 and 2810 during dialling of this digit is the same as for digit A of the office code. After dialling is completed, the codel relays in codel 23 operate and lock to store the third digit of the office code, switch 2810 steps to the third bank terminals and switch 2610 "homes."

*Dialling ABC office code and terminal digits*

Relay 1230 follows the dial pulses and repeats them over the lead through wipers 1619, lead 1630 for example to the transender should the transender require it. The cycle of operation for relays 1370, 1430, 1360, 1410 and switches 2610 and 2810 during dialling of these digits is the same as for digit A of the office code. The ABC office code and four terminal digits for ten digit calls are stored in the codels as follows:

| | |
|---|---|
| Office code digit A | Codel 24 |
| Office code digit B | Codel 25 |
| Office code digit C | Codel 26 |
| First terminal digit | Codel 27 |
| Second terminal digit | Codel 28 |
| Third terminal digit | Codel 29 |
| Fourth terminal digit | Codel 30 |

After dialling the tenth digit (fourth terminal digit) of the called number, switch 2810 steps to bank terminal 10. Should the call be an eleven digit call, the eleventh digit (fifth terminal digit) is stored on codel 31 and switch 2810 will step to normal position after the last digit is completed.

SENDING FORM THE TRANSENDER

*Sending for seven digit calls*

After the transender has received the ABC office code digits over the lead through wipers 1619, lead 1630 for example, it starts the cycle of operation whereby the transender is supplied with translated information from the translator. This translated information, which is stored on codels in the transender, is composed of a sending control digit, a translated routing directive, and possibly a hold sending mark. The hold sending mark indicates to the transender to hold sending until the seventh or tenth digit of the called number has been registered in the ticketer. If the transender does not receive a hold sending mark from the translator, the sending cycle is as follows.

When the translated information has been received, the transender closes leads 1631 and 1632 to seize the ticketer selector or trunk circuit and begins transmitting the sending control digit as a series of ground pulses, occurring at a frequency of ten pulses per second, over lead 1633 to relay 1540 and magnet 2860. The sending control digit is composed of from one to ten pulses, and its function is to absorb those digits of the called number which are not required for sending. On the first sending control pulse, a circuit is closed to relay 1540. Relay 1540, being slow-to-release, operates and remains operated for the duration of the sending control pulses. Magnet 2860 follows the pulses and steps its wipers each time it restores.

For purposes of this explanation, assume that the first two digits were not required for sending. Under these conditions, the transender closes three pulses over lead 1633 to magnet 2860. Switch 2860 follows the pulses and steps its wipers to bank terminal 3. After the last pulse, relay 1540 restores and closes #2 winding of 1270 via magnet 2860 which does not operate at this time, to battery. Relay 1270 operates its "X" contacts, locks on its #1 winding, and operates fully. Relay 1270, in operating fully, opens its #2 winding, opens the circuit to 1540, transfers lead 5030 from the pulsing contacts of 1230 to the level C wiper of switch 2860 and closes leads 1605 (XT), 1606 (YT) and 1607 (ZT) to the levels 2864, 2865 and 2866, wipers of switch 2860 respectively.

When the transender has completed the sender control digit, it begins sending the translated routing directive which may contain a maximum of six digits. The transender sends the routing directive, and all subsequent digits, in the form of loop pulses via leads SR and ST, and provides an interdigital pause between each digit. After the transender has finished sending the translated routing directive, it begins sending the decimal equivalents of the codel grounds appearing on leads 5030, 1605, 1606 and 1607.

If, as assumed earlier, the sending control digit has been 3, the wipers of switch 2860 would be engaged on bank terminals 3 and codel 23 would be closed to leads 5030, 1605, 1606 and 1607. Thus, the first two (AB) digits of the office code have been absorbed and the third (C) digit of the office code will be the first digit of the called number to be sent by the transender.

During the interdigital pause after the digit stored on codel 23 has been sent, the transender closes a ground pulse over lead 1633 to magnet 2860. Switch 2860 steps to bank terminal 4, and in so doing, closes ground on level 2861, bank terminal 4 to relay 1310. Relay 1310 operates and opens lead 1633 at contacts 1311. The transender must find resistance battery on lead 1633 as a condition for sending. As long as lead 1633 is open, the transender will not send any additional digits.

Ground on level 2861, bank terminals 4, 5 and 6 causes switch 2860 to step, self-interrupted, to bank terminal 7, thus skipping codels 24, 25 and 26 on which no information has been registered. As switch 2860 steps, relay 1310 remains operated from the ground on these bank terminals. After switch 2860 steps to bank terminal 7, relay 1310 restores and closes resistance battery to lead 1633.

Relay 1310 is now under control of the subscriber's dialling. As long as the subscriber's dialling remains ahead of the sending, relay 1310 will remain unoperated. Should the subscriber hesitate in dialling and switch 2860 catch up to switch 2810, relay 1310 will operate and prevent any further sending until the subscriber is again one digit ahead of sending.

When resistance battery is closed to lead 1633, the transender begins sending the digit stored on codel 27. During the interdigital pause after the digit has been sent, the transender again closes a ground pulse over lead 1633 to magnet 2860. Switch 2860 steps to bank terminal 8 and closes codel 28 to leads 5030, 1605, 1606 and 1607. The digits stored on codels 28, 29 and 30 are sent in the same manner.

After the digit stored on codel 30 has been sent, the transender closes a ground pulse over lead 1633 to switch 2860 and relay 1250. During the pulse, relay 1250 operates its "X" contacts 1259 from the ground pulse on lead 1633 via springs 1565, 1311, 1221, 1255, 1473, 1542, lead 5031, the level 2862, wipers of switch 2860 engaged on bank terminal 10, lead 5032, the #1 winding of 1250, 1274, the level 2812 of switch 2810 engaged on bank terminal 10, 1273, the 100 ohm resistor 1280 to exchange battery. Relay 1250, in operating its "X" contacts 1259, locks through its #2 winding and operates fully to start the switch-through cycle of operation. After the ground pulse, switch 2860 steps to normal position.

If the transender received a hold sending mark from the translator, the transender will not begin sending until the subscriber has dialled the last terminal digit of the called number. At that time switch 2810 steps to bank terminal 10 and closes ground via springs 1432, 1273, the 2812 wipers of switch 2810, 1277, and 1526, to lead 1606. Ground appearing on lead 1606 at this time indicates to the transender that the fourth terminal digit has been dialled and sending may begin. The cycle of operations during sending is the same as previously mentioned.

*Sending for ten or eleven digit calls*

After the transender has received the three area code digits over the lead through wipers 1619, lead 1630 for example, it decides whether or not the ABC office code is also required for a translation. In either case, when it has received the required digits, it starts the cycle of operation whereby the transender is supplied with translated information from the translator. When this information is received, the sending cycle is the same as previously described with the following exceptions:

When switch 2860 steps to bank terminal 4, it does not step self-interrupted to bank terminal 7 since relay 1550 has operated and removed the ground from bank terminals 4, 5 and 6.

After the tenth digit (fourth terminal digit) has been sent, the transender closes a ground pulse on lead 1633. If an eleventh digit (fifth terminal digit) has been dialled by this time, switch 2810 is in normal position. Thus, the pulse on lead 1633 steps switch 2860 to normal position, but does not close relay 1250 at this time, as in a seven or ten digit call. The transender then sends the eleventh digit (fifth terminal digit) stored on codel 31. After this digit has been sent, the transender again closes a ground pulse over lead 1633 to switch 2860 and the #2 winding of 1250. Relay 1250 operates its "X" contacts 1254 from the ground pulse on lead 1633, via springs 1565, 1311, 1221, 1255, 1473, 1542, the wiper 2862 of switch 2860 in normal position, the break of the make before break 1257, and the #2 winding of 1250 to exchange battery.

Relay 1250, in operating its "X" contacts 1959, locks through its #2 winding and operates fully to start the switch-through cycle of operation as described in the preceding section.

*Stop-dial and flashing signal supervision*

If stop-dial supervision is encountered during the sending interval, ground is closed to lead 1090. Relay 1050 operates and closes ground over lead 1630 to the transender to hold further sending until the stop-dial supervision is removed.

If a flashing signal is closed to lead 1090 during the sending interval, relay 1050 follows the first two pulses and repeats them over lead 1630 to the transender. During the second pulse the transender opens lead 1639. Relay 1530 restores, removes the short from resistor 1380, and closes #1 winding of 1460. Relay 1460 operates its "X" contacts 1464, locks through its #2 winding, closes busy tone on lead 1480 to the calling subscriber via "—" line leads, opens 1560, opens #1 winding of 1460, closes ground to lead (RLS) 1091, closes a holding circuit to 1050, closes holding circuit to #2 winding of 1040, and removes the operating ground for magnet 2810 and codels 21 through 31. Relay 1560 restores. Relay 1050 which is held operated by 1460, closes lead 1002 (60 i.p.m.) through resistor 1004 to the supervisory lamp and lead 1005. The supervisory lamp flashes dimly at 60 i.p.m. The ticketer thus remains operated until the calling party disconnects.

*Switch-through*

Prior to sending, the seized ticketer selector or trunk circuit closed ground to lead C. When relay 1250 operates fully after sending is completed, it opens #1 winding of 1230, closes #2 winding of 1140 to ground on lead C, transfers lead 1001 to ground on lead C, and switches through the preceding selector to the ticketer selector or trunk circuit. Relay 1230 restores and opens #1 winding of 1140, 1560 and 1470. Relay 1140 remains operated on its #2 winding. Relay 1560 restores and opens leads 1603, 1609, 1604, 1605, 1606 and 1607 to the transender hunter. When lead 1603 is opened, the associated transender is released and relay 1530 is opened. Relay 1530 restores and removes the short from resistor 1380.

Relay 1470 restores, closes ground over lead 1480 to the ticketer selector or trunk circuit to indicate cut-through, and opens 1210, #1 winding of 1270, #1 and #2 winding of 1030, 1220, 1240 and #2 winding of 1440. Relays 1210, 1270, 1440, 1220, 1240 and 1030 (if operated) restore.

CALLED PARTY ANSWERS

When the called party answers, "answer" supervision is relayed through the trunk circuits and through the ticketer selector or trunk circuit to this circuit by ground over the 1090 lead. Relay 1050 operates, extends relay 1110 to a source of 1 second time pulses on lead 1381, and transfers the supervisory lamp and lead 1005 from direct ground to lead 60 through resistor 1004. This causes the supervisory lamp to flash dimly at 60 i.p.m. to indicate that the call has been answered. Relay 1110 follows the pulses on lead 1381 and pulses at the rate of one pulse per second.

CONVERSATION TIMING

This ticketer times the length of conversation and provides a maximum 309 minute timing interval. The conversation time is accumulated on rotary switches 2620, 2630 and 2710. Although the conversation timing cycle begins when answer supervision is received, a "grace period" of 6.5 seconds is provided before any conversation time is actually registered. Immediately after the "grace period" the first minute of conversation is registered. At the end of the first minute of conversation, the second minute is registered, etc. until the end of the call or the 309 minute timing interval elapses. The 6.5 second "grace period" is designed to prevent ticketing of calls to wrong numbers, and it can be varied by relocating leads 2641 and 2642 on the level 2621 bank terminals of switch 2620.

Relay 1110 operates from the first pulse on lead 1381 following the operation of 1050 and closes 1060. Relay 1060 operates and closes its holding circuit through the #2 winding of 1080 which is shunted for the duration of the pulse. At the end of this pulse, 1060 restores and removes the shunt from 1080. Relay 1080 operates in series with 1060 and transfers the 1110 pulsing circuit through the #1 winding of 1080 to switch 2620.

Relay 1110 operates on the second pulse on lead 1381 and closes magnet 2630 through #1 of winding 1080. Magnet 2620 operates. At the end of this second pulse, magnet 2620 restores and the wipers of switch 2620 are advanced one step. Relays 1080 and 1060 remain operated and the wipers of switch 2620 are now stepped once each second until they reach bank terminal 6 at the end of the seventh pulse. At this time, switch 2720 steps, self-interrupted, to bank terminal 1 and closes 1070. The wipers of switch 2720 remain engaged on bank terminal 1 until the end of conversation, at which time switch 2720 begins transferring the ticketing information to the tabulator. Relay 1070 operates, removes the shunt from INT springs 2623, closes a holding path to 1050, and closes ground through resistor 1091 to lead 1005 and the supervisory lamp 1006. The supervisory lamp 1006 lights dimly to indicate that conversation timing has started.

On the eighth pulse relay 1110 operates and closes magnet 2630 through #1 winding of 1080. Magnet 2620 operates and opens its INT springs 2622. The INT springs 2622 open the hold circuit of 1060. Relay 1060 restores but 1080 remains operated on its #1 winding for the duration of this pulse. Relays 1110 and 1080 and magnet 2620 restore at the end of the pulse. The wipers of switch 2620 are advanced to bank terminal 7.

On the ninth pulse relay 1110 operates and closes 1060. Relay 1060 operates and closes its holding circuit through #2 winding of 1080. When relay 1110 restores at the end of this pulse, relay 1080 operates in series with 1060 and transfers the 1110 pulsing circuit to switch 2620.

On the tenth pulse relay 1110 and magnet 2620 operates. Relay 1060 restores but 1080 remains operated on its #1 winding for the duration of the pulse. At the end of the pulse, relays 1110 and 1080 and magnet 2620 again restore. The wipers of switch 2620 are advanced to bank terminal 8.

In this manner, alternate pulses from 1110 now step switch 2620 at the rate of one step every two seconds.

Switch 2620 is used for counting groups of 30 pulses but is a 33 step switch mechanism. Each time the wipers of 2624 step to bank terminal 10, ground is closed through these wipers and INT springs 2623 to magnet 2620. Thus, every time the 2624 wipers step to bank terminal 10, switch 2620 steps self-interrupted and advances its wipers one step without changing the count.

The level scanned by wipers 2624 of switch 2620 is thus scanned at twenty second intervals. The wiper 2621 has two of its three wipers removed and is therefore scanned only once each minute.

At the end of each minute the wiper 2621 is engaged on bank terminal 3 and relays 1060 and 1080 are operated. On the first pulse following each minute, relay 1110 closes magnet 2620, and closes ground on the wiper 2621 via springs 1079, 1083, 1112, lead 1190 to magnet 2630. Magnet 2620 operates and opens 1060 at its contacts 2622. Magnet 2630 operates. At the end of these pulses switch 2620 advances its wipers to bank terminal 4 and switch 2630 advances its wipers one step. In this manner switch 2630 registers the unit minute digits in codel code on leads W34, X34, Y34 and Z34.

After nine minutes the wiper 2624 of switch 2620 is again engaged on bank terminal 3 and the wipers of switch 2630 are engaged on bank terminal 8. On the first pulse following the nine minute interval, relay 1110 closes magnets 2620, 2630 and 2710. At the end of this pulse, switches 2620, 2630 and 2710 advance their wipers one step. Switch 2630 steps self-interrupted from ground on wiper 2631, bank terminal 9 and advances its wipers to bank terminal 10. At ten minute interval will elapse before the wipers of switch 2630 again engage bank terminal 8. After each subsequent ten minute interval when switch 2630 engages bank terminal 8, switch 2710 advances its wipers one step. Wiper 2711 and 2712 of switch 2710 scan their respective levels at hundred minute intervals and thus mark in codel the ten minute digits on leads W33, X33, Y33 and Z33. The wipers 2713, 2715 and 2716 have two of their three wipers removed and are spaced one hundred minutes apart. (Switch 2710 also is a 33 step mechanism but when the 2713 and 2715 wipers engage bank terminal 10, it steps self-interrupted and advances its wipers one step.) Level of wiper 2713 is scanned during the first hundred minute interval, level of wiper 2715 during the second hundred minute interval and level of wiper 2716 during the third hundred minute interval. One wiper 2714 is removed to have this level scanned only during the second and third hundred minute intervals. Thus, the hundred minute digits are registered in codel form on leads W32, X32, Y32 and Z32.

Should the conversation timing reach 300 minutes, relay 1160 operates from ground on the wipers 2716, switch 2710 engaged on bank terminal 10. Relay 1160 closes ground to lead Z32, prepares a circuit via lead 1094 to give a 300 minute alarm, and closes lead 1002 to the supervisory lamp and lead 1005. The supervisory lamp flashes brightly at 60 i.p.m. to indicate that 300 minutes of conversation times have elapsed. At this time leads W32, Z32, Z33 and Z34 are grounded and register digits "300" as the conversation time.

The ticketer is capable of registering the conversation time up to a maximum of 309 minutes. At the start of the 310th minute, the wipers of switch 2630 are advanced to bank terminal 10, to close ground wiper to lead 1094 to give the 300 minute alarm, the wipers of switch 2710 are advanced to normal, relay 1160 restores, and the cycle of conversation timing continues as before. Consequently, the 310th minute of conversation is registered as "000," the 311th as "001," etc.

END OF CONVERSATION

When the called party disconnects, ground is removed from lead 1090 to open the operating path to 1050. Relay 1050 remains operated on its holding path until the calling party disconnects.

When the calling party disconnects, the ticketer selector or trunk circuit releases and removes ground from lead 1001. The preceding equipment releases, but this switch will not release until the stored call information has been transferred to a tabulator. Relay 1140 restores, closes #1 winding of 1020 and opens 1050. Relay 1020 operates, closes 1420, closes ground through #1 winding of 1340 to lead 1382, and grounds lead 1001 to guard this switch against seizure. Relay 1050 restores, opens the timing circuits, and transfers the supervisory lamp and lead 1005 from resistance 1091, ground to lead 1003 through resistor 1091.

The supervisory lamp flashes dimly at 120 i.p.m. until the stored call information has been transferred to a tabulator. Relay 1420 operates, removes ground from lead 1481, and closes ground over lead 1482 to the tabulator allotter.

TRANSFERRING TICKETING INFORMATION TO A TABULATOR

Absence of ground on lead 1481 permits a tabulator to stop on this switch. When a tabulator is connected to the switch, a circuit is closed over lead 1382 to #1 winding of 1340 operates its "X" contacts 1344, locks on its #2 winding and operates fully. Relay 1340 in operating fully, opens its #1 winding from lead 1382, closes lead 1382 to magnet 2720, closes a short across resistor 1380, and opens 1420. Relay 1420 restores, opens lead 1482 and closes ground to lead 1481.

The ticketing and record data stored in this switch are now rapidly transferred to the tabulator. The 2720 switch is stepped by pulses from the tabulator, which also simultaneously step a similar switch in unison in the tabulator. As the wipers of the 2720 switch are advanced one step at a time, they close the grounds on the various bank terminals over lead W, X, Y and Z to operate codels in the tabulator.

The order in which the data is transferred to the tabulator is as follows:

FOR SEVEN DIGIT TOLL CALLS

Bank terminals 2:
 Called number, office code C digit (codel 23)
Bank terminals 3:
 Called number, office code B digit (codel 22)
Bank terminals 4:
 Called number, office code A digit (codel 21)
Bank terminals 5:
 Conversation time, units digit (minutes)
Bank terminals 6:
 Conversation time, tens digit (minutes)
Bank terminals 7:
 Conversation time hundreds digit (minutes)
Bank terminals 8:
 Level B—Absence of ground indicates a seven digit call
 Level C—Ticketer identity hundreds digit
 Level D—Ground indicates a change of toll rates during call
Bank terminals 9:
 Ticketer identity, tens digit
Bank terminals 10:
 Ticketer identity, units digit Bank terminals 11:
No information on seven digit calls
Bank terminals 12:
Called number, 4th terminal digit (codel 30)
Bank terminals 13:
Called number, 3rd terminal digit (codel 29)
Bank terminals 14:
Called number, 2nd terminal digit (codel 28)
Bank terminals 15:
Called number, 1st terminal digit (codel 27)
Bank terminals 16:
No information on seven digit calls
Bank terminals 17:
No information on seven digit calls
Bank terminals 18:
No information on seven digit calls
Bank terminals 19:
Calling number, 4th terminal digit (codel 5)
Bank terminals 20:
Calling number, 3rd terminal digit (codel 4)
Bank terminals 21:
Calling number, 2nd terminal digit (codel 3)
Bank terminals 22:
Calling number, 1st terminal digit (codel 2)
Bank terminals 23:
Calling number, equivalent office code digit (codel 1)

FOR THE TEN OR ELEVEN DIGIT TOLL CALLS

Bank terminals 2:
Called number, 3rd area code digit (codel 23)
Bank terminals 3:
Called number, 2nd area code digit (codel 22)
Bank terminals 4:
Called number, 1st area code digit (codel 21)
Bank terminals 5:
Conversation time, units digit (minutes)
Bank terminals 6:
Conversation time, tens digit (minutes)
Bank terminals 7:
Conversation time, hundreds digit (minutes)
Bank terminals 8:
Level B—Ground indicates a ten or eleven digit call
Level C—Ticketer identity hundreds digit
Level D—Ground indicates a change of toll rates during call
Bank terminals 9:
Ticketer identity, tens digit
Bank terminals 10:
Ticketer identity, units digit
Bank terminals 11:
Called number, 5th terminal digit (eleven digit calls only) (codel 31)
Bank terminals 12:
Called number, 4th terminal digit (codel 30)
Bank terminals 13:
Called number, 3rd terminal digit (codel 29)
Bank terminals 14:
Called number, 2nd terminal digit (codel 28)
Bank terminals 15:
Called number, 1st terminal digit (codel 27)
Bank terminals 16:
Called number, office code C digit (codel 26)
Bank terminals 17:
Called number, office code B digit (codel 25)
Bank terminals 18:
Called number, office code A digit (codel 24)
Bank terminals 19:
Calling number, 4th terminal digit (codel 5)
Bank terminals 20:
Calling number, 3rd terminal digit (codel 4)
Bank terminals 21:
Calling number, 2nd terminal digit (codel 3)
Bank terminals 22:
Calling number, 1st terminal digit (codel 2)
Bank terminals 23:
Calling number, equivalent office code digit (codel 1)

When all this information has been transferred, switch 2720 steps to bank terminals 24 and opens relay 1070.

OPERATION OF TABULATOR ALLOTER

The lead 1482 is common to all ticketers having access to the group of tabulators served by this alloter. Relay 1630 is normally held operated by ground on the lead 100 multiple of the associated tabulators. As each tabulator becomes busy, it removes its multiple ground from the lead 100.

When a toll call is completed, the ticketer grounds the lead 1482 to signal for a tabulator. Relay 1640 operates, connects the ground from relay 1630 (operated) through the N bank contact of switch 1620 and its INT. springs 1621 to the coil 1620.

The switch 1620 steps one step self-interrupted. If the tabulator connected to the lead 1601 is busy, ground on the lead 1601 will reoperate the switch magnet 1620 and the switch will advance across its bank, searching for a resistance ground. When a bank contact is encountered having a resistance ground potential on it, the switch 1620 cannot reoperate, and battery through the coil 1620 seizes the idle tabulator.

The tabulator then hunts for the ticketer which is signalling. When the tabulator finds the ticketer, the ticketer opens the lead 1482 ground and causes the tabulator to ground the lead 1601. Relay 1640 restores. The switch 1620 remains where it stands until its use is again required.

When all tabulators in the group are busy, the grounds on the common lead 100 are removed and relay 1630 restores. This removes the ground from the N contact to give the switch 1620 a place to stop. As soon as a tabulator becomes idle, ground is reclosed to the N bank contact.

SEIZURE OF TABULATOR

Upon completion of a call, the ticketer calls for a tabulator through the tabulator allotter. Battery through magnet 1620 of the tabulator allotter closes the circuit via lead 1601 to relay 120. Relay 120 operates, closes the circuit to magnet 110 from ground encountered on the level associated with wiper 113, bank terminal N of switch 110, and shorts #1 winding of relay 130.

Magnet 110 operates, operates its INT. springs 112 which open the circuit to the magnet. Magnet 110 restores and advances its wipers one step (bank terminal 1). Magnet 110 is now connected to lead 1481 via its INT. springs 112.

Idle ticketers and such not requiring a tabulator maintain ground on their respective leads 1481. This ground on lead 1481 shorts #1 winding of relay 130, thus preventing its operation and completes the circuit to magnet 110. Switch 110 steps self-interrupted from ground encountered on lead 1481 until it reaches the bank terminals associated with a ticketer requiring a tabulator. Lead 1481 of this position is open, thus removing the short from #1 winding of relay 130. Relay 130 operates in series with magnet 110 (magnet 110 does not operate on this circuit), opens lead 1481, opens lead 100, closes 820, and closes 730. Relay 730 is slow-to-operate and does not operate immediately. Relay 820 operates, grounds lead 100′ tabulator busy, prepares a circuit to 830 to prepare the codel code monitoring circuit described in succeeding section, and closes a "continuity check" circuit from #1 winding of relay 140 to ground through #1 winding of relay 1340 in the ticketer. This continuity check circuit traces back and forth between the ticketer and the tabulator as described in a succeeding section, and serves to prevent further tabulator and ticketer operation when signal leads between these circuits are open or when certain relays and rotary switches are not operated.

If the "continuity check" circuit is satisfactory, relay 140 operates, shorts 802 (2000 ohm) to permit ticketer 1340 to operate, locks at 130 through its #2 winding in series with #2 winding of relay 130, opens part of the operating circuit to 720, thus preventing its later operation when 730 operates.

Relay 730 prepares the circuit to 840 which later operates upon switch-through to an associated perforator, shorts 120 by grounding lead 1601, closes #2 winding of relay 810 to lead 801, prepares a circuit to magnet 210, prepares a future locking ground for the codel and other storage relays, and closes 710 to the bank terminals of multiple level associated with wiper 213 of switch 210. Direct ground on lead 1601 causes the tabulator allotter to step off this tabulator and step to the next contact. Relay 730 restores, opens the #1 winding of relay 130 (relay 130 remains operated on its #2 winding), and closes the circuit to magnet 210 via contacts 134, 142, 836, 123, wiper 213 and bank terminal 25 of switch 210 and interrupter springs 211 of switch 210. Magnet 210 operates and opens its INT. springs 211 to interrupt its own circuit. Magnet 210 restores, advances its wipers to bank terminal N, and the RSON springs 212 restore. (R.O.N. springs 212 of rotary switch 210 operate on terminal 25 and not on terminal N.) Ground on the wiper 213 of switch 210 is now closed to #1 and#2 windings of 710.

TRANSFER OF TICKETING INFORMATION FROM TICKETER TO TABULATOR

The transfer of ticketing information is controlled by switch 210 which simultaneously connects leads W (2751), X (2752), Y (2753) and Z (2754) from the ticketer to the various codels in the tabulator. This receiving switch 210, after advancing its wiper to bank terminal N, steps in unison with the switch 2720 in the ticketer. The rate of stepping is controlled by pulse generating relay 710 in the tabulator.

Relay 710 operates in the following manner. At normal, condenser (undesignated) stands charged to battery through the two windings of relay 710 which are connected in series aiding. Ground closes by the wipers 213 of switch 210 are connected to relay 710 through its springs 712. This ground short circuits the condensers through the #1 winding of relay 710 and energizes the #2 winding of this relay. The resulting condenser discharge current through the #1 winding of relay 710 opposes the effect of the current in the #2 winding and delays the operation of this relay until the condensers are almost completely discharged. When relay 710 finally operates, it opens ground at spring #2 thus opening the discharging circuit to the condensers. The condensers immediately start recharging from battery through the #2 and #1 windings of relay 710.

This condenser charging current flow through both windings aiding and causes relay 710 to remain operated until the current decreases sufficiently as the condensers become fully charged. Relay 710 finally releases and the cycle repeats itself. This circuit arrangement makes relay 710 both slow-to-operate and slow-to-release. The cycling rate is very stable and depends upon the residual adjustment and margining of relay 710 and the capacity of the condensers. Varying the capacitance will vary the pulse speed.

Each operation of relay 710 closes a pulse to magnet 210 and closes a pulse over lead 1382 to the ticketer. These pulses are in unison and step switch 210 in this circuit and switch 2720 in the ticketer in synchronism.

Switch 2720 in the ticketer and switch 210 in this circuit advance one step per pulse. After the first pulse, any grounds encountered by the wipers of switch 2720 will be extended over lead W (2751), X (2752), Y (2753), Z (2754) through banks associated with wipers 115 to 118 of switch 110 to the wipers 214, 215, 216 and 217 of switch 210 and then to the codel relays connected to the first bank terminals. Each additional step of the two switches will connect the W (2751), X (2752), Y (2753) and Z (2754) leads to another codel group, and thus transfer to these codel relays the data in the ticketer pertaining to the call. All codel relays that operate lock to ground from relay 730.

The sequence in which the information is transferred to the tabulator is as given in the section explaining the ticketer operation.

The termination of these marking leads on the banks of switch "510" are as follows:

All codel code "W" marking leads from switch 210 terminate on level associated with wipers 515 and 516, codel code "X" marking leads terminate on level associated with wipers 517 and 518, codel code "Y" marking leads terminate on level associated with wipers 519 and 520, and codel code "Z" marking leads terminate on level associated with wipers 521 and 522 of switch 510.

Most of the foregoing information is merely stored on codel relays in the tabulator for later transmission to the perforator and has no effect on the operation of the tabulator. The following exceptions must be noted.

When the wipers of switch 210 encounter the seventh bank terminals the following operations take place:

*Seven digit calls*

Absence of ground on the level associated with wiper 214 indicates that this call is a seven digit call.

The ticketer identity hundreds digit in the form of ground encountered on the level associated with wiper 215 closes the circuit to 140. Relay 140 operates, locks at 730, and connects ground through leads W8 and Z8 to levels associated with wipers 515 and 521 of switch 510 to mark a digit 1 as the hundreds digit of the ticketer identity.

Ground on the level associated with wiper 516 indicates a change of toll rates during a call. Relay 610 operates upon ground encountered on this level, locks at 730, and transfers from day to night rate or vice versa.

Ground on the level associated with wiper 517 closes the circuit to 320. Relay 320 operates and closes ground to lead 350 to start the radexer if provided. The radexer is a unit which converts a certain office code (codels 21, 22 and 23) to a rate index in form of ground on leads W61 to Z62.

*Ten or eleven digit calls*

Ground on the level associated with wiper 214 indicates a ten or eleven digit call which closes the circuit to 770. Relay 770 operates and locks at contacts 338. At contacts 771, 770 removes ground from armature spring 846 to prevent later grounding of the short haul perforator start lead 803, and connects a direct ground to the short haul perforator guard lead 804. Contacts 773 short out winding #1 of relay 440, and at contacts 776, 770 opens, the locking circuit of 440 which is also the operating circuit of 430 in series with 440. Contacts 772 close a path from switch 510, bank terminals 6, 7 and 32 of levels associated with wipers 513 and 514 to the coil of relay 815. Finally contacts 775 of 770 close ground to coil of 410 which is connected in series with relay 420. 410 and 420 operate to connect codels 21, 22 and 23 which in this case indicate the area code of the called number, and codels 24, 25 and 26 which in this case indicate the ABC code of the called number, to the proper bank terminals of switch 510. These connections are made as follows:

W21 is closed to bank terminal 26, level associated with wiper 516 of switch 510.

X21 is closed to bank terminal 26, level associated with wiper 518 of switch 510.

Y21 is closed to bank terminal 26, level associated with wiper 520 of switch 510.

Z21 is closed to bank terminal 26, level associated with wiper 522 of switch 510.

Codel 22 is closed in a similar manner to the bank terminals 25 on the appropriate levels.

Codel 23 is similarly closed to bank terminals 24.

Codel 24 is closed to bank terminals 23.

Codel 25 is closed to bank terminals 22.

Codel 26 is closed to bank terminals 21.

The operations on bank terminals seven of level associated with wipers 215, 216 and 217 of switch 210 are the same as explained for a seven digit call.

Ground on the various tenth bank terminals of switch 210 closes the circuits to W31, X31 or Z31 whichever is associated to these grounded terminals (see chart). The codel relays W31, X31, Y31 or Z31 operate, lock at 730, and close the circuit to 220. Relay 220 operates and connects the stored information to levels associated with wipers 515, 517, 519 and 521 of switch 510, if connection to these points is provided.

When the wipers of switch 210 reach the 22nd bank position, ground on various levels closes the circuit to relays of codel 1 associated to these levels (see chart). The codel relays W1, X1, Y1 or Z1 operate and close ground to an associated relay "C" such as 860, 870, etc. (one at a time). The energized relay "C" operates and closes ground to the ABC office code terminals.

Tabulator is arranged to identify calling number ABC—office code from a maximum of ten offices. One "C" relay such as 860, 870, etc. is associated with each office code. Relays such as 860, 870, etc. are normally provided as required to identify calling number ABC—office code. The contacts of the corresponding relay are connected as required at the terminal block to codel leads W, X, Y and Z of the numbers 37, 38 and 39, representing the "A" digit, "B" digit and "C" digit, respectively, of the calling number ABC—office code. (See chart for code of combination to mark a decimal digit.)

When wiper 213 of switch 210 steps off its 23rd bank position, the circuit to relay 710 is opened and it stops pulsing because all data has been transferred to the tabulator. The ticketer releases at this time due to local release in that circuit. Further, the circuit is closed to relay 845 through terminal bank 24 of switch 210 on ten or eleven digit calls.

On a seven digit call, the circuit will be closed to 845 and 440. Relay 845 does not operate at the present time. Relay 440 operates, locks at 120, closes the circuit to 430 through #2 440, and closes codel Y23 to terminal 21 level associated with wiper 519 of switch 510. Relay 430 operates, shorts #1 440 which permits relay 845 to operate, closes codels W23, W22 and W21 to the terminals 21, 22 and 23 of the level associated with wiper 515, closes codels X23, X22 and X21 to the terminals 21, 22 and 23 of the level associated with wiper 517, closes codels Y22 and Y21 to the terminals 22 and 23 of the level associated with wiper 519, and closes codels Z23, Z22 and Z21 to the terminals 21, 22 and 23 of the level associated with wiper 521 of switch 510.

Relay 845 operates and closes ground to lead 803 on a seven digit call (short haul) or to lead 805 on a ten or eleven digit call (long haul) and removes ground from guard lead 804 on 7 digit calls or from guard lead 806 on 10 or 11 digit calls.

PERFORATION OF TICKET TAPES

The function of punching the tapes begins after the transfer of the data from the ticketer to the tabulator has ended. Upon switch-through to a perforator, ground pulses are returned on lead 801. On the first pulse received, relay 810 operates through its #2 winding, operates its "X" contacts 811 which closes the circuit to its #1 winding. At the end of the first pulse, relay 810 operates fully and closes the pulsing circuit to 750. Relay 750 follows the pulses received from lead 801. Each operation of relay 750 closes a ground to 807 (tape feed) and closes a pulse to magnet 510 causing switch 510 to advance, one step at a time.

Relays 620 (W), 630 (X), 640 (Y) and 650 (Z) operate on ground mark encountered on each position of switch 510, thus operating their associated punch magnets to set up the perforated code for the particular decimal digit.

When relay 750 restores on each pulse, switch 510 advances to the next contact and immediately positions relays (W), (X), (Y) and (Z) for the next digit. The reoperation of relay 750 closes the punch magnets to punch the code in the tape and advances the tape.

Data are punched on the tapes in the following order (all data are punched in reverse order):

Rotary switch bank:

Contacts 1*—Tabulator identity, units digit (lead 50)
Contacts 2*—Tabulator identity, tens digit (lead 40)
Contacts 3—Ticketer identity, units digits (codel 6)
Contacts 4—Ticketer identity, tens digit (codel 7)
Contacts 5—Ticketer identity, hundreds digit (codel 8)
Contacts 6—Transender number, units digit (lead 6) (not on 10 digit tape)
Contacts 7—Transender number, tens digit (lead 7) (not on 10 digit tape)
Contacts 8*—Clock time, units minutes digit (lead 48)
Contacts 9*—Clock time, tens minutes digit (lead 47)
Contacts 10*—Clock time, units hours digit (lead 46)
Contacts 11*—Clock time, tens hours digit (lead 45)
Contacts 12*—Calendar day, units digit (lead 44)
Contacts 13*—Calendar day, tens digit (lead 43)
Contacts 14*—Calendar month, units digit (lead 42)
Contacts 15*—Calendar month, tens digit (lead 41)
Contacts 16*—Called number, 5th digit (codel 31) (not on tape)
Contacts 17—Called number, 4th digit (codel 30)
Contacts 18—Called number, 3rd digit (codel 29)
Contacts 19—Called number, 2nd digit (codel 28)
Contacts 20—Called number, 1st digit (codel 27)
Contacts 21—Called number, office code "0" digit (codel 26) (codel 23 on 7 digit call)
Contacts 22—Called number, office code "B" digit (codel 25) (codel 22 on 7 digit call)
Contacts 23—Called number, office code "A" digit (codel 24) (codel 21 on 7 digit call)
Contacts 24—Called number, 3rd area code (codel 23) (not on 7 digit tape)
Contacts 25—Called number, 2nd area code (codel 22) (not on 7 digit tape)
Contacts 26—Called number, 1st area code (codel 21) (not on 7 digit tape)
Contacts 27—Conversation time units digit (min.) (codel 34)
Contacts 28—Conversation time tens digit (min.) (codel 33)
Contacts 29—Conversation time hundreds digit (min.) (codel 32)
Contacts 30—Rate index, night rate (codel 62) (not on 7 digit tape)
Contacts 31—Rate index, day rate (codel 61) (not on 7 digit tape)
Contacts 32—Class of service, (lead 32) (not on 10 digit tape)
Contacts 33—Calling number, 4th digit (codel 5)
Contacts 34—Calling number, 3rd digit (codel 4)
Contacts 35—Calling number, 2nd digit (codel 3)
Contacts 36—Calling number, 1st digit (codel 2)

Contacts 37*—Calling number, office code "C" digit (lead 39)
Contacts 38*—Calling number, office code "B" digit (lead 38)
Contacts 39*—Calling number, office code "A" digit (lead 37)
Contacts 40*—Ground stops tape-advances switch 510 but not tape
Contacts 41*—Ground starts signal (for printer and card punch)
Contacts 42*—Ground release Items marked "*" are connected directly to the tabulator or are permanently wired; all other items are in codels.

When wiper 513 of switch 510 steps to bank position 8, the circuit is closed to 760. Relay 760 operates and grounds the guard lead 701 of the dater-timer to prevent any change in clock and calendar time until the data have been completely recorded. Relay 760 also grounds lead 702 to register a completed call. Relay 760 restores after the wipers set off the 15th bank terminal.

When wiper 513 of switch 510 engages bank terminal 6, 7 and 32 on a ten or eleven digit call (long haul), ground is closed to 815. Relay 815 operates, opens ground from lead 807 which stops the tape, and prevents relay 830 from operating.

(Codels Z6, Z7 and Z32 are grounded to insert arbitrary zeros to give similar tapes for all of toll calls.)

When the wiper 513 of switch 510 reaches the bank terminal N, ground is closed to 815. Relay 815 operates, opens ground from lead 807 to stop the tape since there is no information stored on this terminal, and prevents 830 from operating. Relay 815 operates again on bank terminal 40 of the level associated with wiper 514.

When the wiper 513 of switch 510 reaches bank terminal 16, ground is closed to operate relay 815 to permit the 2720 switch to step over this point without advancing the tape. Relay 815 opens lead 807 and prevents relay 830 from operating since there is no information stored on this bank position. Ground on bank terminals 24, 25 and 26 level of the levels associated with wipers 513 and 514 of switch 510, on a seven digit call, operates relay 815, opens lead 807 and prevents 830 from operating since there is no information stored on these bank positions.

Ground on bank terminals 30, 21 and 40 level of the levels associated with wiper 514 of switch 510 causes the same operations as explained above. Ground on bank position 41 shunts relay 830 because on these terminals all four relays W, X, Y and Z operate to indicate the start signal for the card punch operation which would close the circuit to 830.

Ground on bank terminal 42 of level of the level associated with wiper 514 operates relay 740 which starts the operations for the release of this circuit.

CONTINUITY CHECK AND CODEL MONITORING (The wipers of switch 2720 in the ticketer are on terminals 1 when the tabulator is seized.)

Relay 130 operates and grounds relay 820 when the tabulator is seized; this is as described in the section earlier. Relay 820 operates, lights the tabulator access busy lamp on the ticketer monitor panel. If all circuits are complete, the circuit is closed to 140 through resistor 802 (2000 ohm) and through the "continuity check" circuit to ground in the ticketer.

The "continuity check" circuit is a series circuit which traces back and forth between the tabulator and ticketer and serves to check the continuity of leads 2751 (W), 2752 (X), 2753 (Y), 2754 (Z) and 1382 between these circuits and the status of switches and relays for satisfactory ticketer-tabulator operation. The "continuity check" circuit traces through twenty-eight steps as follows:

| Step: | Tabulator |
|---|---|
| 1. | Battery through #1 winding of 140 |
| 2. | 2000 ohm resistor 802 |
| 3. | Contacts 824 |
| 4. | Rotary switch 210, wiper 214 |
| 5. | Relay 150, break combination 157 |
| 6. | Rotary switch 110, wiper 115 over a "W" lead 2751 to |
| **Step:** | **Ticketer** |
| 7. | Rotary switch 2720, wiper 2724 |
| 8. | Rotary switch 2720, contact 1 of level associated with wiper 2724 |
| 9. | Rotary switch 2720, contact 1 of level associated with wiper 2725 |
| 10. | Rotary switch 2720, wiper 2725 back over lead 2752 to |
| **Step:** | **Tabulator** |
| 11. | Rotary switch 110, wiper 116 |
| 12. | Relay 150, break combination 154 |
| 13. | Rotary switch 210, wiper 215, make combination 822 |
| 14. | Rotary switch 210, wiper 216 |
| 15. | Relay 150, break combination 156 |
| 16. | Rotary switch 110, wiper 117 over a lead 2753 to |
| **Step:** | **Ticketer** |
| 17. | Rotary switch 2720, wiper 2726 |
| 18. | Rotary switch 2720, contact 1 of level associated with wiper 2726 |
| 19. | Rotary switch 2720, contact 1 of level associated with wiper 2727 |
| 20. | Rotary switch 2720, wiper 2727 back over a lead 2754 to |
| **Step:** | **Tabulator** |
| 21. | Rotary switch 110, wiper 118 |
| 22. | Relay 150, break combination 158 |
| 23. | Rotary switch 210, wiper 217 |
| 24. | Relay 710, break combination 713 |
| 25. | Relay 130 preliminary make combination 135 |
| 26. | Relay 150, break combination 155 |
| 27. | Rotary switch 110, wiper 114 over a lead 1382 to |
| **Step:** | **Ticketer** |
| 28. | Relay 1340, break combination 1342 |
| 29. | Winding #1 relay 1340 |
| 30. | Ground through relay 1070 make combination. |

When the call is answered, ticketer relay 1050 operates, ticketer switch 2720 is stepped to terminal 1 and ticketer relay 1070 operates to supply ground for the "continuity check" circuit traced above. When relay 130 in the tabulator operates upon tabulator seizure, it grounds relay 730 which grounds relay 720. Since both relays 730 and 720 are slow-to-operate, relay 140 in the tabulator and 1340 in the ticketer operate in series and initiate subsequent tabulator-ticketer operation before relay 720 in the tabulator operated.

If the "continuity check" circuit is open, relay 140 does not operate, relays 730 and then 720 operate. Relay 720 locks to the busy key 112, grounds lead 1601 to step the tabulator allotter of Fig. 16 to the next tabulator and to shunt relay 120, opens lead 100 and lights the tabulator alarm lamp 825 in series with a supervisory alarm relay which initiates visual and audible alarm signals. Relay 120 releases, opens 130. Relay 130 releases, opens relays 730 and 820. Relays 730 and 820 release and the circuit is held idle by relay 720 but is guarded against reseizure until the open in the "continuity check" circuit is corrected and the busy key 112 is momentarily operated to release relay 720.

Assuming that the "continuity check" circuit is satisfactory, relay 720 will not operate and the tabulator will proceed to receive ticketing information from the ticketer and the dater-timer of Figs. 21–24 and will register this information on the perforator. These operations are described in detail in the preceding sections. During the tape perforating described, relay 750 starts pulsing. Relay 750 prepares the circuit for relay 830, closes ground to lead 807, and also causes switch 510 to scan the information in codel code form that is found on its banks.

The circuit through the contacts of relays 620, 630, 640 and 650 is used to test each codel digit sent to the perforator. Relays 620, 630, 640 and 650 operate upon ground received through the banks of switch 510.

Since the codel code consists of one or two markings out of a total of four markings, the circuit to relay 830 through these relays is arranged to remain open only when one or two relays release simultaneously and to remain closed and operate relay 830 when no relays or three or four relays release.

During each operation of relay 750, relays 620, 630, 640 and 650, corresponding to the code of the digit being registered, release to test for a correct code.

Relay 830 does not operate on the first pulse of relay 750 because its #1 winding is shunted by ground from the level associated with wiper 514, terminal N of switch 510. On the first step of switch 510 and thereafter, this ground shunt is removed to make the codel checking circuit effective.

When relay 830 operates because of an incorrect codel code, it locks at the busy key 112, opens the "scanning check" circuit to relay 140, opens 810 which restores and opens 750 to stop stepping of switch 510, connects 120 i.p.m. lead 1003 and battery through resistor 828 (100 ohm) to the red tabulator alarm lamp 825 and grounds lead tabulator alarm 827 through resistor 826 (500 ohm). Lamp tabulator alarm 825 flashes at 120 i.p.m. to mark this tabulator. Ground on lead tabulator alarm 827 flashes visual and audible common alarm signals by operating a remotely located alarm relay. Relays 130, 140, 820, 730, 830 and various codel relays remain operated while the tabulator remains connected to the ticketer until relay 830 is released by the momentary operation of the busy key 112.

RELEASE

When the switch 510 has completed the scanning of all data, the wiper 514 advances to contact 41. Relay 740 operates when switch 510 reaches contact 42, opens relays 130 and 140, closes a multiple ground to lead 1601 to make the tabulator busy to all ticketers during the release operation, and grounds lead 827 tabulator alarm to start a time to signal an audible alarm if relay 740 does not release within a certain time interval. Relays 140 and 130 restore.

Relay 130 releases 820 and 730. Relay 820 restores and opens ground from tabulator busy lead 100′. Relay 730 restores, releases all codel relays, disconnects ground from relay 840, opens, closes ground through 740, the RSON springs 212 and RS INT 211 springs to switch 210. Relay 810 restores and opens the pulsing circuit to 750. Switch 210 steps self-interrupted to its normal position at which point its RSON springs 212 transfer the relay ground to magnet 510 through its RSON 512 and RS INT. springs 511. Switch 510 steps self-interrupted to its normal position. Relay 740 remains operated over its #1 winding until switch 510 is normal and its RSON springs 512 open the circuit to relay 740. (It should be noted that the normal or "home" position of switch 210 is terminal 25 and not terminal N.)

ROUTING TESTS

Lead 1501 is grounded from the ticketer monitor panel in order to test ticketer-tabulator operation. Relay 660 operates and grounds slow-to-operate relay 150. Relay 150 operates, grounds relay 120 to prevent rotary hunting operation of switch 110, transfers the tabulator from the leads 1394, 1391 and 1393 of the ticketer multiple through switch 110 to the ticketer test commons, and connects magnet 110 to the #1 winding of relay 130 via contacts 152 and contacts 661 or 660. Relay 660 also opens leads 671, 672, 673, 674 from the tabulator finder banks and connects the tabulator instead to leads 675, 676, 677 and 678 which connect to the test perforator. Finally relay 660 causes the operation of relay 850. Relay 850 disconnects the tabulator from its connection to leads 807 and 801 in the tabulator finder multiple, and closes instead a connection to leads 679 and 680 into the test perforator. Relay 850 also grounds guard leads 804 and 806 and opens leads 803 and 805.

TABULATOR FINDER CIRCUIT ASSOCIATED WITH A SHORT HAUL PERFORATOR

Ground encountered on lead 803 indicates that a tabulator requests perforator service.

Relay 1860 is normally operated, provided that there is a perforator available for service. If none of the perforators are available, relay 1860 restores and closes ground via lead 1880 to the traffic register equipment. As soon as one of the perforators connected to contacts 1844 becomes idle, relay 1860 reoperates.

Ground on lead 803 closes the circuit to relay 1850. Relay 1850 operates and closes the circuit to magnet 1845. Magnet 1845 operates from ground at contacts 1861 and opens its INT. springs 1846. Magnet 1845 restores and advances its wipers one step. This self-interrupted stepping continues until an idle perforator is found or the lead at contacts 1844 is opened to release relay 1860 which removes ground from bank terminal N. Magnet 1845 will stop at bank terminal N until one of the perforators is available. Idle perforators have absence of ground on the lead such as from contacts 1843 of the tabulator finder circuit associated with them.

When switch 1845 steps to an idle perforator, the absence of direct ground on the bank terminals permits relay 1830 of the tabulator finder circuit to operate through magnet 1845. (Magnet 1845 does not operate at this time.) Relay 1830 operates, closes the circuit to magnet 1810 from ground encountered on the level associated with wiper 1811 bank terminal N of switch 1810, and shorts the number one winding of relay 1835.

Magnet 1810 operates, operates its INT. springs 1810′ which open the circuit to 1810. Magnet 1810 restores and advances its wipers one step (bank terminal 1). Magnet 1810 is now attached to lead 804 via its INT. springs 1810′.

Idle tabulators maintain ground on their respective leads 804. This ground on lead 804 shorts the number one winding of relay 1835, thus preventing its operation and completes the circuit to magnet 1810. Switch 1810 steps self-interruptedly from ground encountered on lead 804 until it reaches the bank terminals associated with the tabulator requiring a perforator.

Lead 804 of this position is open, thus removing the short from the number one winding of relay 1835. Relay 1835 operates in series with magnet 1810 (however, 1810 does not operate at this time), closes the number two winding of 1835 through its "X" contacts 1838 via the level associated with wiper 1812 of switch 1810, lead 1881, and relay 840 to ground at contacts 731 in the tabulator, and opens lead 804. Relay 1835 now locks in series with relay 840 in the tabulator, transfers ground from the lead to relay 1860 to the lead to the associated bank terminal of 1845 to mark the tabulator finder circuit and the associated perforator busy, shorts 1830, closes the circuit to 1820, and closes ground at contacts 1839′ to the lead to relay 1855 to start the motor 1878 in the perforator. Relay 1830 restores and opens part of the circuit to magnet 1810. Relay 1820 operates and connects the respective leads 671, 672, 673, 674, 807 and 801 through contacts 1821, etc. of relay 1820 to the perforator circuit. The operations of transferring data can now take place.

RELEASE

When all data have been transferred to the perforator, ground is disconnected from lead 1881 which opens the circuit to 1835. Relay 1835 restores, removes ground from the lead to relay 1855 to stop the motor 1878 in the perforator, opens lead 1881 from its #2 winding, transfers ground from the lead to the associated bank terminal of switch 1845 back to the lead to relay 1860 to mark this tabulator finder and the associated perforator idle, opens the short from relay 1830, opens the circuit to 1820, and prepares the circuit to magnet 1810. Relay 1820 restores and opens leads 671, 672, 673, 674, 807 and 801.

When the perforator runs out of tape, the tape out alarm switch 1877 operates and removes ground from the lead to relay 1840. Relay 1840 which is normally operated restores, closes ground on lead 1882 to an audible alarm circuit via lead audible 1883, closes a perforator alarm circuit via leads 1884 and 1885, grounds the lead to the bank of 1845 and removes ground from the lead to relay 1860 to mark the tabulator finder and the associated perforator busy.

TAPE PERFORATOR

When the associated tabulator has received the call data, ground is closed to relay 1855 from contacts 1839'. Relay 1855 operates, closes the motor circuit at 1857 and closes ground at 1856 to the pulsing contacts 1876 in the contact box. As the motor 1878 revolves, the pulsing contacts in the contact box close ground pulses over lead 801 to a repeater relay 750 in the tabulator. The repeater relay 750 repeats these pulses to lead 807 and, at the same time, steps a rotary switch 510 in the tabulator which has the call data stored in codel code on its bank terminals. As the rotary switch steps 510, it scans one digit at a time of the call data. As each digit is scanned, ground is closed to the various leads 671, 672, 673 and 674.

When the motor begins to revolve on its first cycle of revolution, the pulsing contacts close a ground pulse over lead 801 to the repeater relay in the tabulator. The repeater relay 750 operates, closes ground pulse to lead 807, and energizes the magnet of the rotary switch 510 in the tabulator. Tape feed magnet 1875 operates from the ground pulse on lead 807 and positions the tape feed mechanism. At the end of the first pulse, magnet 1875 restores and the rotary switch in the tabulator advances its wipers to the first bank terminal, causing ground to be closed to various leads 671, 672, 673 and 674 equivalent to the digit stored on the first bank terminal. The various magnets 1870 through 1874 operate and position their respective punching mechanisms. As the motor continues its first cycle of revolution, an eccentric on the shaft causes the positioned punching mechanism to perforate the tape according to the magnets which have operated. After the tape has been perforated, a feed wheel advances it one notch. As the motor begins its second cycle of revolution, the pulsing contacts close a second ground pulse over lead 801 to the repeater relay 750 in the tabulator. The repeater relay 750 operates, closes a ground pulse to lead 807, and energizes the magnet of the rotary switch 510 in the tabulator. Tape feed magnet 1875 operates from the ground on lead 807 and positions the tape feed mechanism. At the end of this second pulse, magnet 1875 restores and the rotary switch 510 in the tabulator advances its wipers to the second bank terminal, causing ground to be closed to various leads 671, 672, 673 and 674 equivalent to the digit stored on the second bank terminal. The various magnets 1870 through 1874 operate and position their respective punching mechanisms. As the motor continues on its second cycle of revolution, an eccentric on the shaft causes the positioned punching mechanisms to perforate the tape according to the magnets which have operated for the second digit. After the tape has been perforated for the second time, the feed wheel advances it another notch. This cycle of operation continues until all the call data has been perforated on the tape.

After all the call data has been transferred to the perforator, the tabulator opens lead 803. Relay 1855 restores, opens the motor circuit, and removes ground from the pulsing contacts 1876.

Normally, ground appears on lead 1882 and on the lead to relay 1840. When the perforator runs out of tape, the tape out alarm switch 1877 operates, closes ground over lead 1886 to an alarm circuit and opens the lead to relay 1840. This busies the associated tabulator finder which then closes the ground on lead 1882 to an audible alarm circuit and closes resistance battery to light a red perforator alarm lamp. Operation of a locking tape alarm cut-off key removes ground from lead 1882 to open the audible alarm circuit and opens the lead to relay 1840.

START OF DATER-TIMER

The dater-timer normally operates continuously. If a dater-timer transfer circuit is provided, and the key is normal, bar relay 1610 is operated, connecting dater-timer number 1 into service. If the turn key is turned, a second relay is operated connecting a second dater-timer into service. Unless "X" wiring is provided, both dater-timers have their TP lead connected and they may step simultaneously, however, only one dater-timer is connected to the tabulators.

The dater-timer is started by operating the locking start key 2960. Operation of the start key 2960 closes lead 1750' to relay 2920. Ground pulses appear on lead 1750' at the rate of 10 i.p.m. from the rotary interrupter circuit of Fig. 17.

*Stepping*

Each time a ground pulse is closed to lead 1750', relay 2920 operates and closes a ground pulse to magnet 2910. Magnet 2910 follows the pulses and each time it restores, the wipers of switch 2910 are advanced one step. Thus, switch 2910 advances its wipers one step every 6 seconds (10 steps per minute) except when the wipers engage the 21st through 26th (normal) bank terminals. These bank terminals are wired so as to cause self-interrupted stepping to the 1st bank terminal after the 20th step.

*Time of day marking*

Each time the wipers of switch 2910 are engaged on the tenth or twentieth bank terminal, the circuit is closed to relay 2940 as the succeeding pulse closes 2920. Relay 2940 will, therefore, be operated once each minute. Relay 2940, when operated, closes ground from the start key 2960 to magnet 2930. Should a tabulator call for date and time information while relay 2940 is operated, ground closed over the guard lead 701 will hold 2940 operated until the tabulator has picked up the information. This forestalls improper time marking due to rotary switch movement.

Magnet 2930 operates once a minute from relay 2940; when relay 2940 restores, magnet 2930 restores and advances the switch wipers to the next bank contacts. Whenever wipers 2930 reach the 10th or 20th bank terminals, the next pulse to switch 2930 from relay 2940 will cause a circuit to be closed to switch 2950 through the interrupter springs 2932. When magnet 2930 restores, magnet 2950 restores and advances the switch wipers to the next bank contacts. The 21st to the 26th (normal) bank contact of switch 2930 are wired to cause self-interrupted stepping to the 1st bank contact after the 20th step. Terminals of levels associated with wipers 2934 and 2935 are connected to leads UM–W through UM–Z in such a manner that ground from wipers 2934 and 2935 is forwarded over these leads to mark in codel code the units minutes digit corresponding to the position of the switch. Terminals 2 to 11 correspond to one ten minute interval and terminals 12 to 20 and 1 correspond to the second ten minute interval.

The following codel code is used:

| Code leads grounded: | Decimal value |
|---|---|
| WX | 1 |
| WY | 2 |
| WZ | 3 |
| XY | 4 |
| XZ | 5 |
| YZ | 6 |
| W | 7 |
| X | 8 |
| Y | 9 |
| Z | 0 |

Switch 2950 is stepped once every ten minutes and pulses switch 3040 in like manner on the 6th, 12th, 18th and 24th bank terminals of switch 2950; i.e., once an hour.

The 25th and 26th (normal) bank contacts of switches 2950 and 3040 are wired so as to cause self-interrupted stepping to the 1st contact.

The twenty-four positions of switch 2950 mark four groups of six ten minute intervals which correspond to four hours of time. Terminals 1 to 6, 7 to 12, 13 to 18 and 19 to 24 of the levels associated with wipers 2954 and 2955 are connected to leads TM–W through TM–Z to mark in codel code these four groups of 1 to 6 ten minute intervals corresponding to the position of the switch.

The twenty-four positions of switch 3040 correspond to the hours of the day. The levels associated with wipers 3045 and 3046 are connected to leads UH–W through UH–Z to mark in codel code the unit hours and the levels associated with wipers 3047 and 3048 to mark the tens hours on lead TH–W through TH–Z.

DAY AND NIGHT RATE INDICATIONS

This circuit provides the tabulators with a night and day rate indication. The night and day rate intervals are adjustable and are controlled by strapping on a terminal block 3060 and the bank terminals of the level associated with wipers 3049 of switch 3040. If the night rate is to start at the middle of an hour (i.e. 4:30, 5:30, etc.), terminal 4 is strapped to terminal 1; if at the beginning of an hour (i.e. 4:00, 5:00, etc.), terminal 4 is strapped to terminal 2 as shown by dotted lines.

If the day rate is to start at the middle of an hour, terminal 3 is strapped to terminal 1 as shown by a solid line, if at the beginning of an hour, terminal 3 is strapped to terminal 2. Terminals 5 and 6 are strapped to the level associated with wiper 3049 bank terminal of switch 3040 corresponding to the hour at which the day and night rates are to start. Lead "00" of switch 3040 corresponds to 12:00 midnight, "01" to 1:00 a.m., etc. and "12" to 12:00 noon, "13" to 1:00 p.m., etc. Terminal 5 is strapped to the lead corresponding to the hour at which the day rate is to start and terminal 6 is strapped to the lead corresponding to the hour at which the night rate is to start.

For purposes of explanation, assume the day rates are to start at 4:30 a.m. and the night rates at 6:00 p.m. Thus, terminal 1 is strapped to terminal 3, terminal 2 to terminal 4, terminal 5 to lead 04 shown by solid line of switch 3040 and terminal 6 to lead 18 shown by dotted line. Relay 3020 will operate at 6:00 p.m. when ground from the wiper 2954 of switch 2950 is closed to terminal 2 strapped to terminal 4, and resistance 3061 (1) battery from lead 18 is closed to terminal 6. Relay 3020 locks through its #2 winding, closes ground on leads 3063 and 3062 from the dater-timer transfer circuit to leads 3065 and 3064, closes 3030, and closes ground over lead 2750′ to the ticketers. Relay 3030 operates and opens lead 2750. The #1 winding of 3020 is opened after 10 minutes when switch 2950 advances its wipers. However, relay 3020 remains operated on its #2 winding until the start of the day rate.

Relay 3010 will operate at 4:30 a.m. each week day (except Sunday) when ground from the wipers 2953 of switch 2950 is closed to terminal 1, and resistance 3061 battery from lead 04 is closed to terminal 5. Relay 3010 opens the #2 winding of relay 3020 and closes ground to lead 2750′. Relay 3020 restores, opens 3030 and closes ground on leads 3032 and 3063 from the dater-timer transfer circuit to leads 3066 and 3067. Relay 3030 restores and opens lead 2750′. Relay 3010 will restore after ten minutes when switch 2950 advances its wipers.

*Night rate indication during Sundays and holidays*

This circuit is arranged to maintain a night rate indication during the Sunday period. A night rate indication during any week day period for holiday rate can be provided by positioning the selector switch 3120 to the desired day (position 1 corresponds to Monday, position 2 for Tuesday, position 3 for Wednesday, etc.).

Once each day switch 3040 (hours) reaches its 24th bank terminal. The circuit is closed to relay 3050 and magnet 3210 when the next hour pulse is closed to magnet 3040. Relay 3050 operates once each day and advances its wipers. The 1st bank terminal of switch 3110 corresponds to Sunday, the 2nd to Monday, etc. up to the 7th which corresponds to Saturday. The 8th through the 11th (normal) bank terminals are wired to cause self-interrupted stepping to the 1st bank terminal after the 7th step.

In effect, the night rate indication is maintained by preventing relay 3010 from operating. Each time (Sunday) when switch 3110 steps to the 1st bank terminal, relay 3010 is prevented from ever operating, thus maintaining a night rate indication.

Positioning the selector switch 3120 to any position 1 through 6 will also prevent relay 3010 from operating on the weekday corresponding to the position. Thus, a holiday night rate can be maintained on any weekday. If the selector switch 3120 is not restored to the "off" position by the end of the day for which the holiday night rate is maintained, ground on wiper 3113 of switch 3110 is closed to lead 3150 as switch 3110 advances its wipers to the next bank terminal (day).

DATE

The day of the month is indicated by switch 3210, the month by switch 3130.

Switch 3210 is stepped once a day when switch 3040 (hours) reaches its 24th bank contact. This switch makes two half revolutions a month. Contacts 21 through 26 (normal) of the level associated with wiper 3214 are grounded in turn through wiper 3214 so that the switch is stepped self-interrupted to the 1st bank contact after having been stepped to the 21st bank contact. The 1st bank contact on the second half revolution corresponds to the 20th day.

Terminals 1 to 20 of the levels associated with wipers 3214 and 3215 of switch 3210 are connected to leads UD–W through UD–Z and mark in codel code digit 0 for terminal 1, digits 1 to 9 for terminals 2 to 10, digit 0 for terminal 11 and digits 1 to 9 for terminals 12 to 20. These are the unit digits for the days of the month.

One of the two blades of wipers 3216, 3217, 3218, 3219 and 3219′ are removed so that during the first half revolution only wipers 3217 and 3219 engage their banks and during the second half revolution only wipers 3216, 3218 and 3219′ engage their banks. Levels associated with wipers 3217 and 3219 of switch 3210 mark digits 0 and 1 and levels associated with wipers 3218 and 3219′ mark digits 2 and 3; these are the tens digits for the days of the month. In this way during the first half revolution, switch 3210 marks the first 19 days (01–19) and during the second cycle it marks the remaining days of the month.

Only terminals 10 to 13 of the level associated with wipers 3216 which correspond to the last days of the month are used. When wiper 3216 reaches the terminal corresponding to the last day of the month, a circuit is closed from ground through wiper 3133 or 3134 of switch 3130 (month) to relay 3220 depending on the position of that switch. By this means, 3210 can supply varying date information for 28, 29, 30 and 31 days per month.

When relay 3220 operates, it locks itself to ground through the level associated with wiper 3213 of switch 3210 and closes the circuit of magnets 3210 and 3130. Magnet 3210 interrupts its own circuit and advances its wipers to the 2nd bank contact at which point the ground for relay 3220 and magnet 3210 is opened. The 2nd bank contact corresponds to the first day of the month.

Magnet 3130 remains operated while relay 3220 is operated. Switch 3130 advances its wipers one step upon release, i.e., it makes one step per month.

The months are marked by the levels associated with wipers 3135, 3136, 3137 and 3138 of this switch. Levels associated with wipers 3133 and 3134 serve to control end of month indication of switch 3210 as previously described. Wipers 3133 and 3134 are split so that they make contact only during one half revolution. Contacts 25 and N of the levels associated with wipers 3133 and 3134 are wired to return switch 3130 to the 1st bank contact after leaving the 24th contact, i.e., once every two years. Switch 3130 makes one complete revolution every four years.

BANK WIRING

The banks of the various rotary switches provide the required rate and time information in code for the various digits. The leads grounded for the code equivalent of a digit are listed in on earlier section for the codel code.

RESET KEYS

Non-locking reset keys 2592, 3042, 3112, 3212, 3132 are provided to permit initial setting or resetting of time and date readings by manual control.

When this is required, the start key 2960 should be first restored to normal. The setting of the five rotary switches should be made in this order: 2930, 2950, 3040, 3210 and 3130.

START

When the non-locking start key 1741 is operated, it closes ground to relay 1730 via lead INT. 1. Relay 1730 operates and connects the various springs of the cams 1711, 1712 and 1713 to their respective leads (1003, 1750 and 1381, etc.). In addition relay 1730 closes the circuit to relay 1720.

Relay 1720 operates and connects 115 v. commercial power via contacts 1721 and 1722 and through plug 1714 and jack 1715 to the A.C. motor 1710. The cam 1712 sends 10 i.p.m. ground to the various ticketers via leads 1750, cam 1714 sends 60 i.p.m. ground to the dater-timer, and cam 1711 sends 120 i.p.m. ground via lead 1003.

While one embodiment of the invention has been disclosed, it will be understood that various modifications may be made therein which are within the true spirit and scope of the invention.

What is claimed is:

1. In an automatic telephone system wherein a completed call between a calling and called station is charged at a rate dependent on the time of day at which the call is terminated, a first exchange including switching apparatus and a calling station identified by a plural digit directory number, a second exchange including switching apparatus and a called station identified by a plural digit directory number, toll ticketing equipment including a toll ticketing repeater in said first exchange, a dater timer accessible to said repeater, first means in said dater timer to send a single periodic pulse at fixed intervals of time to the repeater via a first path, second means in said dater timer to send codes corresponding to the date and time of day to said toll ticketing equipment, and third means in said dater timer to send a single pulse via a separate path to said repeater at the time when a succeeding rate is to become effective, control means at said calling station for operating said switching apparatus in said first exchange to extend a connection to said repeater, a register device individual to said repeater, means in said repeater directly controlled by said control means at said calling station for operating said register device to record each of the digits of said called station directory number and to register the directory number of the calling station, other means in said toll ticketing equipment for extending said connection from said repeater by way of said second exchange switching apparatus in accordance with said called station directory number in order to connect said calling and called stations, timing means in said repeater effective to count said single periodic pulses via said first path, and rate change register means in said repeater operated in response to said pulse via said separate path, said dater timer comprising registers to register the fractional hour and the units and tens digits of the hour of the day, the units and tens digits of the day of the month and the month of the year, and means controlled jointly by the setting of said month and day registering means for advancing said month registering means at the end of twenty-eight days in the month of February in years other than leap years and for advancing said month registering means at the end of twenty-nine days in the month of February in the leap years, and means in said toll ticketing equipment responsive to said change of rate indication registered in said repeater during the progress of a call, to register said rate as that of a preceding period in said register with said calling and called numbers and to transfer said information to a toll ticket upon termination of a call.

2. In an automatic telephone system wherein a completed call between a calling and called station is charged at a rate dependent on the time of day at which the call is terminated, a first exchange including switching apparatus and a calling station identified by a plural digit directory number, a second exchange including switching apparatus and a called station identified by a plural digit directory number, toll ticketing equipment including a toll ticketing repeater in said first exchange, a dater timer accessible to said repeater, first means in said dater timer for sending a single periodic pulse at fixed intervals of time to the repeater via a first path, second means in said dater timer to send codes corresponding to the date and time of day to said toll ticketing equipment, and third means in said dater timer to send a pulse via a separate path to said repeater at the time when a succeeding rate is to become effective, control means at said calling station for operating said switching apparatus in said first exchange to extend a connection to said repeater, a register device individual to said repeater, means in said repeater directly controlled by said control means at said calling station for operating said register device to record each of the digits of said called station directory number and to register the directory number of the calling station, other means in said toll ticketing equipment for extending said connection from said repeater by way of said second exchange switching apparatus in accordance with said called station directory number in order to connect said calling and called stations, timing means in said repeater effective to count said single periodic pulses via said first path and rate change register means operated in response to said pulse via said separate path, said dater timer comprising registers to register the fractional hour and the units and tens digits of the hour of the day, the units and tens digits of the day of the month and the month of the year, means controlled jointly by the setting of said month and day registering means for advancing said month registering means at the end of twenty-eight days in the month of February in years other than leap years and for advancing said month registering means at the end of twenty-nine days in the month of February in the leap years, said second means in said dater timer responsive to the setting of said registers for registering the fractional hour and the units and tens digits of the hour of the day and fourth means in said dater timer for forwarding to the toll ticketing equipment a night rate indication during the night and a day upon termination of the call rate indication during the day and including a means in said toll ticketing equipment responsive to said rate change register means to record the rate as that of the period preceding that indicated by said fourth means in said data timer.

3. In an automatic telephone system wherein a completed call between a calling and called station is charged at a rate dependent on the time of day and day of the month at which the call is terminated, a first exchange including switching apparatus and a calling station identified by a plural digit directory number, a second exchange including switching apparatus and a called station identified by a plural digit directory number, toll ticketing equipment including a toll ticketing repeater in said first exchange, a dater timer accessible to said repeater, first means in said dater timer, for sending a single periodic pulse at fixed intervals of time to the repeater via a first path, a second means in said dater timer to send codes corresponding to the date and time of day to said toll ticketing equipment, and third means in said dater timer to send a pulse via a separate path to said repeater at the time when a succeeding rate is to become effective, control means at said calling station for operating said switching apparatus in said first exchange to extend a connection to said repeater, a register device individual to said repeater, means in said repeater directly controlled by said control means at said calling station for operating said register device to record each of the digits of said called station directory number and to register the directory number of the calling station, other means in said toll ticketing equipment for extending said connection from said repeater by way of said second exchange switching apparatus in accordance with said called station directory number in order to connect said calling and called stations, timing means in said repeater effective to count said single periodic pulses via said first path, and rate change register means operated in response to said pulse via said separate path, said dater timer comprising registers to register the fractional hour and the units and tens digits of the hour of the day, the units and tens digits of the day of the month and the month of the year, and means controlled jointly by the setting of said month and day registering means for advancing said month registering means at the end of twenty-eight days in the month of February in years other than leap years and for advancing said month registering means at the end of twenty-nine days in the month of February in the leap years, fourth means in said dater timer responsive to the setting of said registers for registering the fractional hour and the units and tens digits of the hour of the day for forwarding to the toll ticketing equipment a night rate indication during the night and a day rate indication during the day upon termination of the call and including a manual settable means for controlling said night or day rate indicating means to indicate a night rate instead of a day rate on any desired day thereby permitting said dater timer to cause said toll ticketing equipment to charge night rates for calls extended during the day on selected holidays and recording means in said toll ticketing equipment responsive to said rate change register means to record the rate as that of the period preceding that indicated by said fourth means in said dater timer.

4. In an automatic toll ticketing telephone system a calling line, a called line, means for registering the designations of said lines, means for establishing a connection between said lines, timing means associated with said connection for registering the duration of said connection, recording means to record the duration of said call and the designations of said lines, means associated with said timing means to register a time rate indication in said recording means, said means associated with said timing means effective to register a change of rate indication in said timing means when such change occurs during the call, means responsive to the termination of said connection for operably associating said recording means with said timing means and said registering means and for then transferring all of the registered information to said recording means, means in said recording means to record a time rate for a preceding period when it detects a change of rate indication in said timing means.

5. In an automatic telephone system wherein a completed call between a calling and called station is charged at a rate dependent on the time of day at which the call is terminated, a first exchange including switching apparatus and a calling station identified by plural digit directory number, a second exchange including switching apparatus and a group of second stations identified by plural digit directory numbers, a toll ticketing repeater in said first exchange, control means at said calling station for operating said switching apparatus in said first exchange to extend a connection to said repeater, a register in said repeater, a tabulator and a recording device accessible to said repeater, said recording device capable of printing a call record at one of a plurality of rates, said register means in said repeater directly controlled by said control means at said calling station for operating said register to record each of the digits of the directory number of the called station, other means in said repeater for extending said connection from said repeater by way of said second exchange switching apparatus in accordance with said called station directory number and additional means for timing the duration of the connection between said calling and called stations, said last means responsive to a control from a timing means to register that a change in rates has occurred during the interval of the connection, means in said tabulator operated upon completion of said connection and prior to printing a call record when finding a change of rate indication in said additional means to cause said record to print the rate as that of a preceding period.

6. In a toll ticketing telephone system with a plurality of rates applicable for each type of call dependent upon the time of day of the initiation of the call, a toll ticket repeater, a toll data tabulator, a dater timer and a recorder, first means in said dater timer that send a pulse once each minute to the repeater via a first path, second means in said dater timer that send in code the time of day, date, and the rate applicable for that time to said tabulator, and third means in said dater timer that sends a pulse via a separate path to said repeater at the time when a succeeding rate is to become effective, first means in said repeater operated to register the directory number of a calling and called station, second means in said repeater effective to count said pulses via said first path from said dater timer during the duration of a completed toll call, and third means in said repeater operated in response to said pulse via said separate path from said dater-timer during the duration of a call, switching means for operatively connecting said recorder with said tabulator whereby said tabulator may control said recorder in accordance with the calling and called telephone numbers the total time, the date, time and rate to permanently record this pertinent data of a toll call, other means for operatively connecting said repeater with said tabulator upon the termination of a toll call, first register means in said tabulator effective upon connection with said repeater to accept the calling and called telephone numbers and the total count of said time pulses registered in said repeater, second register means in said tabulator to accept the time of day, date and the current applicable rate for that time of day from the dater timer after accepting the data from the repeater, third means in said tabulator operated upon detecting an operated condition of said third means in said repeater to change said current applicable rate indication from said dater timer to control said recorder to record the rate as that of the preceding time period.

7. In a toll ticketing telephone system with a day rate and a night rate, one of which rates is applicable for each type of call dependent upon the time of day of the initiation of the call, a toll ticket repeater, a toll data tabulator, a dater timer and a recorder, first means in said dater timer that send a single periodic pulse at fixed intervals of time to the repeater via a first path, second means in said dater timer that send codes corresponding to the time of day, date, and the rate applicable for that time to said tabulator, and third means in said dater timer that send a pulse via a separate path to said repeater at the time when a night rate is to become effective, first means in said repeater operated to register the directory number of a calling and called station, second means in said repeater effective to count said pulses via said first path from said dater timer during the duration of a completed toll call, and third means in said repeater operated in response to said pulse via said separate path from said dater-timer during the duration of a call, switching means for operatively connecting said recorder with said tabulator whereby said tabulator may control said recorder in accordance with the calling and called telephone numbers, the total time, the date, time and rate to permanently record this pertinent data of a toll call, other means for operatively connecting said repeater with said tabulator upon the termination of a toll call, first register means in said tabulator effective upon connection with said repeater to accept the calling and called telephone numbers and the total count of said time pulses, second means in said tabulator to accept the time of day, date and the current applicable rate for that time of day from the dater timer after accepting the data from the repeater, third means in said tabulator comprising a relay operated upon detecting an operated condition of said third means in said repeater to change said current applicable rate indication from said dater timer to control said recorder to record the rate as that of the day rate period.

8. In a toll ticketing telephone system with a day rate and a night rate one of which is applicable for each type of call dependent upon the time of day of the initiation of the call, a toll ticket repeater, a toll data tabulator, a dater timer and a recorder, first means in said dater timer that send a single periodic pulse at fixed intervals of time to the repeater via a first path, second means in said dater timer that send codes corresponding to the time of day, date, and the rate applicable for that time to said tabulator, and third means in said dater timer that send a pulse via a separate path to said repeater at the time when a day rate is to become effective, first means in said repeater operated to register the directory number of a calling and called station, second means in said repeater effective to count said pulses via said first path from said dater timer during the duration of a completed toll call, and third means in said repeater operated in response to said pulse via said separate path from said dater-timer during the duration of a call, switching means for operatively connecting said recorder with said tabulator whereby said tabulator may control said recorder in accordance with the calling and called telephone numbers, the total time, the date, time and rate to permanently record this pertinent data of a toll call, other means for operatively connecting said repeater with said tabulator upon the termination of a toll call, first register means in said tabulator effective upon connection with said repeater to accept the calling and called telephone numbers and the total count of said time pulses, second register means in said tabulator to accept the time of day, date and the current applicable rate for that time of day from the dater timer, third means in said tabulator comprising a relay operated upon detecting an operated condition of said third means in said repeater to change said current applicable rate indication from said dater timer to control said recorder to record the rate as that of the night rate period.

9. In a toll ticketing telephone system with a plurality of rates one of which is applicable for each type of call dependent upon the time of day of the initiation of the call, a toll ticket repeater, a toll data tabulator, a dater timer and a recorder, first means in said dater timer that send a pulse once each minute to the repeater via a first path, second means in said dater timer that send codes corresponding to the time of day, date and the rate applicable for that time to said tabulator, and third means in said dater timer that send a pulse via a separate path to said repeater at the time when a succeeding rate is to become effective, first means in said repeater operated to register the directory number of a calling and called station, second means in said repeater effective to count said pulses via said first path from said dater timer during the duration of a completed toll call, and third means in said repeater comprising a self-locking relay operated in response to said pulse via said separate path from said dater-timer during the duration of a call, switching means for operatively connecting said recorder with said tabulator whereby said tabulator may control said recorder in accordance with the calling and called telephone numbers, the total time, the date, time and rate to permanently record this pertinent data of a toll call, other means for operatively connecting said repeater with said tabulator upon the termination of a toll call, first register means in said tabulator effective upon connection with said repeater to accept the calling and called telephone numbers and the total count of said time pulses, second register means in said tabulator to accept the time of day, date and the current applicable rate for that time of day from the dater timer after accepting the data from the repeater, third means in said tabulator comprising a relay including a pair of transfer contacts operated upon detecting an operated condition of said third means in said repeater to change said current applicable rate indication from said dater timer to control said recorder to record the rate as that of the preceding time period.

References Cited in the file of this patent

UNITED STATES PATENTS

| | | |
|---|---|---|
| 2,225,386 | Hebel | Dec. 17, 1940 |
| 2,373,908 | Ostline | Apr. 17, 1945 |
| 2,385,061 | Clark | Sept. 18, 1945 |
| 2,586,704 | Ostline | Feb. 19, 1952 |